(12) United States Patent
Yokino et al.

(10) Patent No.: US 7,447,400 B2
(45) Date of Patent: Nov. 4, 2008

(54) OPTICAL WAVEGUIDE SUBSTRATE AND METHOD OF FABRICATING THE SAME

(75) Inventors: Takafumi Yokino, Hamamatsu (JP); Katsumi Shibayama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 161 days.

(21) Appl. No.: 11/509,843

(22) Filed: Aug. 25, 2006

(65) Prior Publication Data
US 2007/0092193 A1    Apr. 26, 2007

(30) Foreign Application Priority Data
Aug. 26, 2005    (JP)    ............ P2005-246367

(51) Int. Cl.
*G02B 6/26* (2006.01)
(52) U.S. Cl. ............... 385/18; 385/42; 385/51
(58) Field of Classification Search .......... 385/18, 385/42, 51
See application file for complete search history.

(56) References Cited

U.S. PATENT DOCUMENTS

| 6,085,000 | A * | 7/2000 | Tanaka et al. ............ 385/45 |
| 2005/0276545 | A1 * | 12/2005 | Inui et al. ............ 385/88 |

FOREIGN PATENT DOCUMENTS

| JP | 11-38240 | 2/1999 |
| JP | 11-52150 | 2/1999 |
| JP | 11-287916 | 10/1999 |
| JP | 2000-75155 | 3/2000 |
| JP | 2000-131527 | 5/2000 |
| JP | 2002-243960 | 8/2002 |
| JP | 2002-303772 | 10/2002 |
| JP | 2005-77933 | 3/2005 |

* cited by examiner

*Primary Examiner*—Sung Pak
*Assistant Examiner*—Jerry T Rahll
(74) *Attorney, Agent, or Firm*—Drinker Biddle & Reath LLP

(57) ABSTRACT

The present invention relates to an optical waveguide substrate, realized by means of a simple configuration and processes, having a structure in which an optical component can be embedded within an optical waveguide layer composed of resin, and a structure in which the surface of the optical waveguide layer can be made flat, as well as a method of fabricating the same. The optical waveguide substrate comprises a substrate, first and second core portions, extending in directions which intersect on the substrate; and an optical component having a reflecting surface which reflects light propagating through one of the first and second core portions toward the other. The optical waveguide layer has first and second supporting portions which hold the optical component while sandwiching it. These first and second supporting portions are composed of the same respective materials as the first and second core portions, and are formed on the main surface of the substrate together with the first and second core portions. The optical component as well as the first and second core portions are covered with a cladding portion.

12 Claims, 40 Drawing Sheets

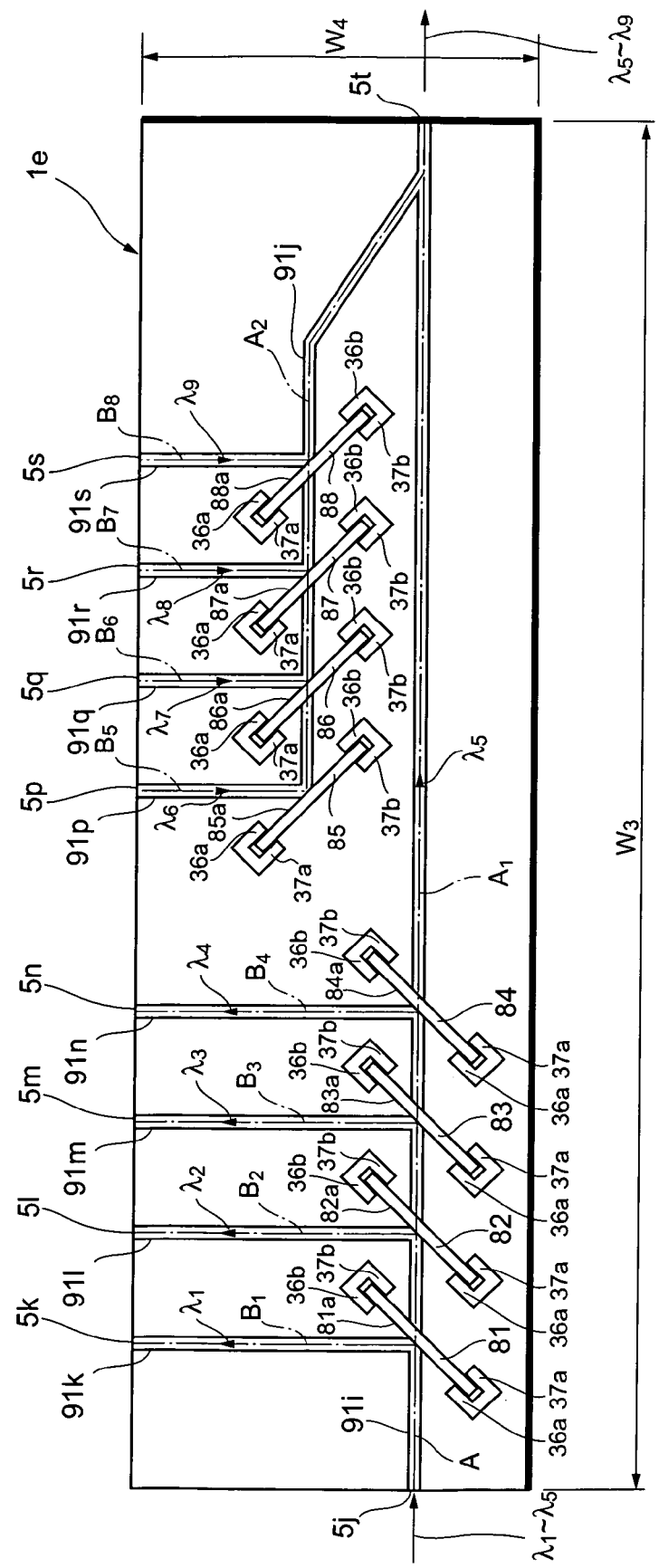

OPTICAL WAVEGUIDE SUBSTRATE AND METHOD OF FABRICATING THE SAME

BACKGROUND OF THE INVENTION

1. Field of the Invention

This invention relates to an optical waveguide substrate and a method of fabricating thereof

2. Related Background Art

Optical waveguide substrates have long been used for branching or coupling of light propagating in optical fibers and other optical transmission media. For example, embedded-type optical waveguide substrates comprise a core for propagation of light, on a Si or other substrate, and cladding covering the core, which is a polymer or other optical waveguide layer. In such an optical waveguide substrate, a wavelength filter or other optical component may be provided so as to intersect the core length direction. In general, optical components are fixed in a state of insertion into a groove, formed for example at a predetermined position in the optical waveguide substrate.

For example, in the following Patent Documents 1 to 6, optical waveguide substrates comprising structures such as those described above are disclosed. In numerous optical waveguide substrates of the prior art, a groove is formed by dicing in an optical waveguide layer on a substrate, and by inserting an optical component into this groove, the optical component is fixed in the optical waveguide layer and substrate. Further, in the following Patent Document 7, a method is disclosed in which, upon insertion of an optical component (optical filter) into a dicing groove, press-fitting material is inserted into the dicing groove together with the optical component to correct bowing of the optical component. As configuration examples other than those above, in the following Patent Document 8, an optical coupler/branch is disclosed in which an optical component (filter) is enclosed between two optical waveguide substrates and fixed in place.

Patent Document 1: Japanese Patent Application Laid-open No. 11-38240

Patent Document 2: Japanese Patent Application Laid-open No. 11-52150

Patent Document 3: Japanese Patent Application Laid-open No. 11-287916

Patent Document 4: Japanese Patent Application Laid-open No. 2000-131527

Patent Document 5: Japanese Patent Application Laid-open No. 2000-75155

Patent Document 6: Japanese Patent Application Laid-open No. 2002-243960

Patent Document 7: Japanese Patent Application Laid-open No. 2002-303772

Patent Document 8: Japanese Patent Application Laid-open No. 2005-77933

SUMMARY OF THE INVENTION

The inventors have studied conventional optical waveguide substrates in detail, and as a result, have found problems as follows.

That is, in many of the conventional optical waveguide substrates described in the above patent documents, the optical component is fixed in the dicing groove by an ultraviolet-curing resin or other adhesive. However, as described in Patent Document 2, there are few adhesives used in optical waveguide substrates which have adequate resistance to humidity or heat, detracting from the reliability of the optical waveguide substrate. Moreover, if depressions or protrusions appear in the surface of the optical waveguide substrate due to the optical component or the adhesive, it becomes difficult to position a photodiode, for example, or other optical device with stability on the optical waveguide substrate.

In order to resolve these problems of optical waveguide substrates of the prior art, the inventors propose an optical waveguide substrate in which optical components are embedded within an optical waveguide layer composed of resin. By embedding optical components within an optical waveguide layer, an optical waveguide substrate can be provided which affords resistance to humidity and heat, and which in addition has excellent reliability. Further, the surface of the optical waveguide substrate can be made flat, so that photodiodes or other devices can be positioned on the optical waveguide substrate with stability.

However, when the optical waveguide layer comprises a resin, often the optical waveguide layer is formed by application using for example spin coating or another method in order to obtain a uniform layer thickness. Hence when the optical component is embedded within the optical waveguide layer, it is preferable that the optical component be held in advance in a predetermined position so as to prevent pushing out of position of the optical component. Also, even in cases where a spin-coating method is not used, if the optical component position is shifted, the optical coupling efficiency between the optical component and core is lowered, and so when embedding the optical component in the optical waveguide layer, it is preferable that the optical component be held in advance in a predetermined position.

In Patent Document 7, by press-fitting an optical filter together with press-fitting material into a groove, the filter is fixed in place in the substrate. However, when using this fixing method, separate press-fitting material is required, so that the number of components is increased; moreover, there is the problem that time and labor are required for the task of insertion of the optical component into the groove.

In order to overcome the above-mentioned problems, it is an object of the present invention to provide an optical waveguide substrate with a structure enabling embedding of an optical component within an optical waveguide layer composed of resin using a simple configuration and process, and with a structure also enabling flattening of the optical waveguide surface, as well as a method of fabricating the same.

In order to resolve the above problems, an optical waveguide substrate according to the present invention comprises a substrate, having a main surface, an optical waveguide layer, which is provided on the main surface of the substrate, and an optical component. The optical waveguide layer is a layer composed of resin and is provided on the main surface of the substrate, and has a first core portion extending in a first direction, a second core portion extending in a second direction intersecting the first direction, and a cladding portion which covers the first and second core portions. The optical component has a reflecting surface which reflects light with a predetermined wavelength. The optical component is provided on the main surface of the substrate such that light propagating in one core portion among the first core portion and the second core portion is reflected by the reflecting surface toward the other core portion. In particular, in an optical waveguide substrate according to the present invention, the optical waveguide layer has first and second supporting portions, which enclose and hold the optical component. These first and second supporting portions comprise the same materials as the first and second core portions respectively, and are formed on the main surface of the substrate together with the first and second core portions. The optical component is, together with the first and second core portions, covered by the cladding portion.

In an optical waveguide substrate having the above-described structure, the optical waveguide layer has first and second supporting portions, which enclose and hold the optical component therebetween. These first and second supporting portions comprise the same materials as the first and second core portions, and moreover are formed on the main surface of the substrate together with the first and second core portions. Hence after simultaneous formation on the main surface of the substrate of the first core portion, second core portion, first supporting portion, and second supporting portion, in the state in which the optical component is enclosed between the first supporting portion and the second supporting portion (in the state in which the first supporting portion and second supporting portion hold the optical component in a predetermined position), the cladding portion, comprising resin, can be formed so as to simultaneously cover the first core portion, second core portion, first supporting portion, second supporting portion, and optical component. In this way, by means of this optical waveguide substrate, while holding the optical component by means of the easily formable first and second supporting portions, the optical component can be covered with the cladding portion, so that there is no pushing out of position by resin, as is for example the case when the cladding portion is formed by spin coating, and the optical component can be embedded within the optical waveguide layer by means of a simple configuration. In this way, an optical waveguide substrate is obtained which can be easily fabricated, which affords resistance to humidity and heat, and which has high reliability. Further, in contrast with an optical waveguide substrate of the prior art in which an optical component is fixed in a groove by means of adhesive, in an optical waveguide substrate according to the present invention the optical component is covered with (embedded in) a cladding portion, so that the surface of the optical waveguide layer can easily be made flat.

Further, in an optical waveguide substrate according to the present invention, the first and second supporting portions comprise the same materials respectively as the first and second core portions, and moreover are formed on the main surface of the substrate together with these first and second core portions. Hence by utilizing a mask when forming the first and second core portions to simultaneously form the first and second supporting portions, the positions of formation of the first and second supporting portions can be adjusted with high precision relative to the first and second core portions. In this case, by means of this optical waveguide substrate, the optical component can be positioned precisely using a small number of processes. Further, in an optical waveguide substrate according to the present invention, the optical component is also covered by the cladding portion which covers the first and second core portions, so that the intrusion of dust and dirt into the gaps between the first core portion, second core portion, and the reflecting surface of the optical component can be prevented, and moreover the gaps can be filled by the cladding portion. In this case, by means of the optical waveguide substrate, a process of injecting an adhesive or similar into the gaps between optical components and core portions for refractive index adjustment can be eliminated. In this case, optical losses between the first and second core portions and the optical component can be effectively reduced without increasing the number of fabricating processes.

An optical waveguide substrate according to the present invention may comprise an optical waveguide layer having two types of cladding portions. That is, the optical waveguide substrate comprises a substrate having a main surface; an optical waveguide layer composed of resin, provided on the main surface of the substrate; and an optical component. The optical waveguide layer has first and second core portions, extending in mutually intersecting directions; a first cladding portion, which covers these first and second core portions; and a second cladding portion, which covers the first cladding portion and the optical component. In the optical waveguide layer, the first cladding portion has an optical component accommodating groove which accommodates the optical component, and first and second supporting portions, formed on the side faces of the optical component accommodating groove, which enclose therebetween and hold the optical component.

In an optical waveguide substrate having the above-described structure, the first cladding portion has first and second supporting portions, which enclose therebetween and hold the optical component. Hence the second cladding portion, comprising resin, is formed so as to cover the first cladding portion together with the optical component, which is enclosed between and held by the first supporting portion and second supporting portion, on the substrate on the main surface of which is formed the first cladding portion together with the first and second core portions. In this case, by means of the optical waveguide substrate, the optical component can be covered by the second cladding portion while being held by first and second supporting portions which can easily be formed. The optical component is embedded within the optical waveguide layer by means of a simple configuration, without being pushed out of position by resin even when, for example, spin coating is used to form the second cladding portion. As a result, an optical waveguide substrate is obtained which can be easily fabricated, which affords resistance to humidity and heat, and which moreover has high reliability In contrast with optical waveguide substrates of the prior art in which an optical component is fixed in a groove using adhesive, in an optical waveguide substrate according to the present invention the optical component is covered by the second cladding portion (is embedded within the optical waveguide layer), so that the surface of the optical waveguide layer can easily be made flat.

The reflecting surface which reflects light of a predetermined wavelength is not limited to a total-reflection face, but includes faces which reflect at least a portion of the arriving light. Optical components having such a face include, for example, wavelength filters which selectively reflect or transmit wavelength components comprised by light according to the wavelength, and half-mirrors which reflect a portion of the quantity of light and transmit the remainder.

Further, in an optical waveguide substrate according to the present invention, it is preferable that the first supporting portion have a first contact surface which makes contact with the reflecting surface of the optical component. Similarly, the second supporting portion has a second contact surface which makes contact with the rear surface of the optical component, opposing the reflecting surface. The optical component is held by these first and second contact surfaces. In this case, the first and second supporting portions can hold the optical component stably. Further, it is preferable that the gap between the first and second contact surfaces be set to be smaller than the thickness of the optical component in the direction perpendicular to the reflecting surface of the optical component, and that the optical component be press-fitted between the first contact surface and the second contact surface. In this case, the optical component is firmly held by the first and second supporting portions.

In an optical waveguide substrate according to the present invention, the first supporting portion may have a first supporting surface, facing the reflecting surface of the optical component, and a convex portion protruding along the main surface of the substrate from the first supporting surface. Similarly, the second supporting portion may have a second supporting surface, facing the rear surface of the optical component which is opposed to the reflecting surface, and a convex portion protruding along the main surface of the substrate from the second supporting surface. At this time, the optical component is in contact with the convex portions of the first and second supporting surfaces. In such a configuration, the contact area between the first and second supporting portions and the optical component can be made small, so that damage (in particular, scratching of the reflecting surface) to the optical component upon insertion of the optical component between the first supporting portion and the second supporting portion can be reduced. Further, the distance between the convex portions formed on the first and second supporting portions respectively is set to be shorter than the thickness of the optical component in the direction perpendicular to the reflecting surface, and the optical component is press-fitted between the convex portion of the first supporting portion and the convex portion of the second supporting portion. As a result, the optical component is firmly held by the first and second supporting portions.

In an optical waveguide substrate according to the present invention, the optical component may have a tapered shape, such that the thickness of the optical component in the direction perpendicular to the reflecting surface gradually decreases toward the substrate. In this case, insertion of the optical component between the first supporting portion and the second supporting portion is facilitated. Further, it is preferable that at least a portion of the rear surface of the optical component opposing the reflecting surface be inclined with respect to the reflecting surface. In this case, the portion of the optical component near the substrate can be machined to a tapered shape, while maintaining the flatness of the reflecting surface.

A first optical waveguide substrate fabrication method according to the present invention comprises a first cladding layer formation process; a core layer formation process; an etching process; an optical composition installation process; and, a second cladding layer formation process. In the first cladding layer formation process, a first cladding layer, composed of resin, is formed on the main surface of a substrate, prepared in advance. In the core layer formation process, a core layer, composed of resin with refractive index higher than that of the first cladding layer, is formed on the first cladding layer. In the etching process, first a mask is prepared, in which are formed the planar shape of a first core portion, extending in a first direction on the main surface of the substrate; the planar shape of a second core portion, extending in a second direction intersecting the first direction; and, the planar shape of first and second supporting portions, which enclose therebetween and support an optical component, positioned such that light propagating in one core portion among the first and second core portions is reflected to the other core portion by a reflecting surface of the optical component. Then, the mask thus prepared is used to perform etching of the core layer and first cladding layer, to form the first and second core portions as well as the first and second supporting portions. In the optical component installation process, the optical component is inserted between the first supporting portion and the second supporting portion. In the second cladding layer formation process, a second cladding layer, composed of resin with a refractive index lower than the core layer, is formed so as to cover the first core portion, second core portion, first supporting portion, second supporting portion, and optical component.

In the above-described first optical waveguide substrate fabrication method, at the time of the etching process, first and second supporting portions, which enclose therebetween and hold the optical component, are formed; hence at the time of the following optical component installation process, by enclosing the optical component between the first supporting portion and the second supporting portion, the optical component is held in the predetermined position. And, at the time of the following second cladding layer formation process, with the optical component held between the first and second supporting portions, a second cladding layer, composed of resin, is formed so as to cover the first core portion, second core portion, first supporting portion, second supporting portion, and optical component. In this way, by means of the first optical waveguide substrate fabrication method, the optical component, while held by easily formable first and second supporting portions, is covered with the second cladding layer, so that even in cases in which the second cladding layer is formed by spin coating, for example, the optical component is suitably embedded within the second cladding layer by means of a simple process, without being pushed out of position by the resin. As a result, an optical waveguide substrate is obtained which can easily be fabricated, affords resistance to humidity and heat, and has high reliability. Further, in contrast with conventional fabrication methods in which the optical component is fixed in a groove using adhesive, in the first optical waveguide substrate fabrication method according to the present invention, the optical component is covered by (embedded within) a second cladding layer, so that the surface of the optical waveguide substrate can easily be made flat.

Further, in the above-described first optical waveguide substrate fabrication method, by using in common the mask used to form the first and second core portions, the planar shapes of the first and second supporting portions can also be formed simultaneously, so that the positions of formation of the first and second supporting portions relative to the first and second core portions can be adjusted with precision. Hence by means of the first optical waveguide substrate fabrication method, the optical component can be positioned precisely with respect to the first and second core portions using a small number of processes. Moreover, in the first optical waveguide substrate fabrication method, at the time of the second cladding layer formation process, the second cladding layer is formed so as to cover the optical component as well as the first and second core portions; hence the intrusion of dust and dirt into the gaps between the first and second core portions and the reflecting surface of the optical component can be prevented, and moreover the gaps can be filled by the cladding portion. As a result, by means of the first optical waveguide substrate fabrication method, a process of injecting an adhesive or similar into the gaps between the optical component and the core portions for refractive index adjustment can be eliminated, and so optical losses between the first and second core portions and the optical component can be effectively reduced without increasing the number of fabricating processes.

A second optical waveguide substrate fabrication method according to the present invention comprises an etching process; an optical component installation process; and a second cladding layer formation process. In the etching process, first etching is performed of a laminated portion comprising resin provided on the main surface of a substrate prepared in advance; the laminated portion has a first core portion extending in a first direction, a second core portion extending in a second direction intersecting the first direction, and a first cladding portion covering these first and second core portions. At this time, a mask is used on which are formed the planar shape of an optical component accommodating groove, which accommodates the optical component placed such that the light propagating in one core portion among the first and second core portions is reflected to the other core portion by the reflecting surface of the optical component, and the planar shapes of first and second supporting portions, formed on the side faces of the optical component accommodating groove, which enclose therebetween and hold the optical component. By using such a mask, the first and second supporting portions are formed in the laminated portion together with the optical component accommodating groove. In the optical component installation process, the optical component is inserted between the first supporting portion and the second supporting portion. Further, in the second cladding layer formation process, a second cladding portion, comprising resin with lower refractive index than the first and second core portions, is formed so as to cover the laminated portion and the optical component.

In the second optical waveguide substrate fabrication method with a structure as described above, at the time of the etching process, first and second supporting portions which enclose and hold the optical component are formed in the laminated portion, so that at the time of the following optical component installation process, the optical component, enclosed between the first supporting portion and second supporting portion, is held in a predetermined position. And at the time of the second cladding portion formation process which then follows, with the optical component held between the first and second supporting portions, the second cladding portion, comprising resin, is formed so as to cover the laminated portion and the optical component. In this way, by means of the second optical waveguide substrate fabrication method, the optical component can be directly covered by the second cladding portion while the optical component is being held by the easily formable first and second supporting portions, so that even in cases in which the second cladding portion is formed by for example spin coating, the optical component can be suitably embedded within the second cladding portion by means of a simple process. As a result, an optical waveguide substrate is obtained which can be easily fabricated, which affords resistance to humidity and heat, and which has high reliability. Further, in contrast with the conventional fabricating methods in which the optical component is fixed in the groove using adhesive, in the second optical waveguide substrate fabrication method, the optical component is covered by (embedded within) a second cladding portion, so that the surface of the optical waveguide substrate can easily be made flat.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 40 is a plane view showing the schematic configuration of a fifth embodiment of an optical waveguide substrate according to the present invention.

DETAILED DESCRIPTION OF THE PREFERRED EMBODIMENTS

In the following, embodiments of an optical waveguide substrate and method of fabricating the same according to the present invention will be explained in detail with reference to FIGS. 1-2, 3A-3B, 4, 5A-6B, 7-15, 16A-16B, 17-22, 23A-23B, and 24-40. In the explanation of the drawings, constituents identical to each other will be referred to with numerals identical to each other without repeating their overlapping descriptions.

First Embodiment

Figure 1:
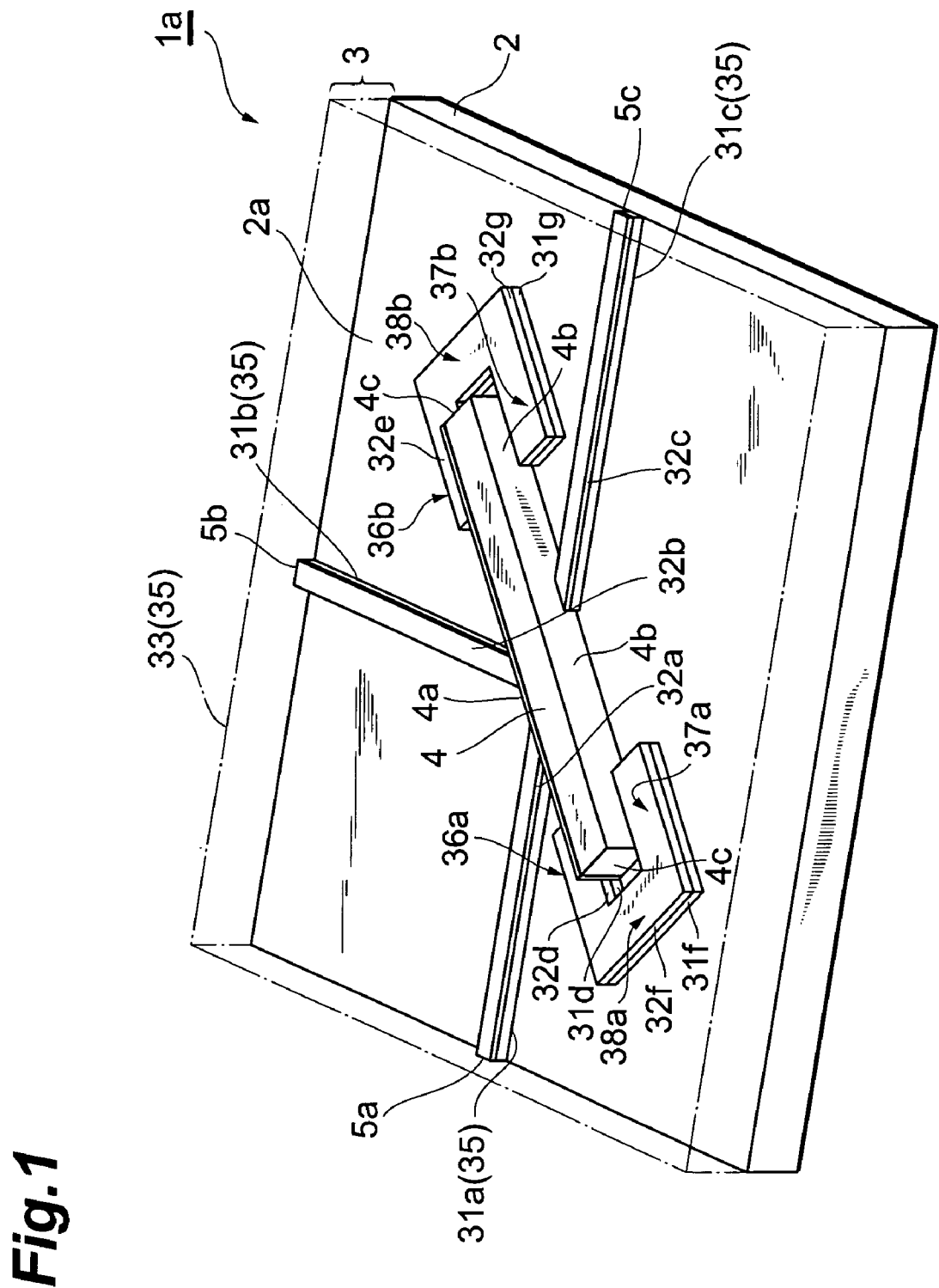
FIG. 1 is a perspective view showing the configuration of a first embodiment of an optical waveguide substrate according to the present invention.
Figure 2:
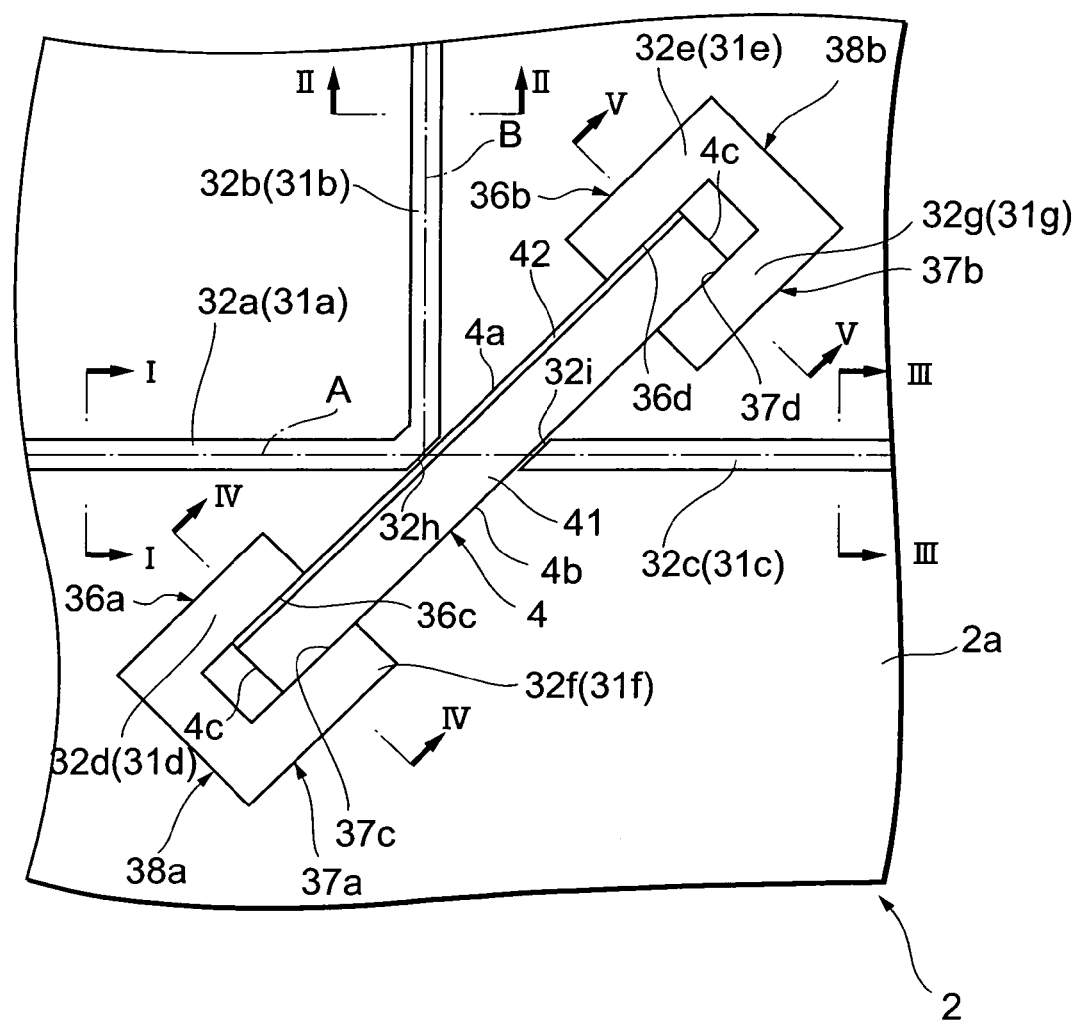
FIG. 2 is a plane view showing the configuration in the vicinity of the center portion of the optical waveguide substrate shown in FIG. 1.
Figure 3A:
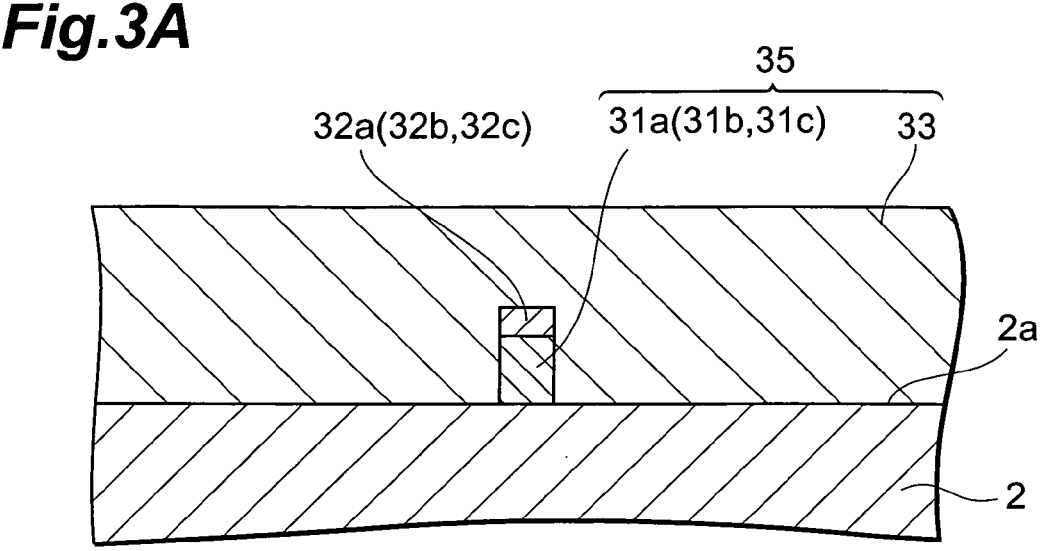
FIGS. 3A and 3B show the cross-sectional structure of the optical waveguide substrate shown in FIG. 2.
Figure 3B:
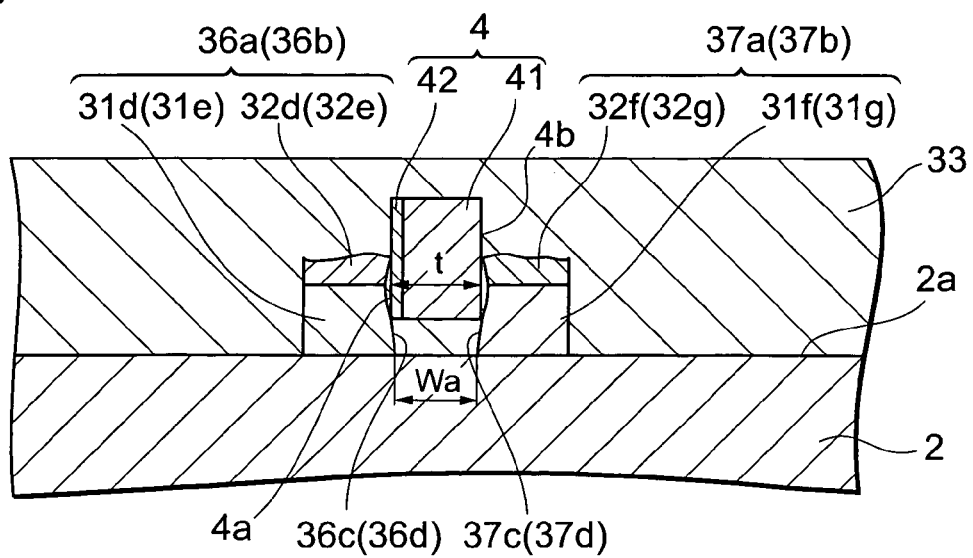

First, a first embodiment of an optical waveguide substrate and method of fabricating the same according to the present invention will be explained. FIG. 1 is a perspective view showing the configuration of the first embodiment of an optical waveguide substrate according to the present invention. FIG. 2 is a plane view showing the configuration in the vicinity of the center portion of the optical waveguide substrate 1a shown in FIG. 1. FIGS. 3A and 3B show the cross-sectional structure of the optical waveguide substrate 1a shown in FIG. 2. In particular, FIG. 3A shows the cross-section of the optical waveguide substrate 1a along lines I-I, II-II, and III-III in FIG. 2, whereas FIG. 3B shows the cross-section of the optical waveguide substrate 1a along lines IV-IV and V-V in FIG. 2. The optical waveguide substrate 1a according to this first embodiment is a so-called embedded-type optical waveguide substrate.

Referring to FIGS. 1 to 2 and 3A to 3B, the optical waveguide substrate 1a according to the first embodiment comprises a substrate 2, optical waveguide layer 3, and wavelength filter 4. The substrate 2 has a rectangular planar shape, and has a main surface 2a. The substrate 2 comprises, for example, silicon, a polyimide, glass, quartz, glass epoxy, a ceramic, or a similar material. When the optical waveguide layer 3 comprises a polymer, the optical waveguide layer 3 shrinks upon heat curing of the optical waveguide layer 3. Consequently, if the thermal expansion coefficients of the substrate 2 and the optical waveguide layer 3 are to be matched, the material of the substrate 2 should be made the same type of material as the optical waveguide layer 3. Further, when the material of the substrate 2 is different from the material of the optical waveguide layer 3 (for example, when a silicon substrate or glass substrate is used with a polyimide optical waveguide layer 3, or similar), in order to suppress bowing of the optical waveguide substrate 1a arising from shrinkage of the optical waveguide layer 3, it is preferable that the substrate 2 be made relatively thick (for example, the thickness should be 300 μm or greater but 1 mm or less).

The optical waveguide layer 3 is a layer comprising core portions 32a to 32c in which light propagates, and is provided on the main surface 2a of the substrate 2. The optical waveguide layer 3 comprises a polymer the base compound of which is at least one type of material among, for example, polyimide, silicone, epoxy, acrylate, polymethyl methacrylate (PMMA), polybenzoxazole, or similar material systems. Or, in order to obtain optimum transmission characteristics for the wavelength of light to be transmitted, the optical waveguide layer 3 may comprise a polymer the base compound of which is a deuteride (for example, silicone deuteride) in which H in the C—H bases of an organic material have been replaced with deuterium, or fluorides (for example, polyimide fluorides) in which H in the C—H bases have been replaced with fluorine. (In the following explanation, a polymer the base compound of which is one of these organic materials, or a deuteride or fluoride thereof, will be called a "polyimide or other polymer".) By means of the above material compositions, the wavelength filter 4 can easily be embedded within the optical waveguide layer 3. Further, among these organic materials, it is preferable that the optical waveguide layer 3 comprise a polyimide with a high glass transition temperature and excellent resistance to heat. By using an optical waveguide layer 3 comprising a polyimide, reliability of the optical waveguide layer 3 can be maintained over a long period of time, and moreover the optical waveguide layer 3 can withstand soldering when mounting electronic devices or similar on the optical waveguide layer 3. It is still more preferable that the optical waveguide layer 3 comprise a fluoride polyimide, in consideration of optical transmissivity, refractive index characteristics, and similar.

The optical waveguide layer 3 has a cladding portion 35, and core portions 32a to 32c having refractive indices higher than that of the cladding portion 35 The cladding portion 35 is formed in layer form on the main surface 2a of the substrate 2, and the core portions 32a to 32c are covered by the cladding portion 35. The core portion 32a is a first core portion in the first embodiment, and extends in a first direction along a predetermined optical axis A (see FIG. 2). The core portion 32b is a second core portion in the first embodiment, and extends in a second direction along a predetermined optical axis B (see FIG. 2) which intersects the length direction of core portion 32a (that is, the first direction along optical axis A). One end of the core portion 32a is connected with one end of the core portion 32b, and the end face 32h (see FIG. 2) is an end face common to the core portions 32a and 32b. The other ends of the core portions 32a and 32b are respectively the light incident/emitting ends 5a and 5b, exposed from the cladding portion 35 at side faces of the optical waveguide substrate 1a. The core portion 32c is provided in the first direction along the predetermined optical axis A of the core portion 32a, and extends in the first direction along the predetermined optical axis A. One end of the core portion 32c is an end face 32i (see FIG. 2) opposing one end of the core portion 32a, with a predetermined interval therebetween. The other end of the core portion 32c is an incident/emitting face 5c, exposed from the cladding portion 35 at a side face of the optical waveguide substrate 1a.

The cladding portion 35 comprises the lower-layer cladding portions 31a to 31c and the upper-layer cladding portion 33. The lower-layer cladding portions 31a to 31c are provided between the core portions 32a to 32c and the substrate 2. As indicated in descriptions of fabricating processes below, the lower-layer cladding portions 31a to 31c are formed by etching simultaneously with the formation by etching of the core portions 32a to 32c. Hence the planar shapes of the lower-layer cladding portions 31a to 31c are the same shapes as the planar shapes of the respective core portions 32a to 32c. Further, the upper-layer cladding portion 33 is formed over the entire main surface 2a so as to cover the core portions 32a to 32c and the lower-layer cladding portions 31a to 31c. In FIG. 1, the upper-layer cladding portion 33 is represented by a virtual line (dot-dash line) in order to explain the internal configuration of the optical waveguide layer 3. Also, in FIG. 2, the upper-layer cladding portion 33 is not shown.

The wavelength filter 4 is an optical component which selectively reflects wavelength components comprised by the propagating light in accordance with the wavelength, and is an example of an optical component in the present invention. Referring to FIG. 2 and FIG. 3B, the wavelength filter 4 has a reflecting surface 4a which selectively reflects light according to the wavelength, and a rear surface 4b opposing the reflecting surface 4a. The wavelength filter 4 is positioned on the main surface 2a of the substrate 2 such that the reflecting surface 4a reflects light propagating in the core portion 32a to the core portion 32b (or stated conversely, such that the reflecting surface 4a reflects light propagating in the core portion 32b to the core portion 32a). Specifically, the wavelength filter 4 is placed such that the normal to the reflecting surface 4a bisects the angle made by the predetermined optical axes A and B. The reflecting surface 4a faces the end face 32h of the core portion 32a (32b), and the rear surface 4b faces the end face 32i of the core portion 32c. The reflecting surface 4a, rear surface 4b, side faces 4c, and top face of the wavelength filter 4 are covered by the upper-layer cladding portion 33. Hence the gap between the reflecting surface 4a and the end face 32h, and the gap between the rear surface 4b and the end face 32i, are filled by the constituent material of the upper-layer cladding portion 33.

The wavelength filter 4 comprises a base portion 41 and a dielectric multilayer film 42 provided on the side of the reflecting surface 4a of the base portion 41. The dielectric multilayer film 42 comprises a plurality of stacked dielectric layers having predetermined thicknesses and refractive indices, and can selectively reflect light according to the wavelength. The base portion 41 is a portion used to maintain the mechanical strength of the multilayer film 42, and for example comprises a material which is transparent for the wavelengths of light propagating in the core portions 32a to 32c. It is preferable that the wavelength filter 4 be installed directed on the main surface 2a of the substrate 2 as in the first embodiment; however, the wavelength filter 4 may be installed with a portion of the cladding portion 35 intervening between the wavelength filter 4 and the main surface 2a. Further, by using a dielectric multilayer film as the wavelength filter 4, the optical axis in the wavelength filter 4 of light which is transmitted without being reflected is shifted somewhat with respect to the optical axis A of light prior to incidence on the wavelength filter 4.

When the optical waveguide layer 3 comprises a polyimide or other polymer, upon heat-curing of the optical waveguide layer 3, the optical waveguide layer 3 shrinks. Consequently, in order to match the thermal expansion coefficients, it is preferable that the wavelength filter 4 comprise a polyimide or other polymer similarly to the optical waveguide layer 3. By this means, positional shifts between the cores 32a, 32b, 32c and the wavelength filter 4 due to shrinkage upon hardening of the optical waveguide layer 3 (and in particular the upper-layer cladding portion 33) are suppressed. It is still more preferable that the wavelength filter 4 and upper-layer cladding portion 33 comprise the same type of material. For example, when the upper-layer cladding portion 33 comprises a polymer the base compound of which is a fluoride polyimide, it is preferable that the wavelength filter 4 also comprise a polymer the base compound of which is a fluoride polyimide.

Here, the optical waveguide layer 3 further has first supporting portions 36a, 36b and second supporting portions 37a, 37b. The first supporting portions 36a, 36b and second supporting portions 37a, 37b hold the wavelength filter 4 with the wavelength filter 4 enclosed therebetween. The first supporting portions 36a, 36b are formed on the main surface 2a of the substrate 2, arranged along the length direction of the wavelength filter 4, and are positioned in the proximity of both ends of the wavelength filter 4. The second supporting portions 37a, 37b are similarly formed on the main surface 2a of the substrate 2, arranged along the length direction of the wavelength filter 4, and are positioned in the proximity of both ends of the wavelength filter 4. The first supporting portions 36a, 36b have respective side faces 36c, 36d which are in contact with the reflecting surface 4a of the wavelength filter 4. The side faces 36c, 36d are first contact surfaces in the first embodiment. The second supporting portions 37a, 37b have respective side faces 37c, 37d which are in contact with the rear surface 4b of the wavelength filter 4. The side faces 37c, 37d are second contact surfaces in the first embodiment.

The side face 36c and side face 37c are arranged in a state of mutual opposition enclosing the wavelength filter 4. The side face 36d and side face 37d are also arranged in a state of mutual opposition enclosing the wavelength filter 4. By means of this configuration, one end of the wavelength filter 4 is enclosed between the side face 36c and the side face 37c, and the other end of the wavelength filter 4 is enclosed between the side face 36d and the side face 37d, so that the respective ends are held. The contact positions of the wavelength filter 4 with the first supporting portions 36a, 36b (that is, the contact positions of the reflecting surface 4a with the side faces 36c and 36d), and the contact positions of the wavelength filter 4 with the second supporting portions 37a, 37b (that is, the contact positions of the rear surface 4b with the side faces 37c, 37d), are positioned symmetrically holding the wavelength filter 4. By this means, the wavelength filter 4 is held stably. And, the position and angle of the reflecting surface 4a of the wavelength filter 4 are governed by the side faces 36c, 36d and the side faces 37c, 37d. The first supporting portions 36a, 36b and second supporting portions 37a, 37b are formed simultaneously with the core portions 32a to 32c (using the same mask), as in the fabricating processes described below.

Here, as shown in FIG. 3B, in the first embodiment the interval between the side face 36c and the side face 37c (the interval between the side face 36d and the side face 37d) Wa is set so as to be smaller than the thickness t of the wavelength filter 4 in the direction perpendicularly intersecting the reflecting surface 4a. And, the wavelength filter 4 is press-fitted between the side face 36c and the side face 37c (between the side face 36d and the side face 37d). Hence the wavelength filter 4 is firmly held by the first supporting portions 36a, 36b and the second supporting portions 37a, 37b. In the first embodiment, the first supporting portion 36a and second supporting portion 37a are connected together by the connecting portion 38a formed in the same layer with the first supporting portion 36a and second supporting portion 37a. The first supporting portion 36b and second supporting portion 37b are also connected together by the connecting portion 38b formed in the same layer with the first supporting portion 36b and second supporting portion 37b. By means of this configuration, the mechanical strength of the first supporting portions 36a, 36b and second supporting portions 37a, 37b is increased, and separation of the first supporting portions 36a, 36b and second supporting portions 37a, 37b on press-fitting the wavelength filter 4 can be prevented. Moreover, in order to prevent separation of the first supporting portions 36a, 36b and second supporting portions 37a, 37b on press-fitting the wavelength filter 4, it is effective to set the widths of the contact surfaces between the first supporting portions 36a, 36b and the main surface 2a of the substrate 2, and the widths of the contact surfaces between the second supporting portions 37a, 37b and the main surface 2a of the substrate 2, to be approximately equal to or greater than the thickness t of the wavelength filter 4.

Further, in the first embodiment, the optical waveguide layer 3 comprises a polyimide or other polymer, and the first supporting portions 36a, 36b and second supporting portions 37a, 37b also similarly comprise a polyimide or other polymer. In this way, because the first supporting portions 36a, 36b and second supporting portions 37a, 37b comprise a polymer which is a comparatively soft material, damage to the wavelength filter 4 at the time of insertion of the wavelength filter 4 between the first supporting portions 36a, 36b and the second supporting portions 37a, 37b (and in particular damage to the reflecting surface 4a) is reduced. Further, as explained above, in the first embodiment the wavelength filter 4 also comprises a polyimide or other polymer, so that damage to the wavelength filter 4 at the time the wavelength filter 4 is inserted is further reduced.

The first supporting portion 36a has a first portion 31d and a second portion 32d provided on the first portion 31d. Similarly, the first supporting portion 36b has a first portion 31e and a second portion 32e provided on the first portion 31e. The first portions 31d and 31e are positioned in the same layer as the lower-layer cladding portions 31a to 31c, and comprise the same material as the lower-layer cladding portions 31a to 31c. On the other hand, the second portions 32d, 32e are positioned in the same layer as the core portions 32a to 32c, and comprise the same material as the core portions 32a to 32c. Also, the second supporting portion 37a has a first portion 31f and a second portion 32f provided on the first portion 31f. Similarly, the second supporting portion 37b has a first portion 31g and a second portion 32g provided on the first portion 31g. The first portions 31f, 31g are positioned in the same layer as the lower-layer cladding portions 31a to 31c, and comprise the same material as the lower-layer cladding portions 31a to 31c. On the other hand, the second portions 32f, 32g are positioned in the same layer as the core portions 32a to 32c, and comprise the same material as the core portions 32a to 32c.

The second portions 32d, 32e, 32f, 32g are positioned in the same layer as the core portions 32a to 32c, and comprise the same material. Hence there is the concern that, if formed at positions too close to the core portions 32a to 32c, a portion of the light propagating in the core portions 32a to 32c may be absorbed. Hence it is preferable that an adequate interval (for example, when the core portions 32a to 32c are formed with a width and height of from 5 to 8 μm, the interval from the second portions 32d, 32e, 32f, 32g may be 50 μm) be provided between the second portions 32d, 32e, 32f, 32g and the core portions 32a to 32c.

Next, a method of fabricating an optical waveguide substrate 1a with the above-described structure will be explained. FIGS. 4, 5A to 6B, and 7 to 10 are perspective views for explaining, in order, fabrication processes of the optical waveguide substrate 1a according to the first embodiment.

Figure 4:
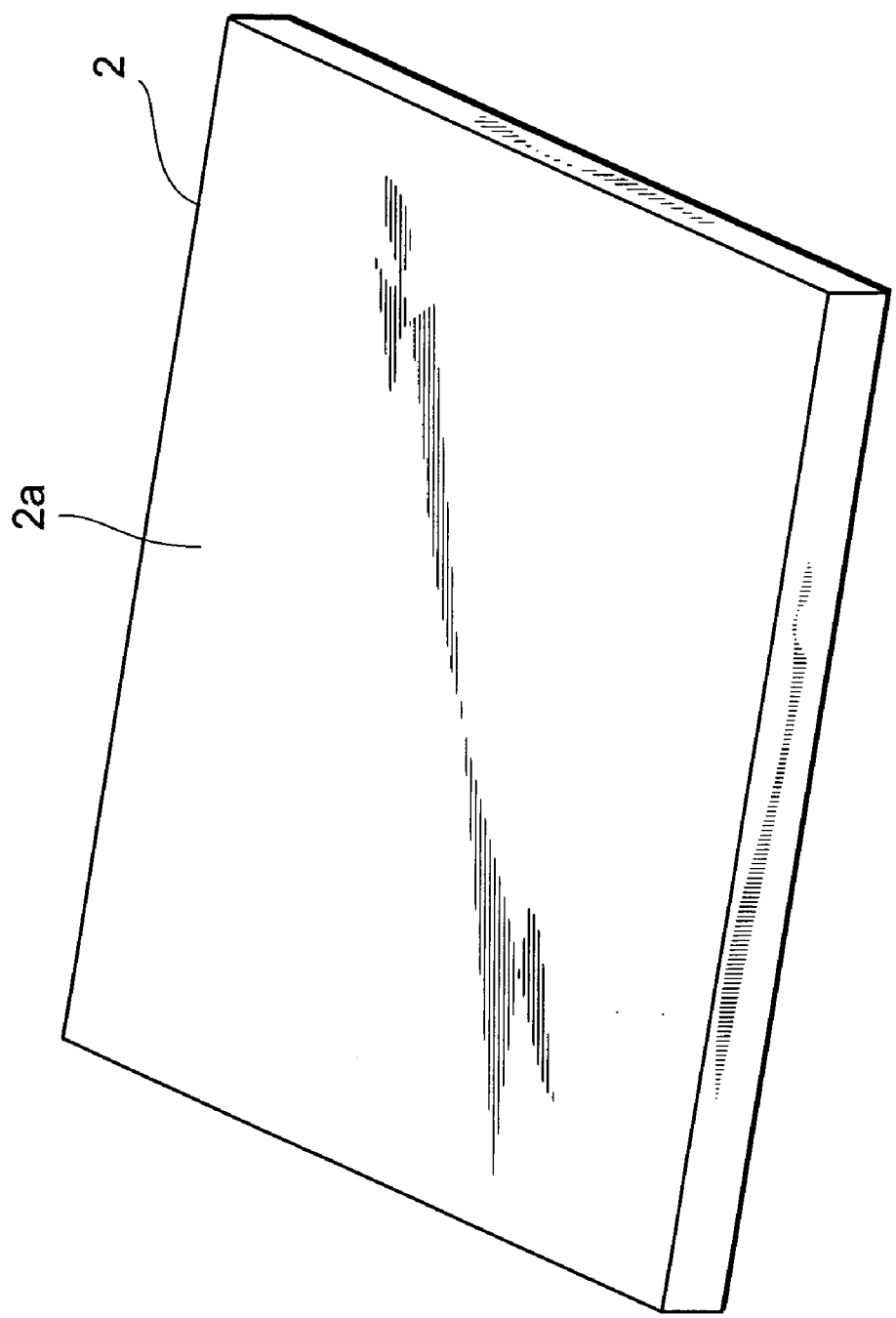
FIG. 4 is a perspective view for explaining fabrication processes of the optical waveguide substrate according to the first embodiment (Part 1)
Figure 5:
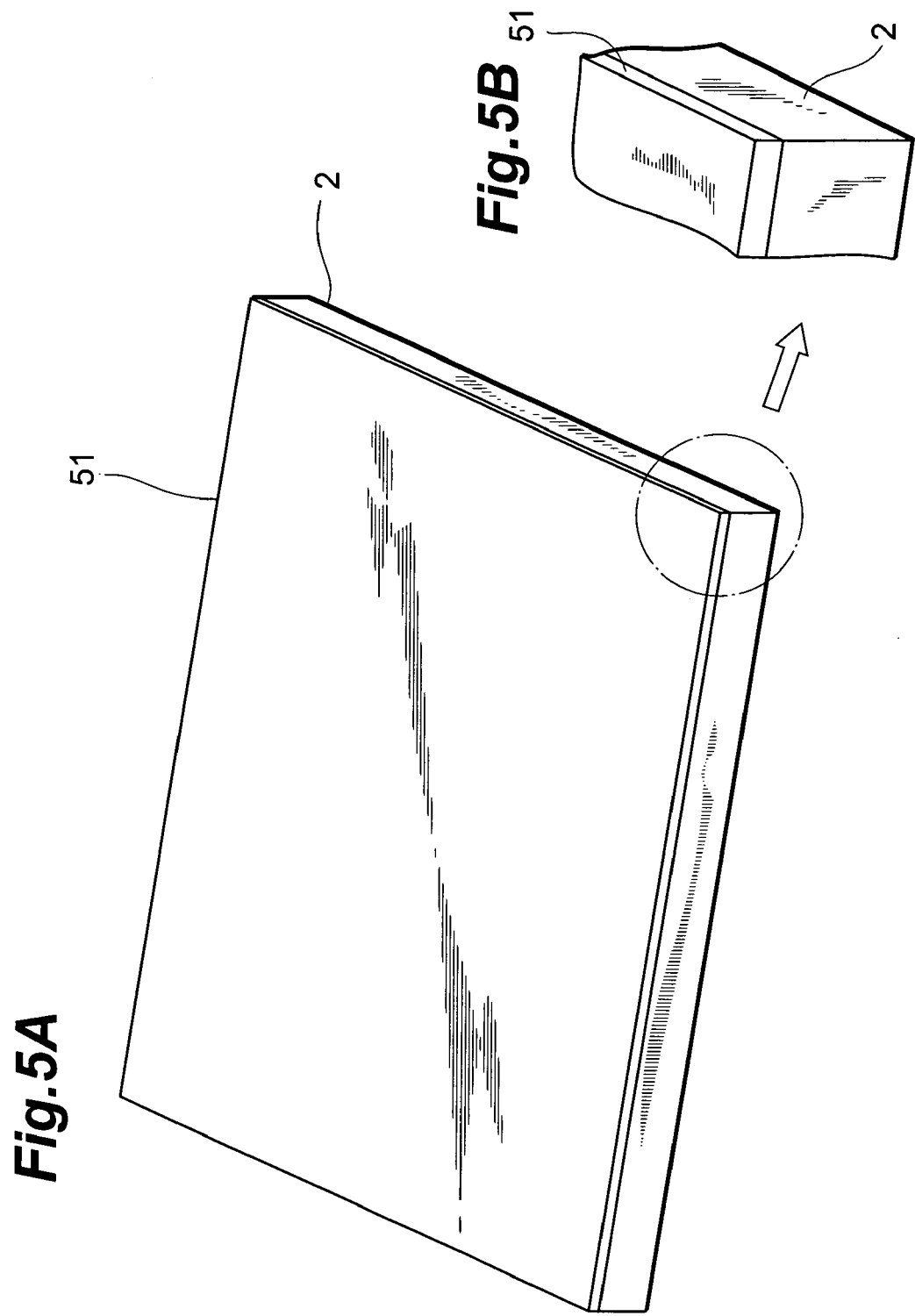
FIGS. 5A and 5B are perspective views for explaining fabrication processes of the optical waveguide substrate according to the first embodiment (Part 2)
Figure 6:
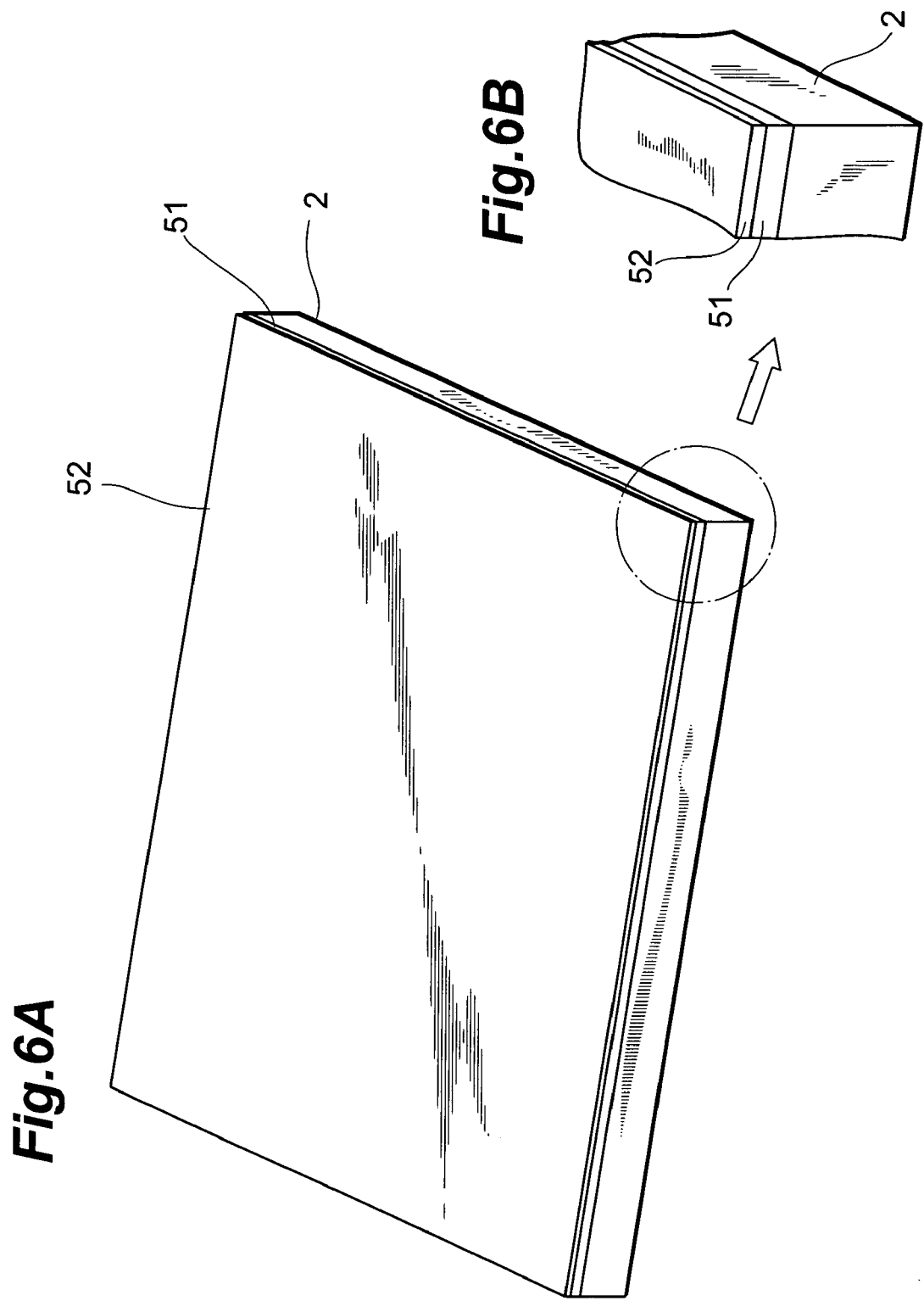
FIGS. 6A and 6B are perspective views for explaining fabrication processes of the optical waveguide substrate according to the first embodiment (Part 3)

First, as shown in FIG. 4, a substrate 2 having a main surface 2a is prepared. In order to facilitate understanding, in FIG. 4 a rectangular substrate 2 used in a single optical waveguide substrate 1a is shown. However, after forming an optical waveguide substrate 3 on a wafer larger than the substrate 2 using the fabricating processes explained below, by then cutting the wafer into chips, a plurality of optical waveguide substrates 1a can be fabricated simultaneously.

Next, as shown in FIGS. 5A and 5B which is an enlargement of a portion of FIG. 5A, a first cladding layer 51 comprising a resin is formed on the main surface 2a of the substrate 2 (first cladding layer formation process). At this time, it is preferable that the first cladding layer 51 be of a polyimide or other polymer. In this case, the first cladding layer 51 is formed by application (preferably by spin coating) onto the main surface 2a.

Next, as shown in FIG. 6A and in FIG. 6B which is an enlargement of a portion of FIG. 6A, a core layer 52 comprising a resin is formed on the first cladding layer 51 (core layer formation process). At this time, the material of the core layer 52 has a higher refractive index than the first cladding layer 51. In this process, it is preferable that the core layer 52 be of a polyimide or other polymer. In this case, similarly to the first cladding layer 51, the core layer 52 is formed by application (preferably by spin coating) onto the first cladding layer 51.

Figure 7:
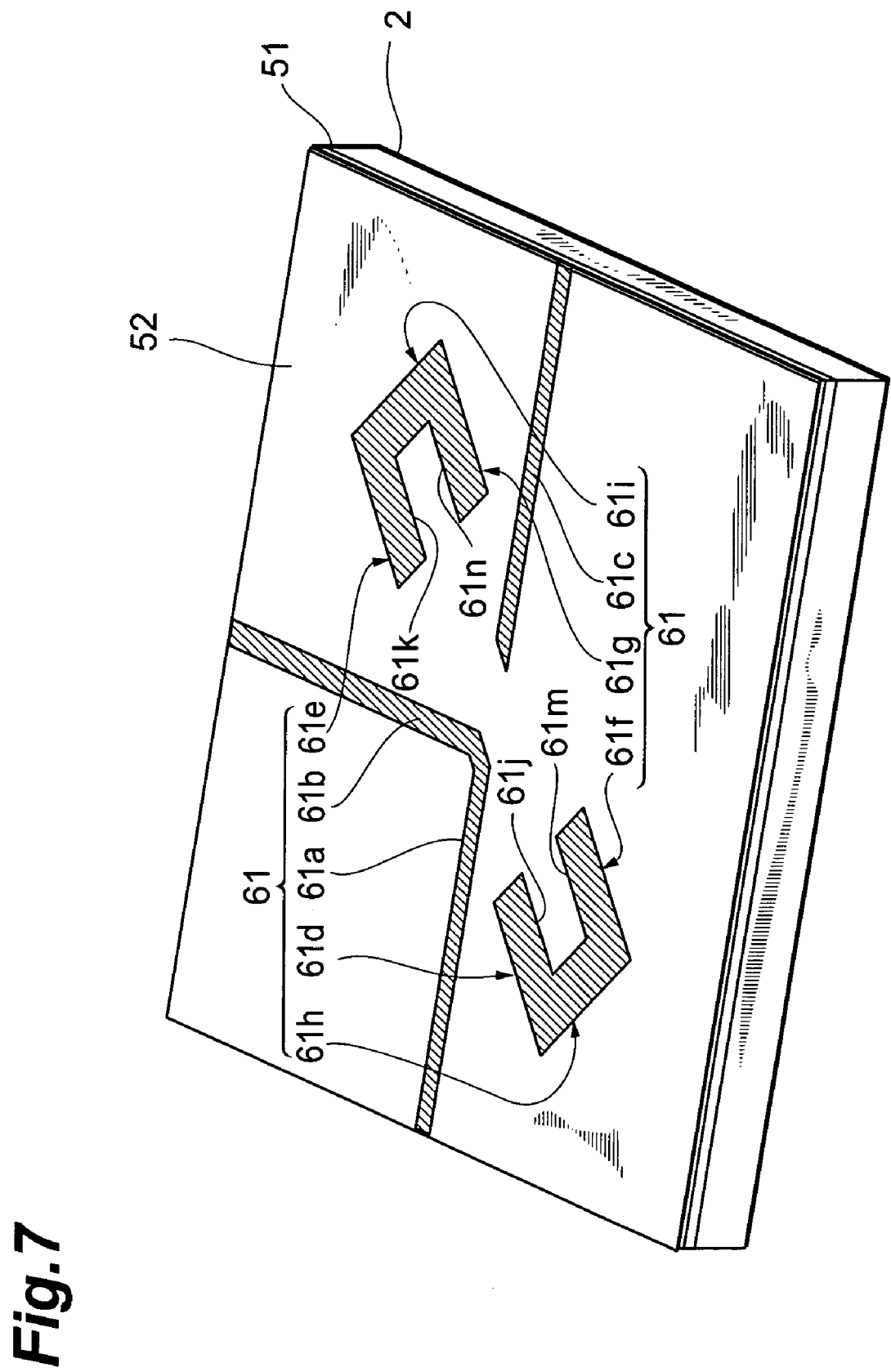
FIG. 7 is a perspective view for explaining fabrication processes of the optical waveguide substrate according to the first embodiment (Part 4)

Next, as shown in FIG. 7, a mask 61 is formed on the core layer 52 (mask formation process). This mask 61 is formed so as to comprise mask portions 61a to 61c, of shapes matching the respective planar shapes (core patterns) of the core portions 32a to 32c shown in FIG. 1 and FIG. 2, mask portions 61d and 61e of shapes matching the respective planar shapes of the first supporting portions 36a, 36b, mask portions 61f, 61g of shapes matching the respective planar shapes of the second supporting portions 37a, 37b, and mask portions 61h, 61i of shapes matching the respective planar shapes of the connecting portions 38a, 38b. The mask portions 61d and 61e are formed so as to comprise edges 61j, 61k corresponding to the side faces 36c, 36d of the first supporting portions 36a, 36b. Similarly, the mask portions 61f, 61g are formed so as to comprise edges 61m, 61n corresponding to the side faces 37c, 37d of the second supporting portions 37a, 37b. Also, the interval between the edge 61j and the edge 61m, and the interval between the edge 61k and the edge 61n, are set to be smaller than the thickness t (see FIG. 3B) of the wavelength filter 4 in the direction perpendicularly intersecting the reflecting surface 4a. In this process, the mask 61 may for example be formed using ordinary photolithography techniques. As the mask material of the mask 61, for example, a resist or a metal thin film (Al, Ti, Cr, WSi, or similar) can be used.

Figure 8:
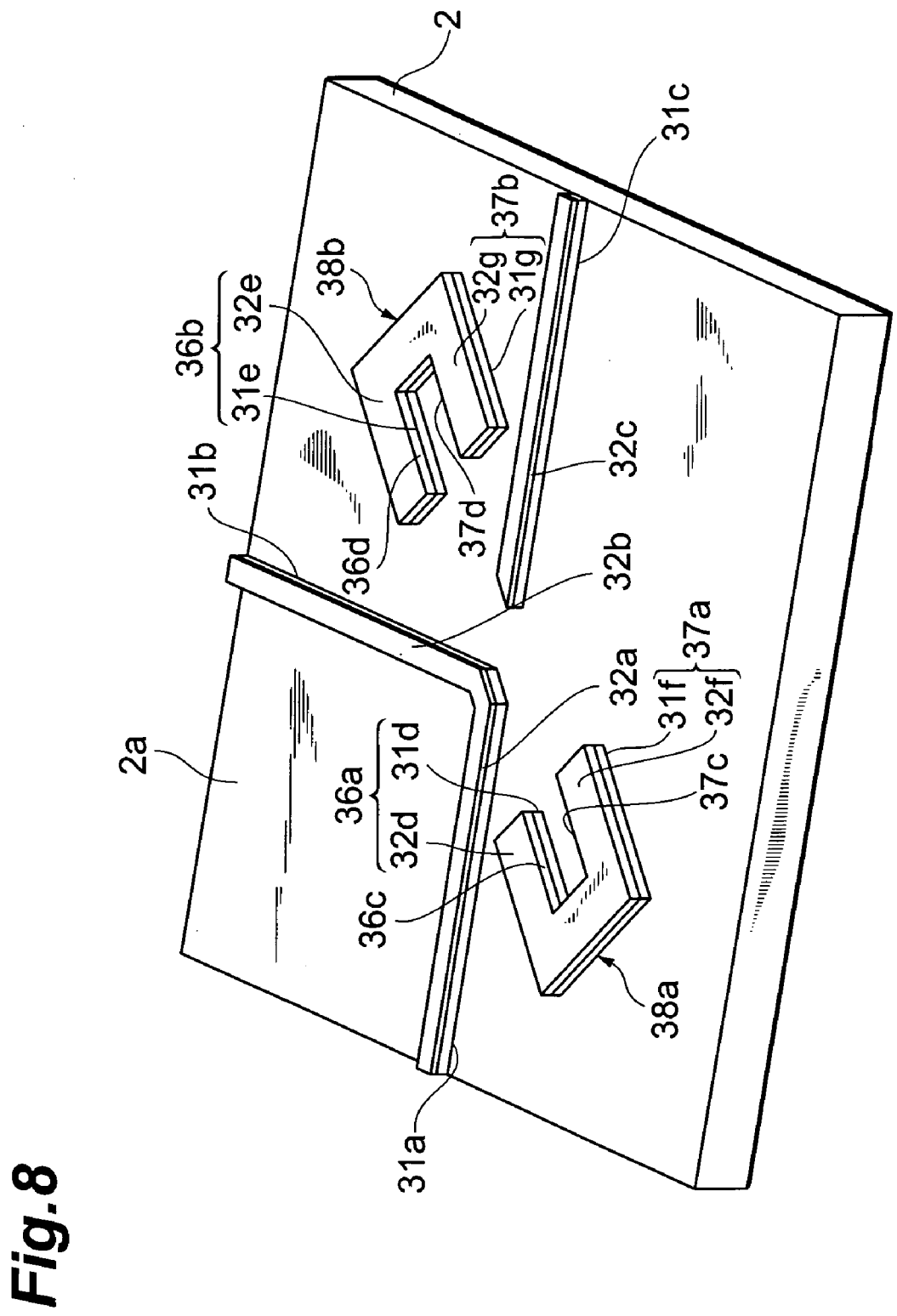
FIG. 8 is a perspective view for explaining fabrication processes of the optical waveguide substrate according to the first embodiment (Part 5)

Next, the mask 61 is used to perform etching of the core layer 52 and first cladding layer 51, by which means the core portions 32a to 32c, lower-layer cladding portions 31a to 31c, first supporting portion 36a (first portion 31d and second portion 32d), first supporting portion 36b (first portion 31e and second portion 32e), second supporting portion 37a (first portion 31f and second portion 32f), and second supporting portion 37b (first portion 31g and second portion 32g), are formed, as shown in FIG. 8 (etching process). Further, at this time, side faces 36c, 36d to make contact with the reflecting surface 4a (see FIG. 1, FIG. 2, and FIGS. 3A and 3B) of the wavelength filter 4 are formed on the first supporting portions 36a, 36b, and in addition, side faces 37c, 37d to make contact with the rear surface 4b (see FIG. 1, FIG. 2, FIGS. 3A and 3B) of the wavelength filter 4 are formed on the second supporting portions 37a, 37b. In this process, it is preferable that the core layer 52 and first cladding layer 51 be etched by dry etching. Further, the etching depth when etching the core layer 52 and first cladding layer 51 is deeper than the thickness of the core layer 52. In order to secure the heights of the first supporting portions 36a, 36b and the second supporting portions 37a, 37b, it is preferable that this etching depth be deeper still (for example, that etching be performed until the main surface 2a of the substrate 2 is exposed). By this means, the wavelength filter 4 which is inserted between the first supporting portions 36a, 36b and the second supporting portions 37a, 37b in the following process can be held firmly.

Figure 9:
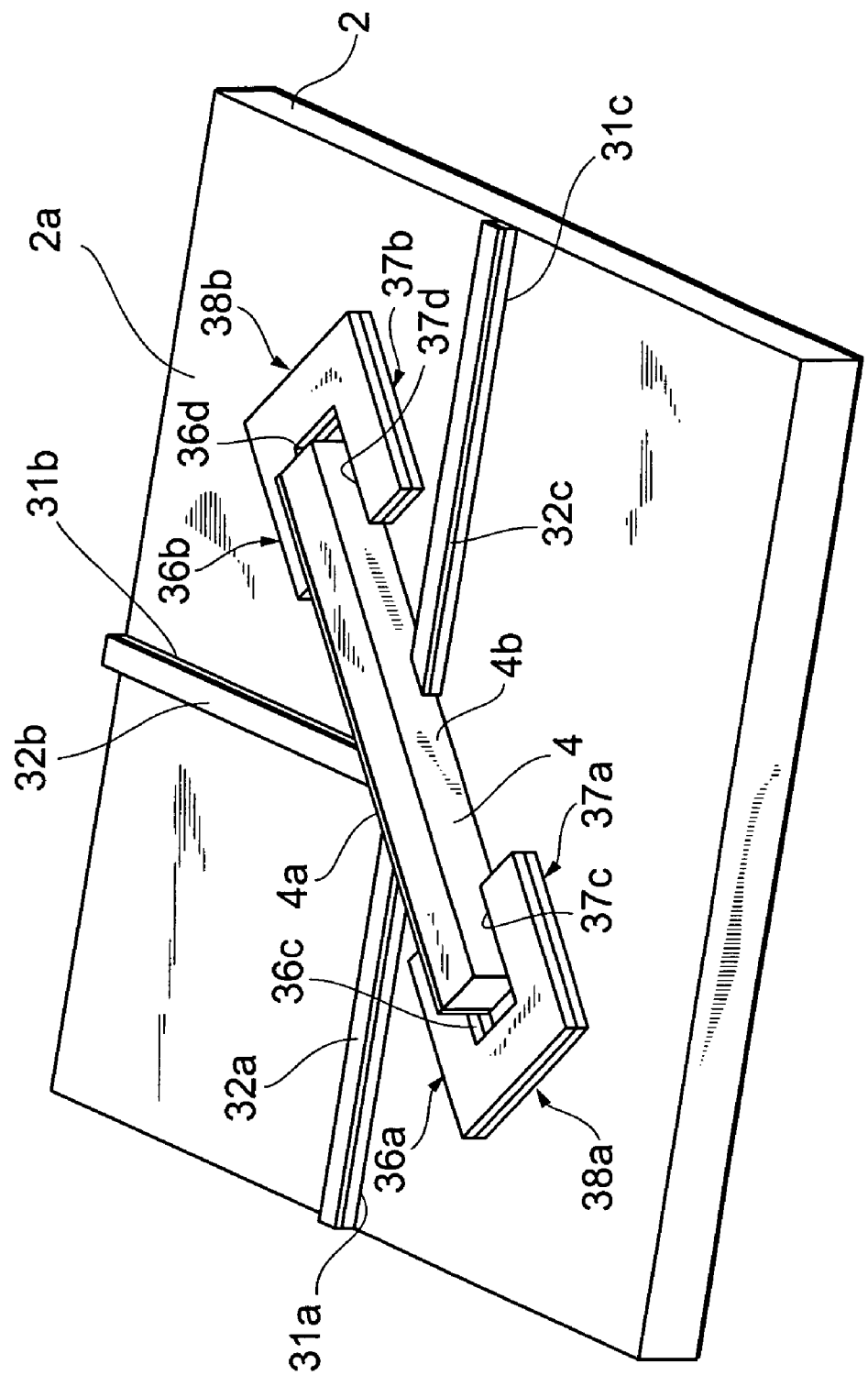
FIG. 9 is a perspective view for explaining fabrication processes of the optical waveguide substrate according to the first embodiment (Part 6)

Next, as shown in FIG. 9, the wavelength filter 4 is inserted between the first supporting portions 36a, 36b and the second supporting portions 37a, 37b (optical component installation process). At this time, when the interval between the side face 36c and the side face 37c and the interval between the side face 36d and the side face 37d are narrower than the thickness of the wavelength filter 4, the wavelength filter 4 is press-fitted between the first supporting portions 36a, 36b and the second supporting portions 37a, 37b. When the upper-layer cladding portion 33 formed in the following process comprises a polyimide or other polymer, a wavelength filter 4 similarly comprising a polyimide or other polymer may be inserted. It is still more preferable that a wavelength filter 4 comprising the same type of material as the upper-layer cladding portion 33 be inserted.

Figure 10:
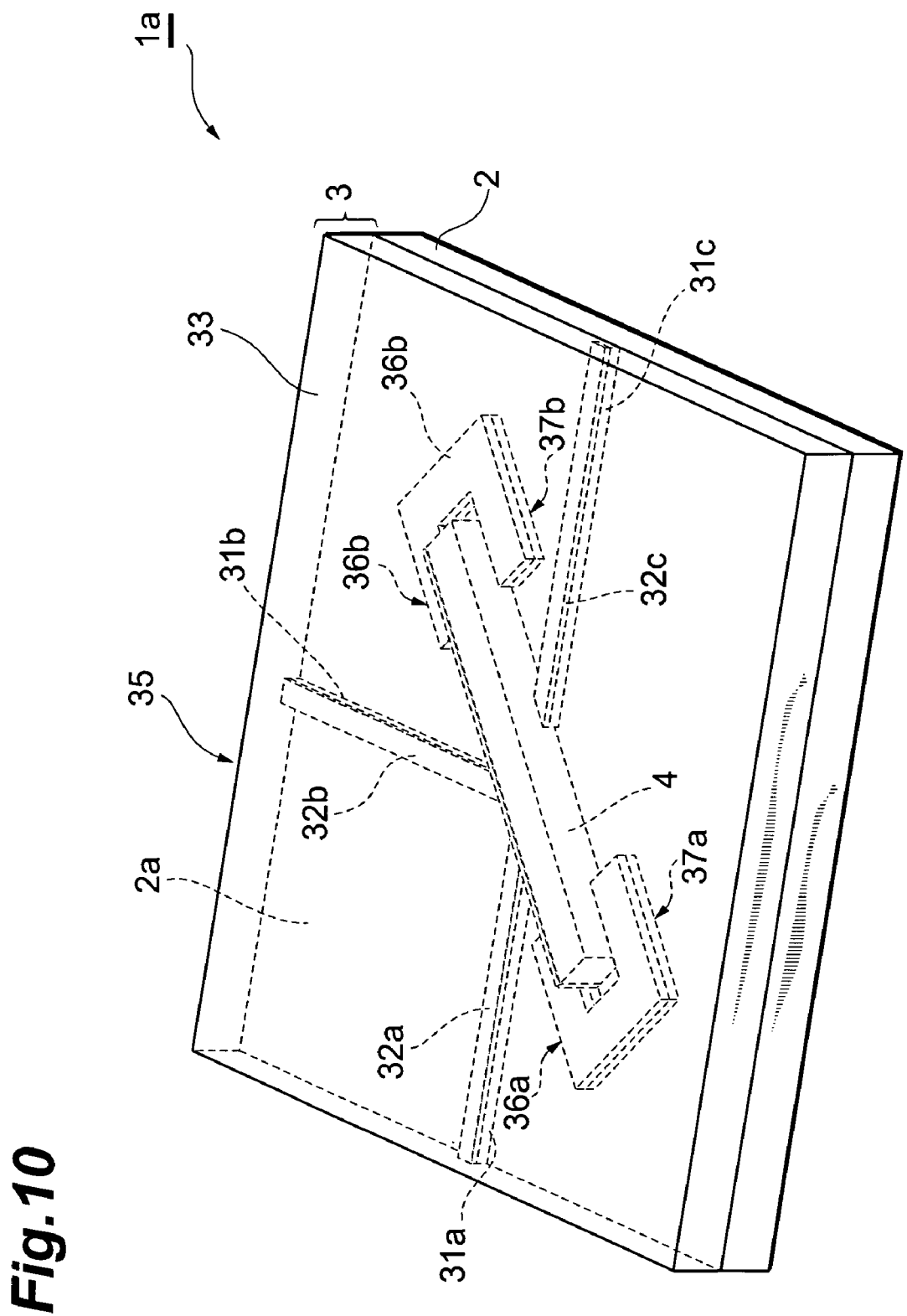
FIG. 10 is a perspective view for explaining fabrication processes of the optical waveguide substrate according to the first embodiment (Part 7)

Next, as shown in FIG. 10, an upper-layer cladding portion (second cladding layer) 33, comprising a resin with refractive index lower than that of the core portions 32a to 32c, is formed (second cladding layer formation process). At this time, the upper-layer cladding portion 33 is formed so as to cover all of the main surface 2a, lower-layer cladding portions 31a to 31c, core portions 32a to 32c, first supporting portions 36a and 36b, second supporting portions 37a and 37b, and wavelength filter 4. By this means, a cladding portion 35 comprising lower-layer cladding portions 31a to 31c and an upper-layer cladding portion 33 is formed. In this process, it is preferable that the upper-layer cladding portion 33 be of a polyimide or other polymer; in this case, the upper-layer cladding portion 33 is formed by application (and preferably by spin coating). At this time, it is preferable that the surface of the upper-layer cladding portion 33 be formed to be flat, in order to form electrical wiring or place optical elements thereupon. By forming the upper-layer cladding portion 33 using spin coating, the surface of the upper-layer cladding portion 33 can be made flat. Further, the wavelength filter 4, first supporting portions 36a and 36b, and second supporting portions 37a and 37b are of a polyimide or other polymer which exhibits both appropriate hardness and elasticity, so that the first supporting portions 36a, 36b and second supporting portions 37a, 37b can hold the wavelength filter 4 without splitting or cracking.

By means of the above processes, an optical waveguide substrate 1a comprising a substrate 2, optical waveguide layer 3, and wavelength filter 4 is obtained.

When light is propagated in a single mode, it is preferable that the thickness of the first cladding layer 51 formed in the above-described first cladding layer formation process (FIG. 5A and FIG. 5B) be for example equal to or greater than 10 μm but less than 20 μm. In particular, when the material of the optical waveguide layer 3 is a fluoride polyimide, a suitable thickness for the first cladding layer 51 is for example 15 μm. It is preferable that the thickness of the core layer 52 formed in the core layer formation process (FIG. 6A and FIG. 6B) be for example equal to or greater than 5 μm and less than 10 μm. In particular, when the material of the optical waveguide layer 3 is a fluoride polyimide, a suitable thickness for the core layer 52 is for example 9 μm. It is preferable that the thickness of the upper-layer cladding portion 33 formed in the second cladding layer formation process (FIG. 10) be for example equal to or greater than 10 μm and less than 30 μm from the top faces of the core portions 32a to 32c. In particular, when the material of the upper-layer cladding portion 33 is a fluoride polyimide, a suitable thickness for the upper-layer cladding portion 33 is for example 20 μm from the top faces of the core portions 32a to 32c.

When light is propagated in multiple modes, the thicknesses of the first cladding layer 51, core layer 52, and upper-layer cladding portion 33 can be set freely over a wide range of for example 10 μm to several hundred μm, determined according to the application.

Further, when for example the material of the wavelength filter 4 is a polyimide, it is preferable that the thickness of the wavelength filter 4 installed in the optical component installation process be approximately 30 μm to 100 μm. However, in order to suppress losses in the light transmitted by the wavelength filter 4, the thickness of the wavelength filter 4 should be made as thin as possible (for example 30 μm to 40 μm). Further, the wavelength filter 4 must be covered by the upper-layer cladding portion 33, and so it is preferable that the height of the wavelength filter 4 (that is, the width of the wavelength filter 4 in the direction normal to the main surface 2a) be for example approximately 30 μm to 50 μm. Further, the length-direction width of the wavelength filter 4 can be set appropriately according to the installation stability of the wavelength filter 4 and the size of the installation space; for example, approximately 200 μm to 400 μm is reasonable.

Next, advantageous results of the optical waveguide substrate 1a and the method of fabricating the same according to the first embodiment, explained above, are explained. In the optical waveguide substrate 1a according to the first embodiment, the optical waveguide layer 3 has first supporting portions 36a, 36b and second supporting portions 37a, 37b which enclose therebetween and hold the wavelength filter 4. And, these first supporting portions 36a, 36b and second supporting portions 37a, 37b comprise second portions 32d to 32g, which are positioned in the same layer as the core portions 32a to 32c and comprise the same material as the core portions 32a to 32c. Hence, as indicated in the above-described fabrication method, the core portions 32a to 32c, first supporting portions 36a and 36b, and second supporting portions 37a and 37b are formed simultaneously on the main surface 2a of the substrate 2 in the etching process, and in the wavelength filter installation process the wavelength filter 4 is held in a predetermined position in a state of enclosure between the first supporting portions 36a, 36b and the second supporting portions 37a, 37b While in this state, an upper-layer cladding portion (second cladding layer) 33 comprising a resin is formed, so as to cover all of the core portions 32a to 32c, first supporting portions 36a and 36b, second supporting portions 37a and 37b, and wavelength filter 4.

Thus by means of the optical waveguide substrate 1a and method of fabricating the same according to the first embodiment, by using in common a mask 61 to form the core portions 32a to 32c, the first supporting portions 36a, 36b and second supporting portions 37a, 37b can also easily be formed. Moreover, in a state in which the wavelength filter 4 is held by these first supporting portions 36a, 36b and second supporting portions 37a, 37b, the upper-layer cladding portion (second cladding layer) 33 is formed. Hence the wavelength filter 4 can be suitably embedded within the upper-layer cladding portion (second cladding layer) 33 by means of a simple configuration (process), without the wavelength filter 4 being pushed out of position by resin even when for example the upper-layer cladding portion (second cladding layer) 33 is formed by spin coating. In this case, fabrication is easy, and an optical waveguide substrate is obtained which affords resistance to humidity and heat and which has high reliability. Further, in contrast with the conventional fabrication methods in which the wavelength filter 4 is fixed in a groove using adhesive, the wavelength filter 4 is covered with (embedded within) an upper-layer cladding portion (second cladding layer) 33, so that the surface of the optical waveguide substrate 1a can easily be made flat.

Further, in the optical waveguide substrate 1a according to the first embodiment, the first supporting portions 36a, 36b and second supporting portions 37a, 37b are positioned in the same layer as the core portions 32a to 32c (that is, the core layer 52 shown in FIG. 6A and FIG. 6B), and in addition comprise the same material as the core portions 32a to 32c. Hence as indicated in the above-described fabrication method (FIG. 7), the mask 61 used when forming the core portions 32a to 32c can be used without modification to form the first supporting portions 36a, 36b and second supporting portions 37a, 37b together with the core portions 32a to 32c. Thus by means of the optical waveguide substrate 1a and method of fabricating the same according to the first embodiment, the positioning precision of the first supporting portions 36a, 36b and second supporting portions 37a, 37b relative to the core portions 32a to 32c can be enhanced to be comparable to the dimensional precision during formation of the mask 61, so that the reflecting surface 4a of the wavelength filter 4 can be placed extremely precisely with respect to the core portions 32a to 32c.

Further, by means of the optical waveguide substrate 1a and method of fabricating the same according to the first embodiment, the wavelength filter 4 is covered by the upper-layer cladding portion 33 which covers the core portions 32a to 32c, so that the intrusion of dust and dirt into the gaps between the core portions 32a to 32c and the reflecting surface 4a of the wavelength filter 4 is prevented, and optical losses are effectively reduced. Also, these gaps are filled in the process in which the upper-layer cladding portion 33 is formed (second cladding layer formation process), so that a separate process to fill the gaps (for example, a process to apply a resin adhesive for refractive index adjustment) is unnecessary, and fabricating processes are simplified.

Further, by means of an optical waveguide substrate 1a which comprises a wavelength filter 4 which selectively reflects wavelength components of light propagating in the core portions 32a to 32c according to the wavelength, as in the first embodiment, an optical coupler/branch (optical coupler) which branches or couples light according to wavelength with minimal optical loss can be realized.

First Modified Example of the First Embodiment

Figure 11:
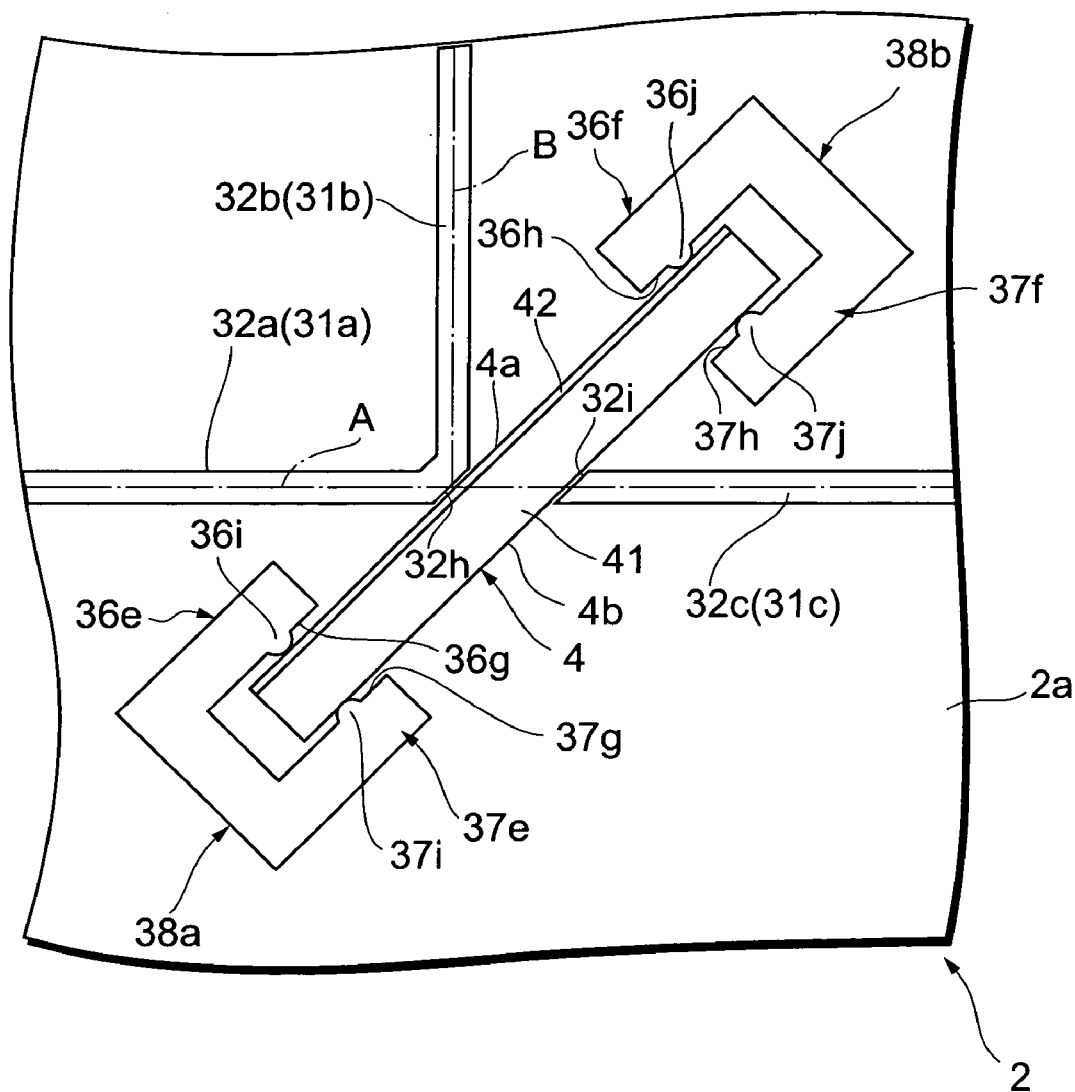
FIG. 11 is a plane view showing the configuration of a first modified example of the optical waveguide substrate according to the first embodiment.

FIG. 11 is a plane view showing the configuration of a first modified example of the optical waveguide substrate 1a according to the first embodiment. A difference of the first modified example with the above-described first embodiment is the shapes of the first and second supporting portions. In an optical waveguide substrate according to the present invention, the first and second supporting portions are not limited to those of the above-described first embodiment, and the wavelength filter 4 can be suitably enclosed and held with stability even when shapes such as those in this first modified example are used.

That is, the first supporting portions 36e, 36f in this first modified example have respective side faces 36g, 36h facing the reflecting surface 4a of the wavelength filter 4, and in addition have respective convex portions 36i, 36j protruding from the side faces 36g, 36h. The side faces 36g, 36h are first supporting surfaces in this first modified example. The reflecting surface 4a of the wavelength filter 4 makes contact with the tips of the convex portions 36i, 36j. Similarly, the second supporting portions 37e, 37f in this first modified example have respective side faces 37g, 37h facing the rear surface 4b of the wavelength filter 4, and have respective convex portions 37i, 37j protruding from the side faces 37g, 37h. The side faces 37g, 37h are second supporting surfaces in this first modified example. And, the rear surface 4b of the wavelength filter 4 is in contact with the tips of the convex portions 37i, 37j.

The convex portion 36i and the convex portion 37i are positioned so as to face each other to enclose the wavelength filter 4. The convex portion 36j and the convex portion 37j are positioned so as to face each other to enclose the wavelength filter 4. By means of this configuration, one end of the wavelength filter 4 is enclosed and held by the convex portion 36i and the convex portion 37i, while the other end of the wavelength filter 4 is enclosed and held by the convex portion 36j and the convex portion 37j. Further, the contact positions of the wavelength filter 4 with the first supporting portions 36e, 36f (that is, the contact positions between the reflecting surface 4a and the convex portions 36i, 36j), and the contact positions between the wavelength filter 4 and the second supporting portions 37e, 37f (that is, the contact positions between the rear surface 4b and the convex portions 37i, 37j) are placed so as to be opposed and enclosing the wavelength filter 4. By this means, the wavelength filter 4 is held with stability.

Further, in the first modified example, it is preferable that the distance between the convex portion 36i and the convex portion 37i (the distance between the convex portion 36j and the convex portion 37j) be set to be shorter than the thickness of the wavelength filter 4 along the direction perpendicularly intersecting the reflecting surface 4a (indicated by t in FIG. 3B). And, it is preferable that the wavelength filter 4 be press-fitted between the convex portion 36i and the convex portion 37i (between the convex portion 36j and the convex portion 37j). By this means, the wavelength filter 4 is firmly held by the first supporting portions 36e, 36f and the second supporting portions 37e, 37f.

Figure 12:
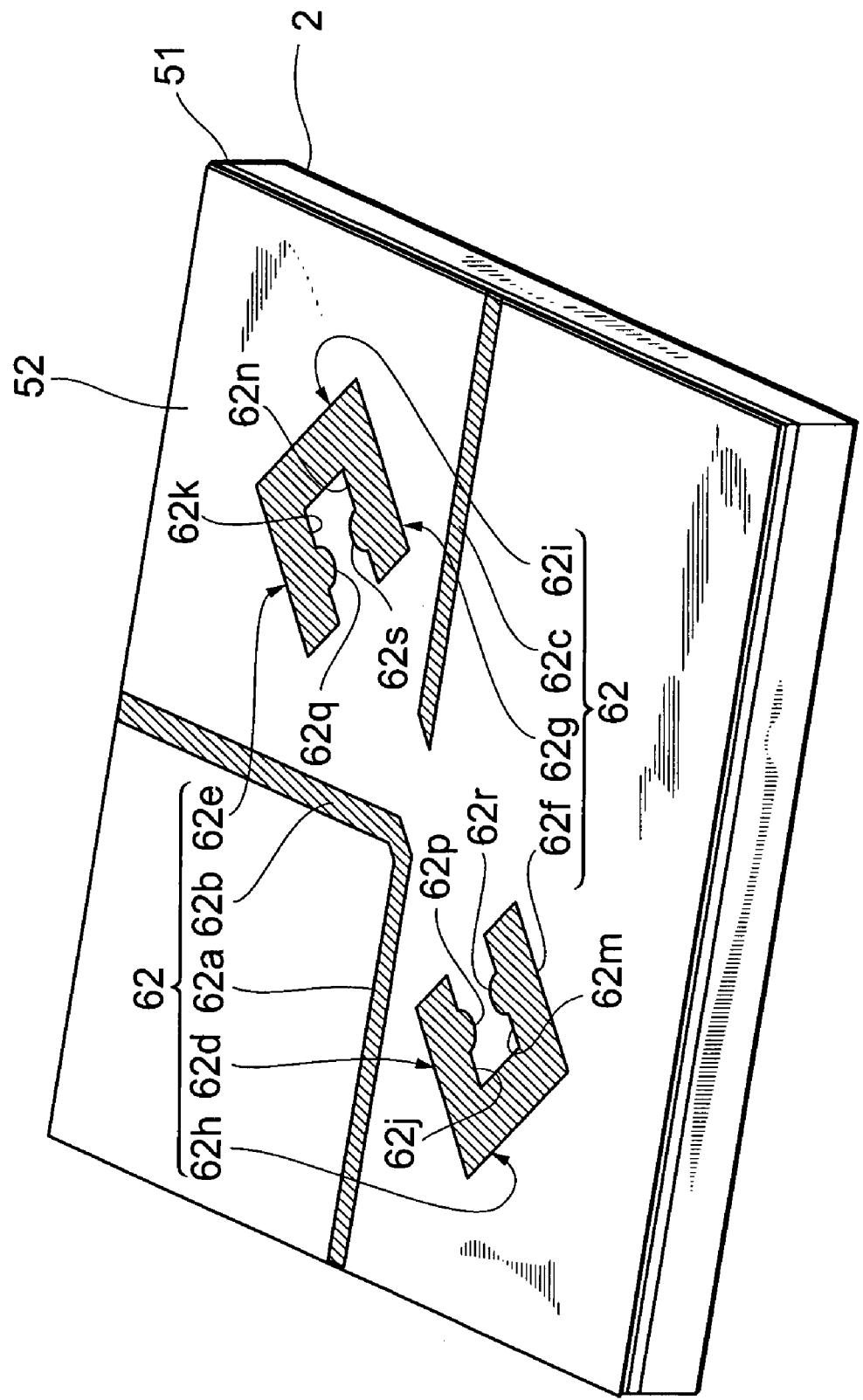
FIG. 12 is a perspective view showing the shape of a mask for the first and second supporting portions by etching, used in the fabrication process of the optical waveguide substrate according to the first modified example.

FIG. 12 is a perspective view showing the shape of a mask 62 used to form by etching the first supporting portions 36e, 36f and second supporting portions 37e, 37f used in fabrication processes of the optical waveguide substrate according to the first modified example. By using the mask 62 in place of the mask 61 (see FIG. 7) used in the above-described fabrication method, the first supporting portions 36e, 36f and second supporting portions 37e, 37f in the first modified example can easily be formed.

The mask 62 comprises mask portions 62a to 62c, having shapes according to the planar shapes (core patterns) of the core portions 32a to 32c respectively; mask portions 62d and 62e, having shapes according to the planar shapes of the first supporting portions 36e, 36f respectively; mask portions 62f, 62g, having shapes according to the planar shapes of the second supporting portions 37e, 37f respectively; and mask portions 62h, 62i, having shapes according to the planar shapes of the connecting portions 38a, 38b respectively. The mask portions 62d, 62e are formed so as to comprise edges 62j, 62k corresponding to the side faces 36g, 36h in the first supporting portions 36e, 36f. Similarly, the mask portions 62f, 62g are formed so as to comprise edges 62m, 62n corresponding to the side faces 37g, 37h in the second supporting portions 37e, 37f. The interval between edge 62j and edge 62m and the interval between edge 62k and edge 62n are set to be larger than the thickness t (see FIG. 3B) of the wavelength filter 4 along the direction perpendicularly intersecting the reflecting surface 4a. The mask portions 62d, 62e are formed so as to comprise convex portions 62p, 62q corresponding to the convex portions 36i, 36j in the first supporting portions 36e, 36f. Similarly, the mask portions 62f, 62g are formed so as to comprise convex portions 62r, 62s corresponding to the convex portions 37i, 37j in the second supporting portions 37e, 37f. The mask 62 is formed using for example ordinary photolithography techniques. As the mask material for the mask 62, for example, a resist or a metal thin film (Al, Ti, Cr, WSi, or similar) can be used.

Second Modified Example of the First Embodiment

Figure 13:
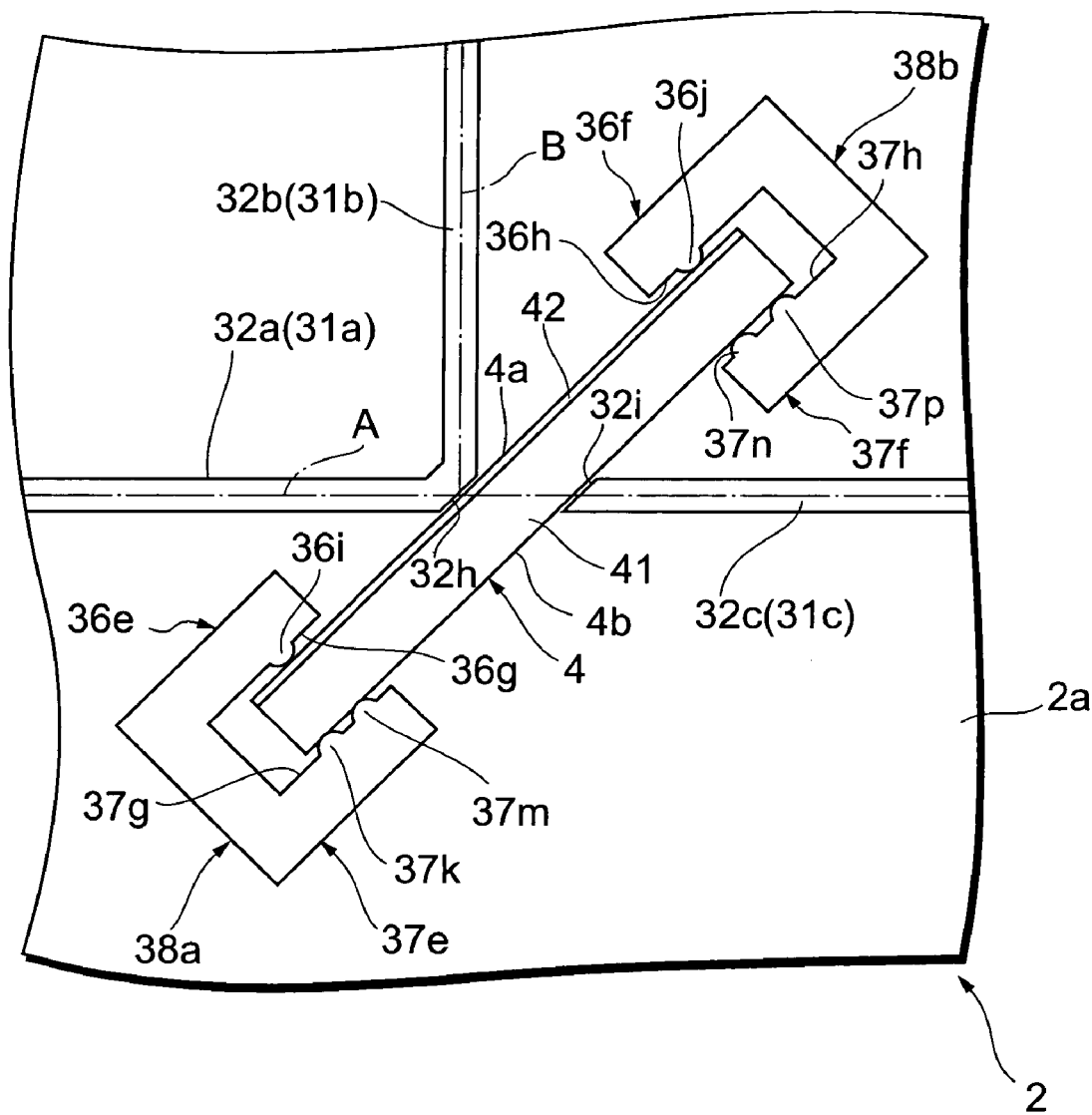
FIG. 13 is a plane view showing the configuration of a second modified example of the optical waveguide substrate according to the first embodiment.

FIG. 13 is a plane view showing the configuration of a second modified example of the optical waveguide substrate 1a according to the above first embodiment. A difference between this second modified example and the above-described first modified example is the placement of convex portions on the second supporting portions 37e, 37f. The first and second supporting portions in an optical waveguide substrate according to the present invention can suitably enclose and stably hold the wavelength filter 4 even when having the shapes of this second modified example.

That is, the second supporting portion 37e in this second modified example has two convex portions 37k, 37m protruding from the side face 37g. Similarly, the second supporting portion 37f has two convex portions 37n, 37p protruding from the side face 37h. And, the rear surface 4b of the wavelength filter 4 is in contact with the respective tips of the convex portions 37k, 37m, 37n, 37p.

The convex portions 37k, 37m of the second supporting portion 37e are positioned with respect to the convex portion 36i of the first supporting portion 36e so as to enclose the wavelength filter 4. And, the convex portions 37n, 37p of the second supporting portion 37f also are positioned with respect to the convex portion 36j of the first supporting portion 36f so as to enclose the wavelength filter 4. By means of this configuration, one end of the wavelength filter 4 is enclosed and held by the convex portion 36i and the convex portions 37k, 37m, and the other end of the wavelength filter 4 is enclosed and held by the convex portion 36j and the convex portions 37n, 37p. Further, the contact positions of the wavelength filter 4 and the first supporting portions 36e, 36f (that is, the contact positions between the reflecting surface 4a and the convex portions 36i, 36j), and the contact positions of the wavelength filter 4 and the second supporting portions 37e, 37f (that is, the contact positions between the rear surface 4b and the convex portions 37k, 37m, 37n, 37p), are positioned in alternation along the length direction of the wavelength filter 4. As a result, the wavelength filter 4 can easily be inserted between the first supporting portions 36e, 36f and the second supporting portion 37e, 37f.

Figure 14:
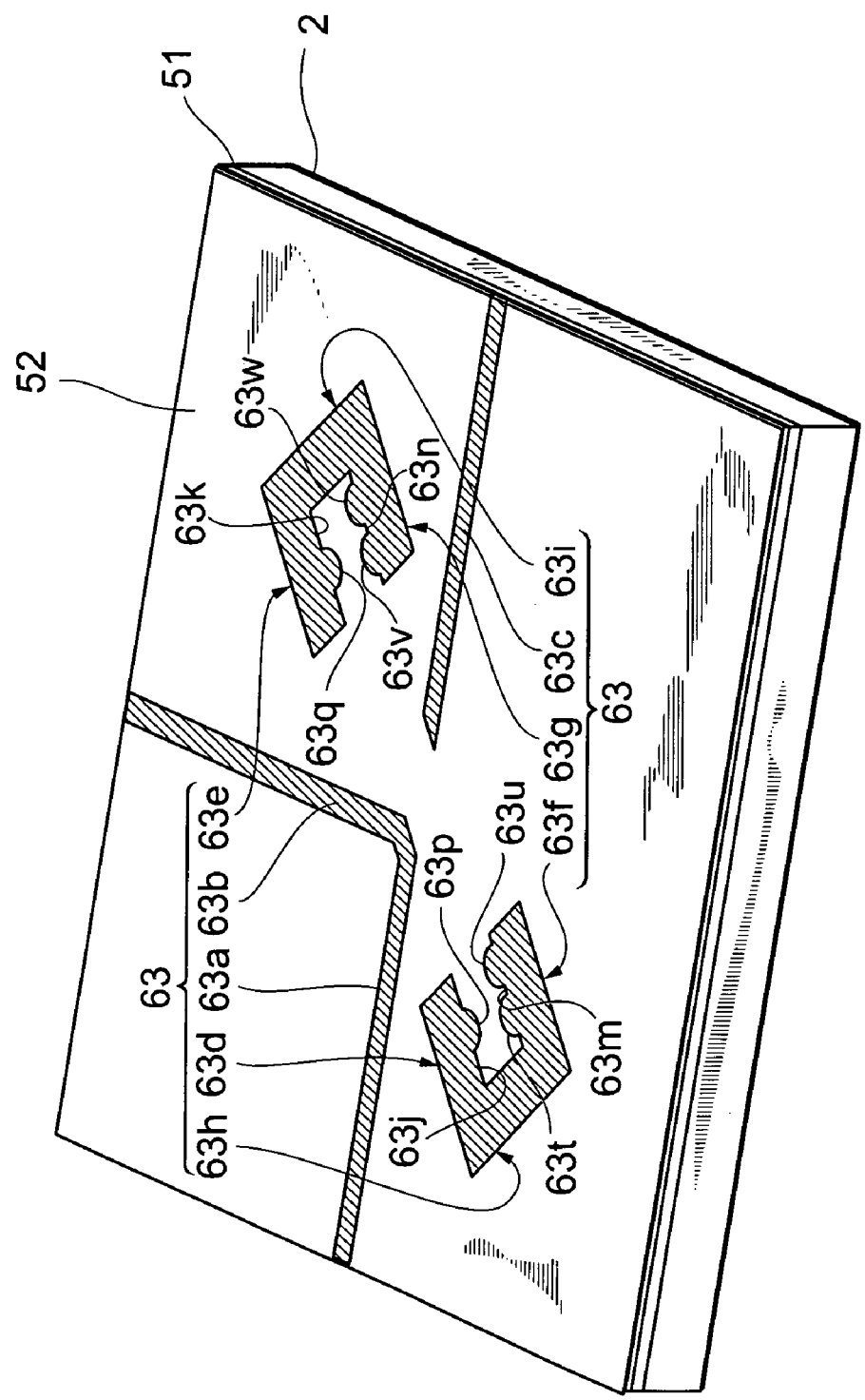
FIG. 14 is a perspective view showing the shape of a mask for forming the first and second supporting portions by etching, used in the fabrication process of the optical waveguide substrate according to the second modified example.

FIG. 14 is a perspective view showing the shape of a mask 63 to form by etching the first supporting portions 36e, 36f and the second supporting portions 37e, 37f, used in a fabrication process of the optical waveguide substrate according to the second modified example. The first supporting portions 36e, 36f and second supporting portions 37e, 37f in this second modified example are easily formed by using the mask 63 in place of the mask 61 (see FIG. 7) in the above-described fabrication method The mask 63 is formed so as to comprise mask portions 63a to 63c, having shapes according to the planar shapes (core patterns) of the respective core portions 32a to 32c; mask portions 63d and 63e, having shapes according to the planar shapes of the respective first supporting portions 36e, 36f; mask portions 63f, 63g, having shapes according to the planar shapes of the respective second supporting portions 37e, 37f, and mask portions 63h, 63i, having shapes according to the planar shapes of the respective connecting portions 38a, 38b. The mask portions 63d, 63e are formed so as to comprise edges 63j, 63k corresponding to the side faces 36g, 36h of the first supporting portions 36e, 36f. Similarly, the mask portions 63f, 63g are formed so as to comprise edges 63m, 63n corresponding to the side faces 37g, 37h of the second supporting portions 37e, 37f The interval between edge 63j and edge 63m and the interval between edge 63k and edge 63n are set to be larger than the thickness t (see FIG. 3B) of the wavelength filter 4 along the direction perpendicularly intersecting the reflecting surface 4a. The mask portions 63d, 63e are formed so as to comprise convex portions 63p, 63q corresponding to the convex portions 36i, 36j of the first supporting portions 36e, 36f. The mask portion 63f is formed so as to comprise convex portions 63t, 63u corresponding to the convex portions 37k, 37m of the second supporting portion 37e. Similarly, the mask portion 63g is formed so as to comprise convex portions 63v, 63w corresponding to the convex portions 37n, 37p of the second supporting portion 37f The mask 63 is for example formed using ordinary photolithography techniques. As the mask material for the mask 63, for example, a resist or a metal thin film (Al, Ti, Cr, WSi, or similar) can be used.

Third Modified Example of the First Embodiment

Figure 15:
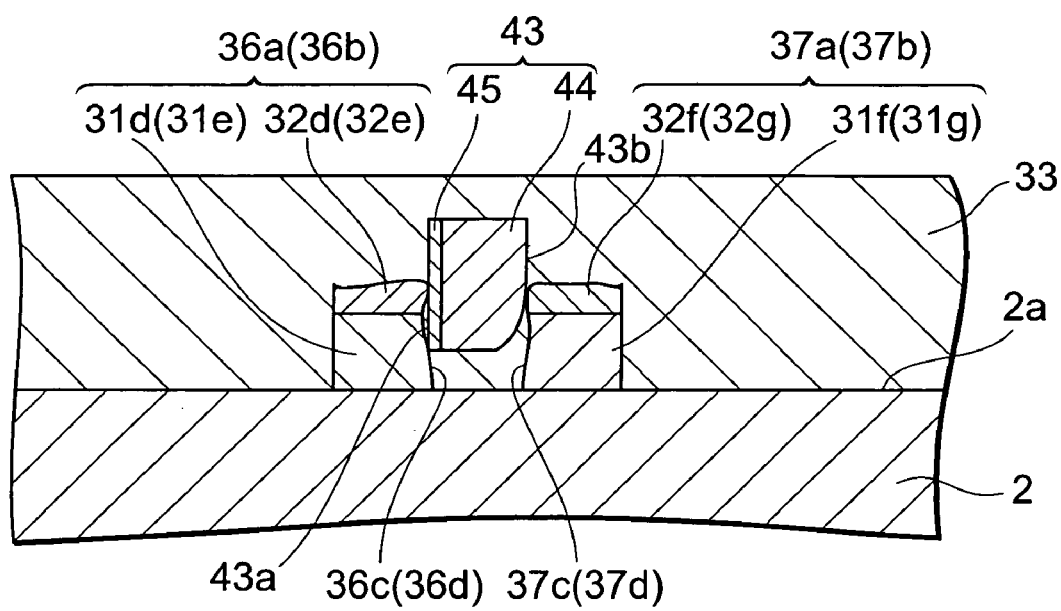
FIG. 15 shows the cross-sectional structure of a third modified example of the optical waveguide substrate according to the first embodiment.

FIG. 15 is a side cross-sectional view showing the configuration of a third modified example of the optical waveguide substrate 1a according to the first embodiment. FIG. 15 shows a cross-section equivalent to a cross-section along line IV-IV and line V-V of the optical waveguide substrate 1a shown in FIG. 2. A difference between this third modified example and the above-described first embodiment is the shape of the wavelength filter. The wavelength filter 43 in this third modified example has a reflecting surface 43a which selectively reflects light according to the wavelength, and a rear surface 43b on the opposite side from the reflecting surface 43a. The wavelength filter 43 is configured comprising a base portion 44 and a dielectric multilayer film 45 provided on the side of the reflecting surface 43a of the base portion 44.

In this third modified example, the wavelength filter 43 is formed in a tapered shape such that the thickness of the portion near the substrate 2 becomes smaller toward the substrate 2. In this case, the wavelength filter 43 can easily be inserted between the first supporting portions 36a, 36b and the second supporting portions 37a, 37b. Further, in this third modified example the reflecting surface 43a of the wavelength filter 43 is formed to be flat, and the region of the rear surface 43b of the wavelength filter 43 near the substrate 2 is inclined with respect to the reflecting surface 43a. In this case, by maintaining the flatness of the reflecting surface 43a, light is appropriately reflected, and the wavelength filter 43 can be formed into a tapered shape.

Second Embodiment

Next, a second embodiment of an optical waveguide substrate and a method of fabricating the same according to the present invention will be explained. FIGS. 16A to 16B and 17 to 20 are perspective views showing, in order processes in the fabrication of the optical waveguide substrate according to the second embodiment.

First, similarly to the optical waveguide substrate fabrication method according to the first embodiment, a substrate 2 having a main surface 2a is prepared, and a first cladding layer 51 and core layer 52 are formed on the main surface 2a (first cladding layer formation process and core layer formation process). In this second embodiment also, when a wafer larger than the substrate 2 is used, by forming the optical waveguide layer on the wafer and then cutting the wafer into chips, a plurality of optical waveguide substrates can be fabricated simultaneously.

Figure 16:
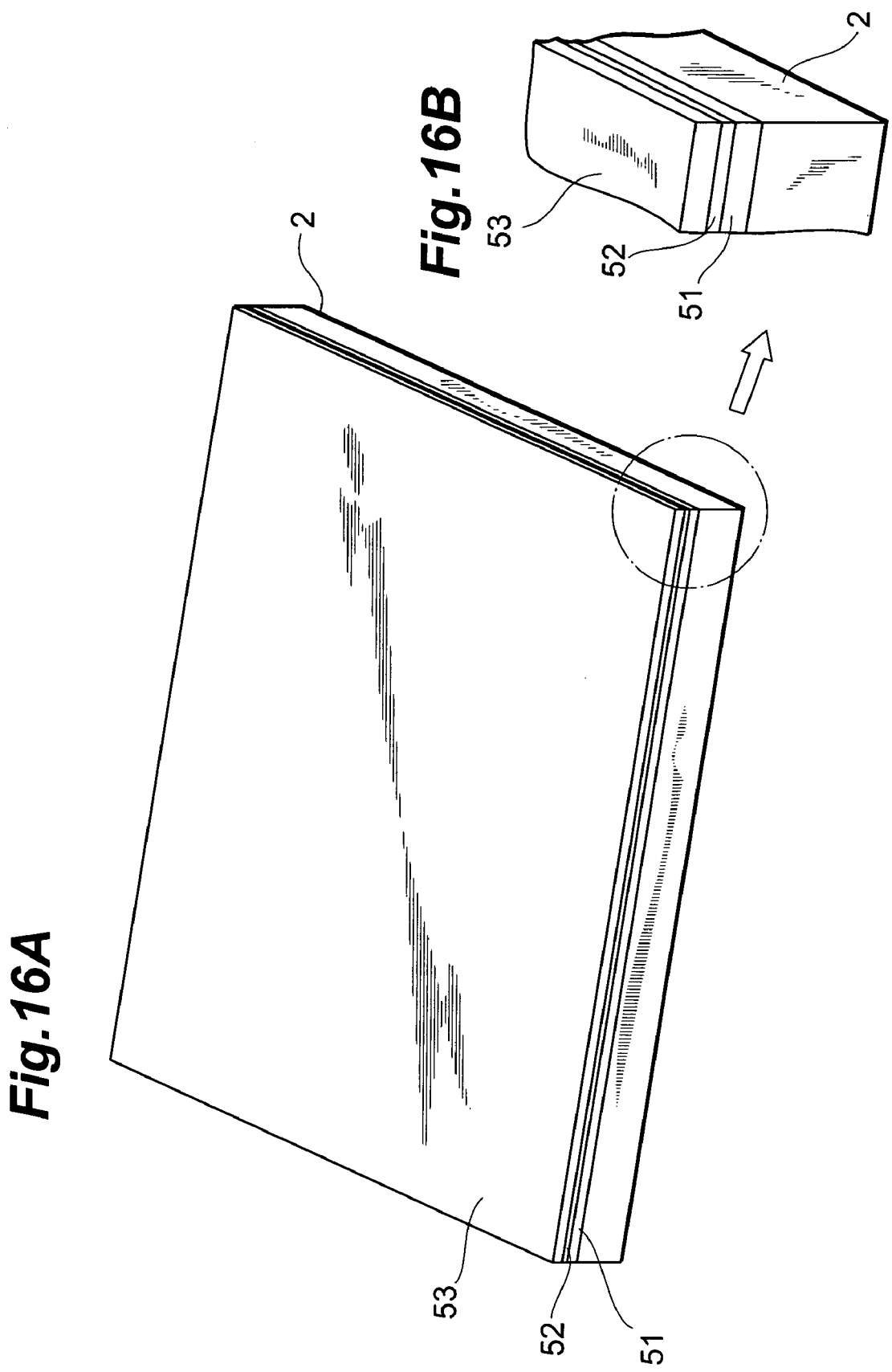
FIGS. 16A and 16B are perspective views for explaining fabrication processes of the optical waveguide substrate according to a second embodiment (Part 1)

Next, as shown in FIG. 16A and in FIG. 16B in which a portion of FIG. 16A in enlargement, a third cladding layer 53 is formed on the core layer 52. At this time, the material of the third cladding layer 53 is material with a refractive index lower than that of the core layer 52. When the material of the third cladding layer 53 is polyimide or another polymer, the third cladding layer 53 may be formed by application (preferably by spin coating) onto the core layer 52.

Figure 17:
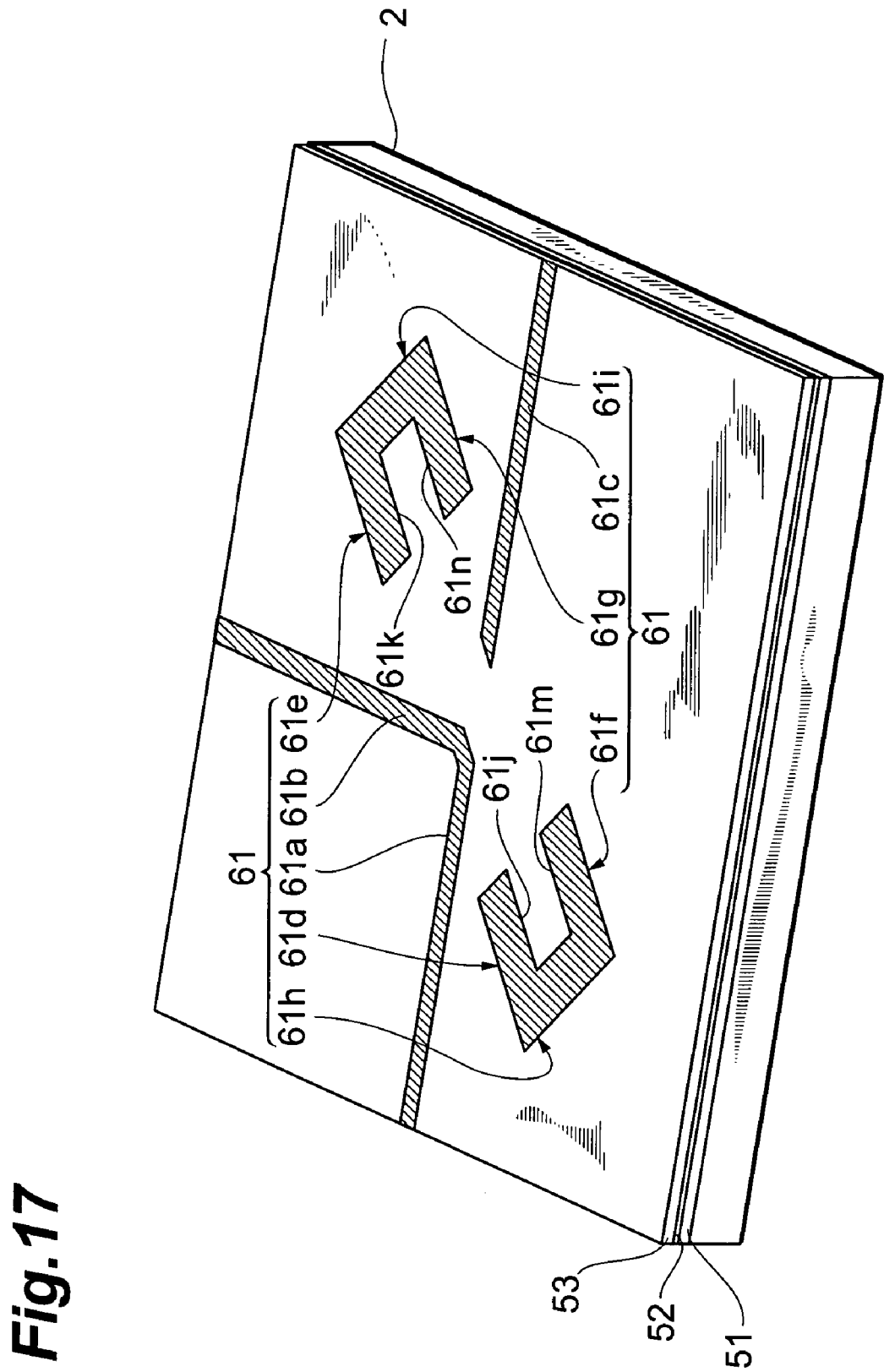
FIG. 17 is a perspective view for explaining fabrication processes of the optical waveguide substrate according to the second embodiment (Part 2)

Next, as shown in FIG. 17, a mask 61 is formed on the third cladding layer 53 (mask formation process). The shape and material of this mask 61 are similar to those of the mask 61 (see FIG. 7) in the above-described first embodiment, and the mask is formed using a similar method, and so a detailed explanation is here omitted.

Figure 18:
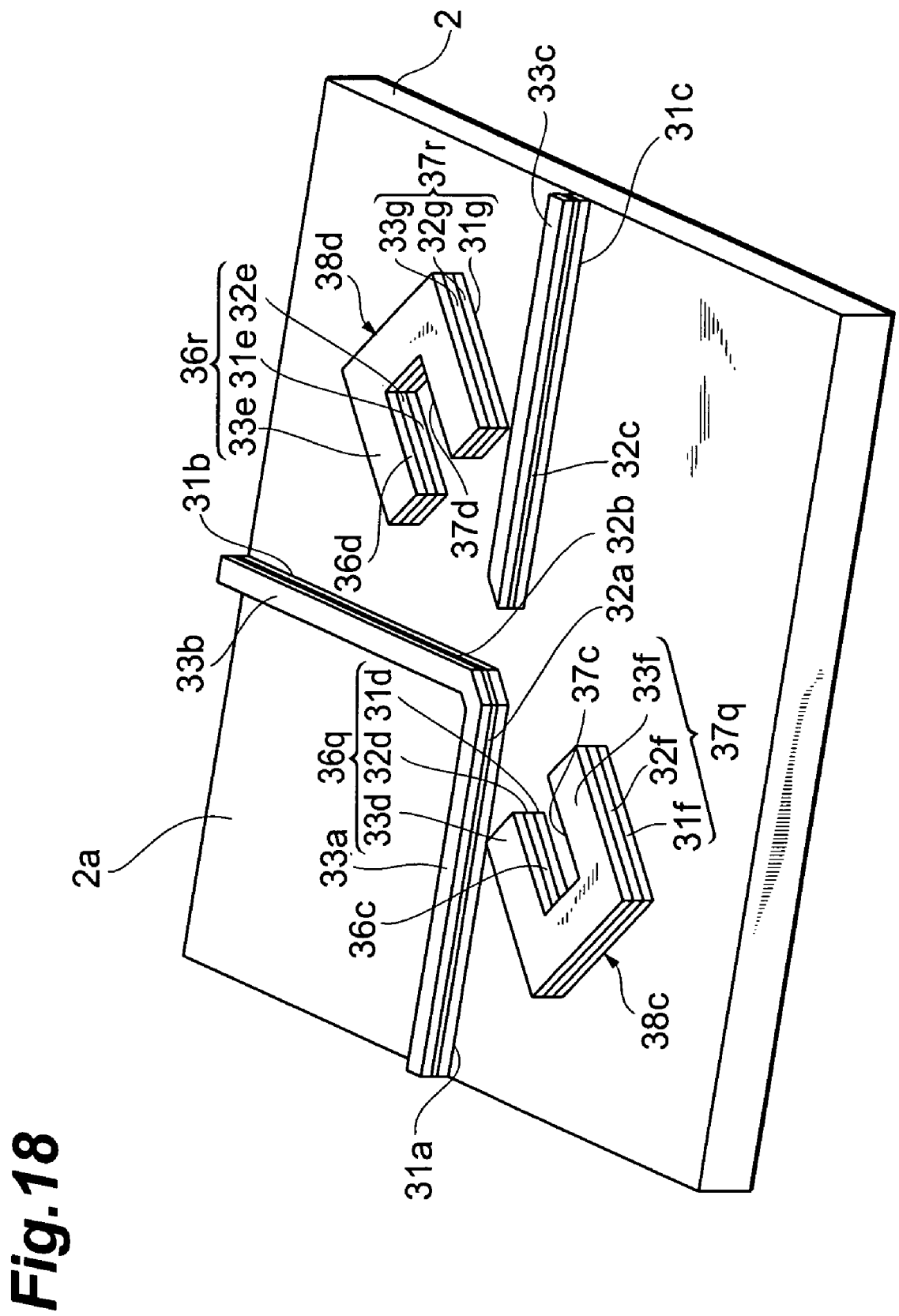
FIG. 18 is a perspective view for explaining fabrication processes of the optical waveguide substrate according to the second embodiment (Part 3)

Next, the mask 61 is used in etching of the third cladding layer 53, core layer 52, and first cladding layer 51. By this means, the lower-layer cladding portions 31a to 31c, core portions 32a to 32c, and a portion of the upper-layer cladding portions 33a to 33c are formed, and moreover a first supporting portion 36q comprising a first portion 31d, second portion 32d, and third portion 33d, stacked in order, a first supporting portion 36r comprising a first portion 31e, second portion 32e, and third portion 33e, stacked in order, a second supporting portion 37q comprising a first portion 31f, second portion 32f, and third portion 33f, stacked in order, and a second supporting portion 37r comprising a first portion 31g, second portion 32g, and third portion 33g, stacked in order, are formed, as shown in FIG. 18 (etching process). At this time, the side faces 36c and 36d of the respective first supporting portions 36q and 36r, and the side faces 37c and 37d of the respective second supporting portions 37q and 37r, are formed.

Figure 19:
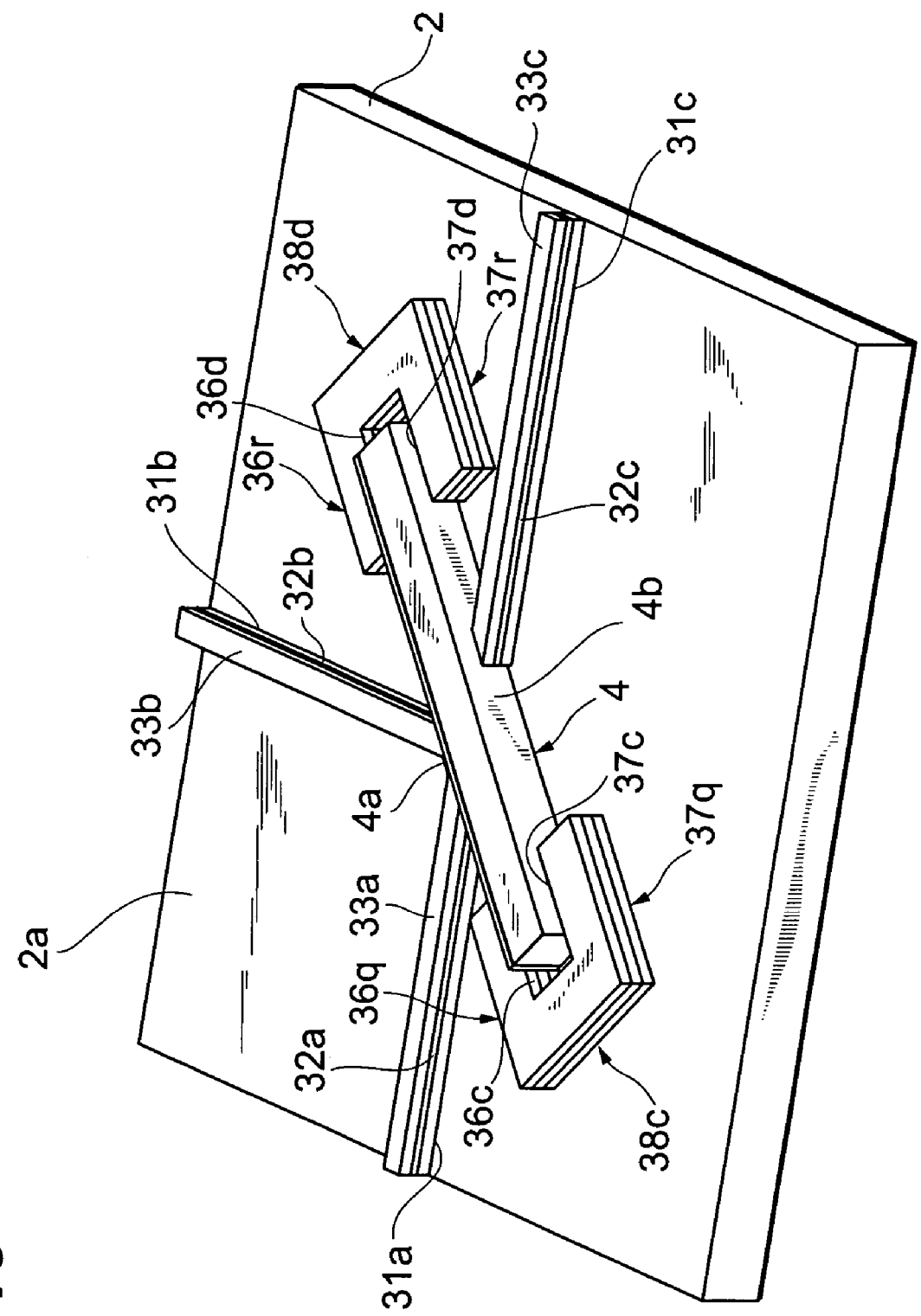
FIG. 19 is a perspective view for explaining fabrication processes of the optical waveguide substrate according to the second embodiment (Part 4)

Next, as shown in FIG. 19, the wavelength filter 4 is inserted between the first supporting portions 36q, 36r and the second supporting portions 37q, 37r (optical component installation process). At this time, if the interval between the side face 36c and the side face 37c and the interval between the side face 36d and the side face 37d are smaller than the thickness of the wavelength filter 4, the wavelength filter 4 is press-fitted between the first supporting portions 36q, 36r and the second supporting portions 37q, 37r.

Figure 20:
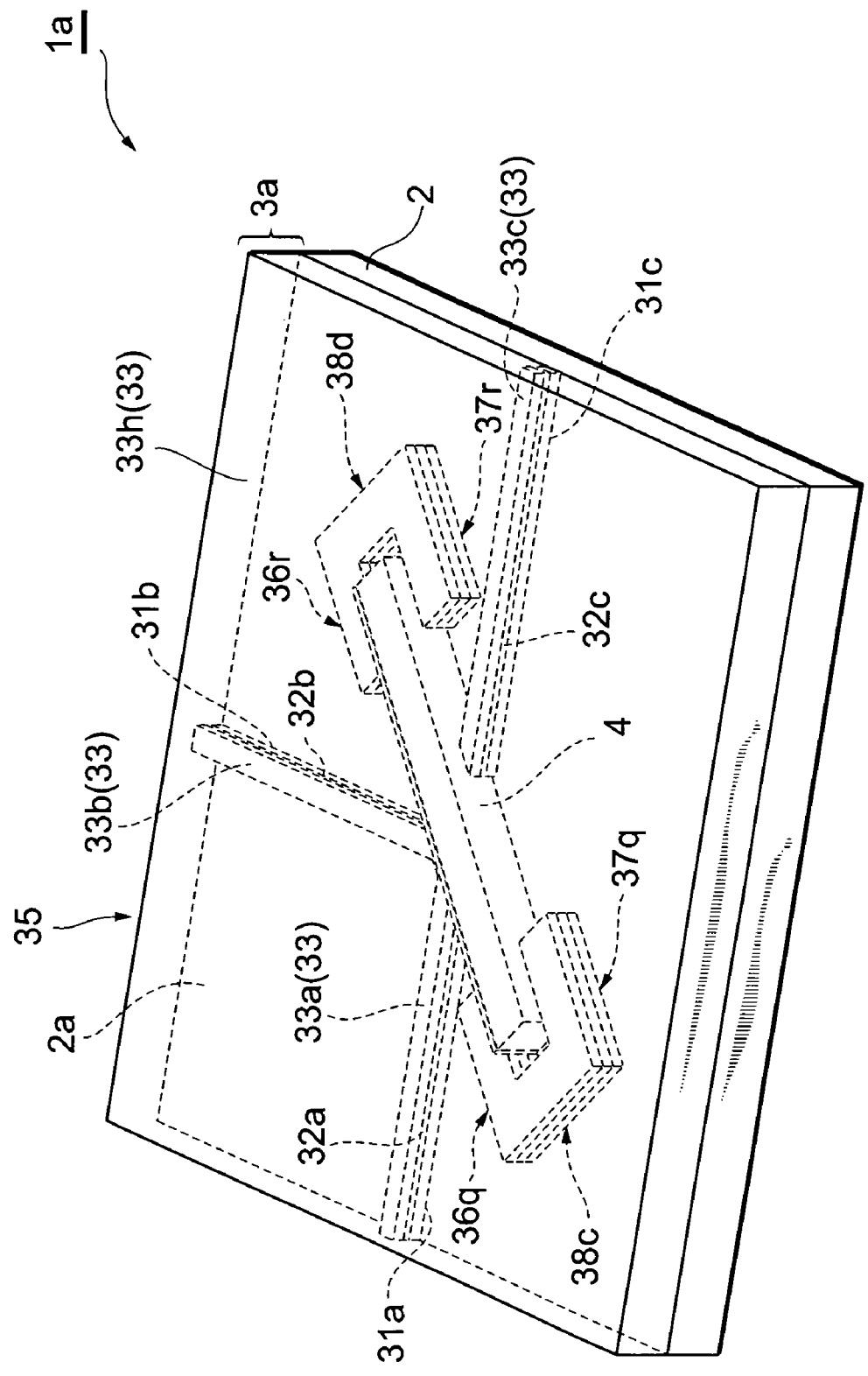
FIG. 20 is a perspective view for explaining fabrication processes of the optical waveguide substrate according to the second embodiment (Part 5)

Next, as shown in FIG. 20, the remaining portion 33h of the upper-layer cladding portion, comprising a resin with refractive index lower than that of the core portions 32a to 32c, is formed, and by this means the upper-layer cladding portion (second cladding layer) 33, comprising the portions 33a to 33c and 33h, is formed (second cladding layer formation process). At this time, the portion 33h of the upper-layer cladding portion 33 is formed so as to cover all of the main surface 2a, lower-layer cladding portions 31a to 31c, core portions 32a to 32c, first supporting portions 36q and 36r, second supporting portions 37q and 37r, and wavelength filter 4. By this means, the cladding portion 35, comprising the lower-layer cladding portions 31a to 31c and upper-layer cladding portion 33, is formed. When the material of the upper-layer cladding portion 33 is polyimide or another polymer, the portion 33h may be formed by application (preferably by spin coating).

By means of the above fabrication method also, an optical waveguide substrate 1a similar to that of the above-described first embodiment can be suitably fabricated. Further, in the optical waveguide substrate according to the second embodiment, similarly to the first embodiment, a wavelength filter 4 is enclosed between and held by first supporting portions 36q, 36r and second supporting portions 37q, 37r, so that when the remaining portion 33h of the upper-layer cladding portion 33 is applied and formed, the wavelength filter 4 is suitably held in the predetermined position.

Third Embodiment

Figure 21:
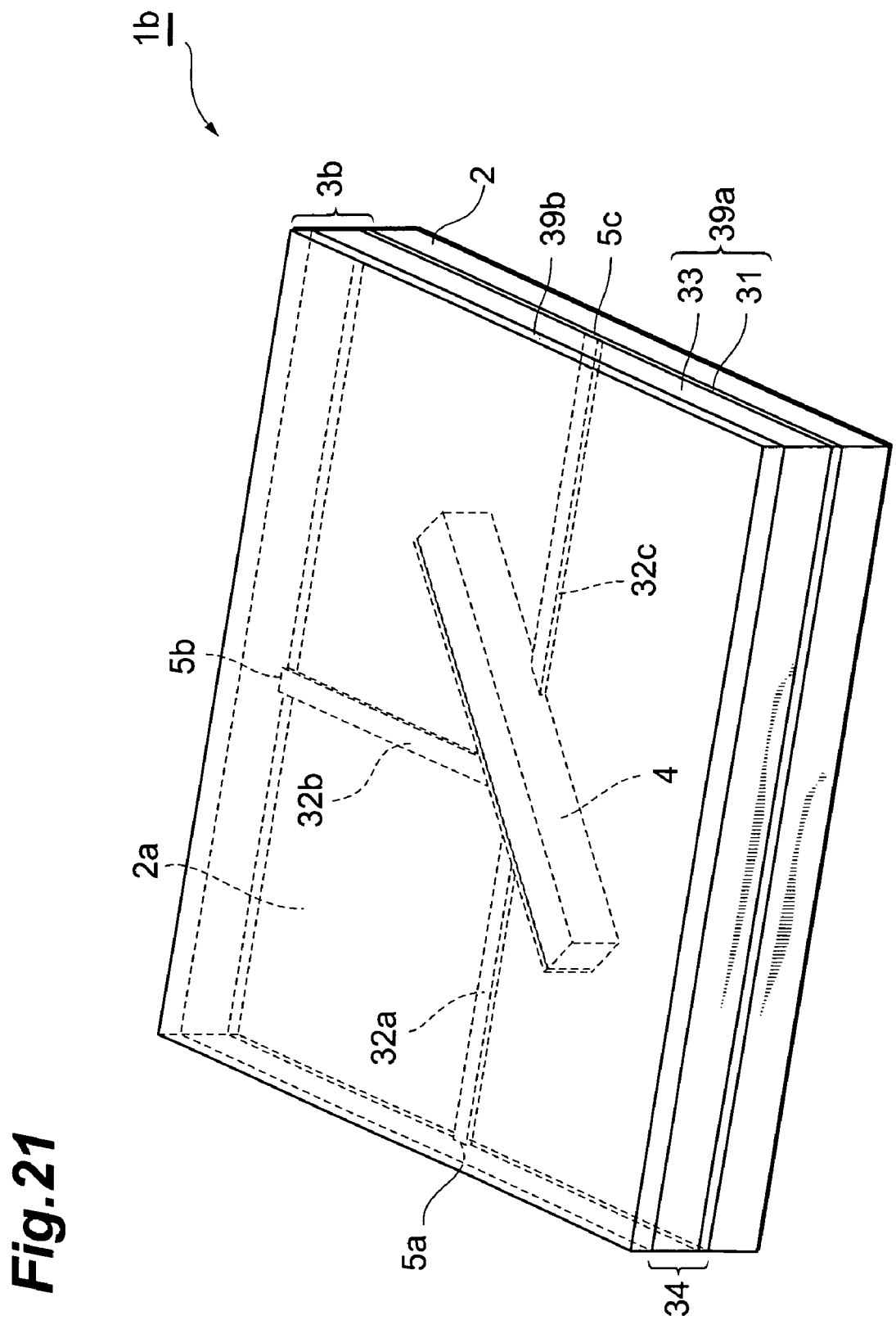
FIG. 21 is a perspective view showing the configuration of a third embodiment of an optical waveguide substrate according to the present invention.
Figure 22:
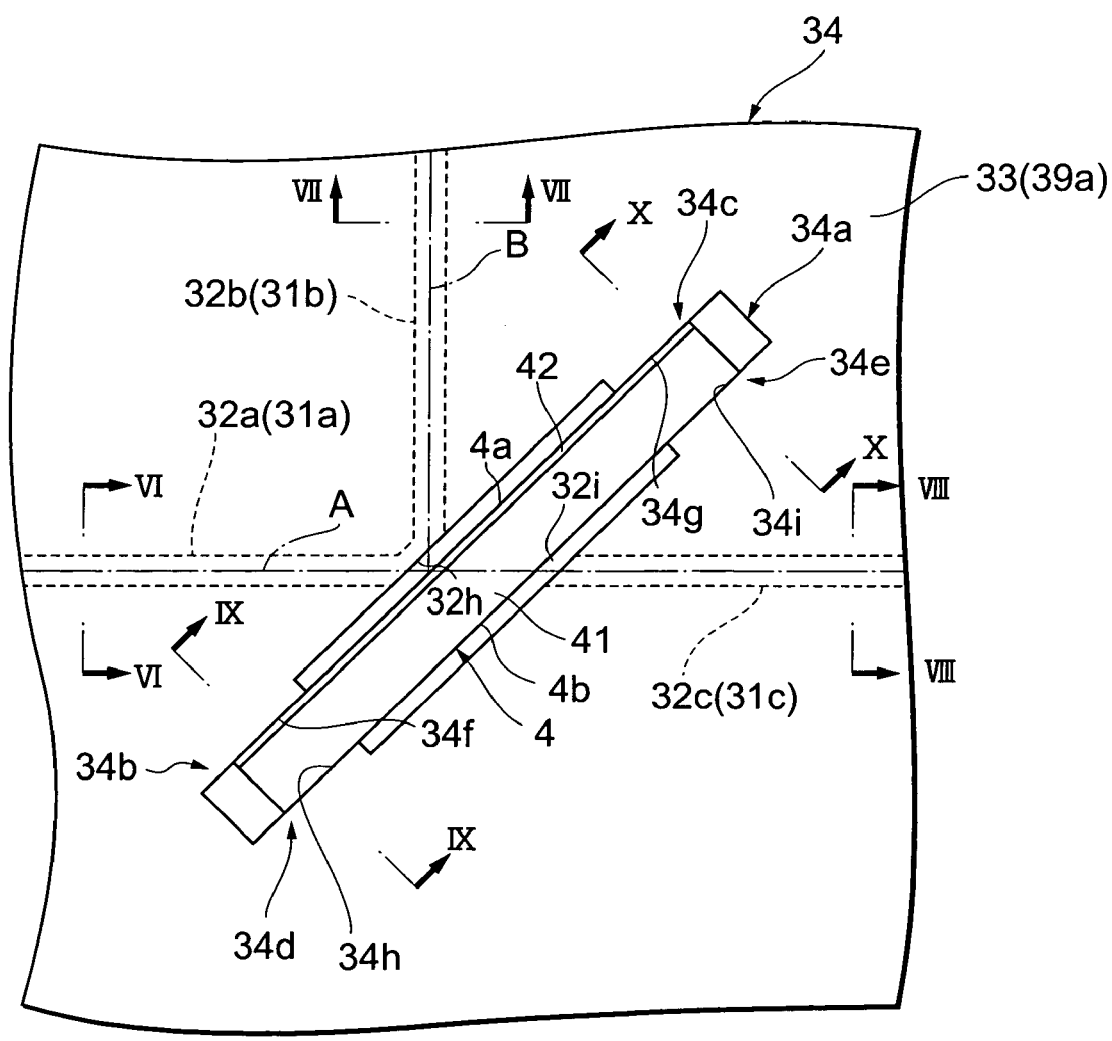
FIG. 22 is a plane view showing the configuration in the vicinity of the center portion of the optical waveguide substrate shown in FIG. 21.
Figure 23A:
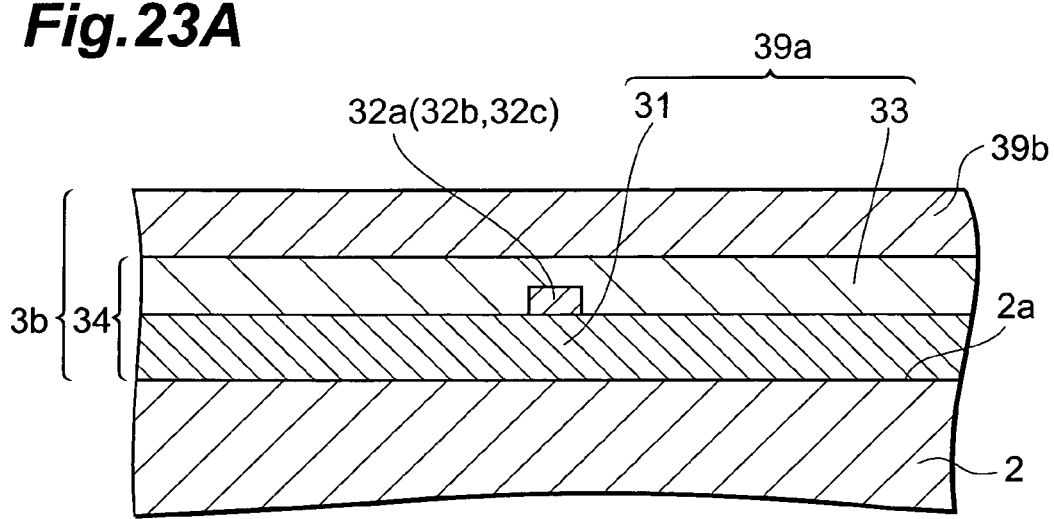
FIGS. 23A and 23B show the cross-sectional structure of the optical waveguide substrate shown in FIG. 22.
Figure 23B:
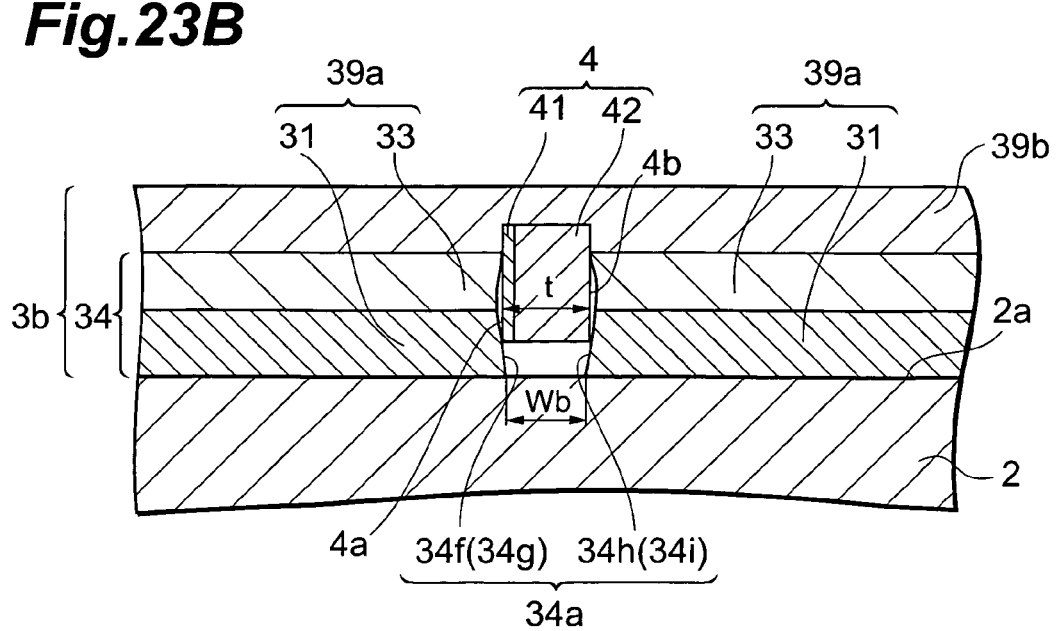

Next, a third embodiment of an optical waveguide substrate according to the present invention will be explained. FIG. 21 is a perspective view showing the configuration of the optical waveguide substrate 1b according to the third embodiment. FIG. 22 is a plane view showing the configuration in the vicinity of the center portion of the optical waveguide substrate 1b shown in FIG. 21. FIG. 23A shows the cross-sectional structure along line VI-VI, line VII-VII, and line VIII-VIII of the optical waveguide substrate 1b shown in FIG. 22. FIG. 23B shows the cross-sectional structure along line IX- IX and line X-X of the optical waveguide substrate 1*b* shown in FIG. 22. Similarly to the optical waveguide substrates 1*a* according to the first and second embodiments, the optical waveguide substrate 1*b* according to this third embodiment is also a so-called embedded-type optical waveguide substrate.

Referring to FIGS. 21 to 22 and 23A to 23B, the optical waveguide substrate 1*b* according to this third embodiment comprises a substrate 2, optical waveguide layer 3*b*, and wavelength filter 4. The substrate 2 and wavelength filter 4 respectively comprise materials similar to those in the first embodiment, and have similar shapes and configurations. The optical waveguide layer 3*b* is a layer comprising core portions 32*a* to 32*c* through which light propagates, and is provided on the main surface 2*a* of the substrate 2. The optical waveguide layer 3*b* comprises a resin, and for example comprises a polyimide or other polymer. In this case, the wavelength filter 4 can easily be embedded within the optical waveguide layer 3*b*. It is preferable that the optical waveguide layer 3*b* comprise a polyimide with high glass transition temperature and excellent heat resistance. By means of an optical waveguide layer 3*b* comprising a polyimide, the reliability of the optical waveguide layer 3*b* is maintained over a long period of time, and moreover can withstand soldering when mounting electronic devices or similar on the optical waveguide layer 3*b*. It is still more preferable that the optical waveguide layer 3*b* comprise a fluoride polyimide, in consideration of optical transmissivity, refractive index characteristics and similar.

The optical waveguide layer 3*b* has a laminated portion 34 formed on the main surface 2*a* of the substrate 2, and a second cladding portion 39*b* formed on the laminated portion 34. In order to explain the internal configuration of the optical waveguide layer 3*b*, in FIG. 22 the second cladding portion 39 is omitted.

The laminated portion 34 has a first cladding portion 39*a*, and core portions 32*a* to 32*c* with refractive indices higher than that of the first cladding portion 39*a*. It is preferable that the first cladding portion 39*a* and the second cladding portion 39*b* comprise materials with the same refractive index. The first cladding portion 39*a* is formed in a layer on the main surface 2*a* of the substrate 2, and the core portions 32*a* to 32*c* are covered by the first cladding portion 39*a*. The core portion 32*a* is a first core portion in the third embodiment, and extends in the direction along a predetermined optical axis A (see FIG. 22). The core portion 32*b* is a second core portion in the third embodiment, and extends in a direction along a predetermined optical axis B (see FIG. 22) which intersects the length direction of core portion 32*a* (that is, the direction of the optical axis A). One end of the core portion 32*a* is connected to one end of the core portion 32*b*, and the end face 32*h* (see FIG. 22) is an end face common to the core portions 32*a* and 32*b*. The other ends of the core portions 32*a* and 32*b* are exposed from the first cladding portion 39*a* at side faces of the optical waveguide substrate 1*b*, and are incident/emitting ends 5*a*, 5*b*. The core portion 32*c* is provided arranged in the direction along the predetermined optical axis A of the core portion 32*a*, and extends in the direction of the predetermined optical axis A. One end of the core portion 32*c* is an end face 32*i* (see FIG. 22) facing one end of the core portion 32*a*, with an predetermined interval therebetween. The other end of the core portion 32*c* is an optical incident/emitting end 5*c*, exposed from the first cladding portion 39*a* at a side face of the optical waveguide substrate 1*b*.

The first cladding portion 39*a* comprises a lower-layer cladding portion 31 and an upper-layer cladding portion 33. In the third embodiment, the lower-layer cladding portion 31 differs from the lower-layer cladding portions 31*a* to 31*c* of the first embodiment in being formed as a layer over the entirety of the main surface 2*a* of the substrate 2. The core portions 32*a* to 32*c* are provided on the lower-layer cladding portion 31. The upper-layer cladding portion 33 is formed as a layer over the entirety of the main surface 2*a*, so as to cover the core portions 32*a* to 32*c* and lower-layer cladding portion 31.

As shown in FIG. 22 and FIG. 23B, an optical component accommodating groove 34*a* to accommodate a wavelength filter 4 is formed in the first cladding portion 39*a* of the laminated portion 34. The optical component accommodating groove 34*a* is formed so as to traverse the interval between the core portions 32*a* and 32*b* and the core portion 32*c*. The wavelength filter 4 is inserted into the optical component accommodating groove 34*a* such that the reflecting surface 4*a* faces the end face 32*h* of the core portion 32*a* (32*b*), and the rear surface 4*b* faces the end face 32*i* of the core portion 32*c*. That is, the wavelength filter 4 is installed on the main surface 2*a* of the substrate 2 such that light propagating in the core portion 32*a* is reflected by the reflecting surface 4*a* into the core portion 32*b* (stated conversely, such that light propagating in the core portion 32*b* is reflected by the reflecting surface 4*a* into the core portion 32*a*).

The first cladding portion 39*a* has first supporting portions 34*b*, 34*c* and second supporting portions 34*d*, 34*e*, formed on the side faces of the optical component accommodating groove 34*a*, and which enclose therebetween and hold the wavelength filter 4. The first supporting portion 34*b* is formed on the side face, on the side of the core portions 32*a*, 32*b* at one end in the length direction, of the optical component accommodating groove 34*a*. The first supporting portion 34*c* is formed on the side face, on the side of the core portions 32*a*, 32*b* on the other end in the length direction, of the optical component accommodating groove 34*a*. The second supporting portion 34*d* is formed on the side face, on the side of the core portion 32*c* on one end in the length direction, of the optical component accommodating groove 34*a*. The second supporting portion 34*e* is formed on the side face, on the side of the core portion 32*c* on the other end in the length direction, of the optical component accommodating groove 34*a*. And, one end of the optical component accommodating groove 34*a* is narrowed by the first supporting portion 34*b* and second supporting portion 34*d*, while the other end of the optical component accommodating groove 34*a* is narrowed by the first supporting portion 34*c* and second supporting portion 34*e*. The first supporting portions 34*b*, 34*c* respectively have side faces 34*f*, 34*g* in contact with the reflecting surface 4*a* of the wavelength filter 4. The side faces 34*f*, 34*g* are first contact surfaces in the third embodiment. The second supporting portions 34*d*, 34*e* respectively have side faces 34*h*, 34*i* in contact with the rear surface 4*b* of the wavelength filter 4. The side faces 34*h*, 34*i* are second contact surfaces in the third embodiment.

The side face 34*f* and side face 34*h* are placed in opposition enclosing the wavelength filter 4. Similarly, the side face 34*g* and side face 34*i* are placed in opposition enclosing the wavelength filter 4. By means of this configuration, one end of the wavelength filter 4 is enclosed and held by the side face 34*f* and side face 34*h*, and the other end of the wavelength filter 4 is enclosed and held by the side face 34*g* and side face 34*i*. The contact positions between the wavelength filter 4 and the first supporting portions 34*b*, 34*c* (that is, the contact positions between the reflecting surface 4*a* and the side faces 34*f*, 34*g*), and the contact positions between the wavelength filter 4 and the second supporting portions 34*d*, 34*e* (that is, the contact positions between the rear surface 4*b* and the side faces 34*h*, 34*i*), are arranged so as to face each other enclosing the wavelength filter 4. In this way the wavelength filter 4 can be stably held. The position and angle of the reflecting surface 4a of the wavelength filter 4 is governed by the side faces 34f, 34g and the side faces 34h, 34i.

Here, as shown in FIG. 23B, in the third embodiment the interval between the side face 34f and the side face 34h (the interval between side faces 34g and 34i) Wb is set to be smaller than the thickness t of the wavelength filter 4 in the direction perpendicularly intersecting the reflecting surface 4a. The wavelength filter 4 is press-fitted between the side face 34f and side face 34h (between the side faces 34g and 34i). Hence the wavelength filter 4 is held firmly by the first supporting portions 34b, 34c and second supporting portions 34d, 34e.

In the third embodiment, the optical waveguide layer 3b comprises a polyimide or other polymer, and the first supporting portions 34b, 34c and second supporting portions 34d, 34e formed in the first cladding portion 39a also similarly comprise a polyimide or other polymer. By thus having the first supporting portions 34b, 34c and second supporting portions 34d, 34e comprise a polymer which is a comparatively soft material, damage to the wavelength filter 4 at the time of insertion of the wavelength filter 4 between the first supporting portions 34b, 34c and second supporting portions 34d, 34e (and in particular damage to the reflecting surface 4a) is reduced. Further, when the material of the wavelength filter 4 is also a polyimide or other polymer, damage to the wavelength filter 4 at the time of insertion of the wavelength filter 4 is further reduced.

The second cladding portion 39b is formed as a layer on the laminated portion 34, and covers the reflecting surface 4a, rear surface 4b, side faces 4c, and top face of the wavelength filter 4. Hence the gap between the reflecting surface 4a and the end face 32h, and the gap between the rear surface 4b and the end face 32i, are filled with the constituent material of the second cladding portion 39b. The second cladding portion 39b comprises a polyimide or other polymer; it is preferable that the second cladding portion 39b comprise material with the same refractive index as the first cladding portion 39a.

When the optical waveguide layer 3b comprises a polyimide or other polymer, upon heat-curing of the optical waveguide layer 3b, the optical waveguide layer 3b shrinks; hence it is preferable, in order to match thermal expansion coefficients, that the wavelength filter 4 also comprise the same polyimide or other polymer as the optical waveguide layer 3b. In this case, positional shifts between the core portions 32a, 32b, and 32c and the wavelength filter 4 due to shrinkage at the time of curing of the optical waveguide layer 3b (and in particular the second cladding portion 39b) can be effectively suppressed. It is still more preferable that the wavelength filter 4 and second cladding portion 39b comprise the same type of material. For example, when the second cladding portion 39b comprises a polymer the base compound of which is a fluoride polyimide, it is preferable that the wavelength filter 4 also comprise a polymer the base compound of which is a fluoride polyimide.

A method of fabricating an optical waveguide substrate 1b with the structure described above will be explained. FIGS. 24 to 30 are perspective views showing in order fabrication processes of the optical waveguide substrate 1b according to the third embodiment.

First, similarly to the method of fabricating the optical waveguide substrate 1a according to the above-described first embodiment, a substrate 2 having a main surface 2a is prepared, and a first cladding layer 51 comprising a resin (preferably comprising a polyimide or other polymer), and a core layer 52 with refractive index higher than that of the first cladding layer 51, are formed on the main surface 2a. In the third embodiment also, when a wafer larger than the substrate 2 is used, by forming the optical waveguide layer on the wafer and then cutting the wafer into chips, a plurality of optical waveguide substrates can be fabricated simultaneously.

Figure 24:
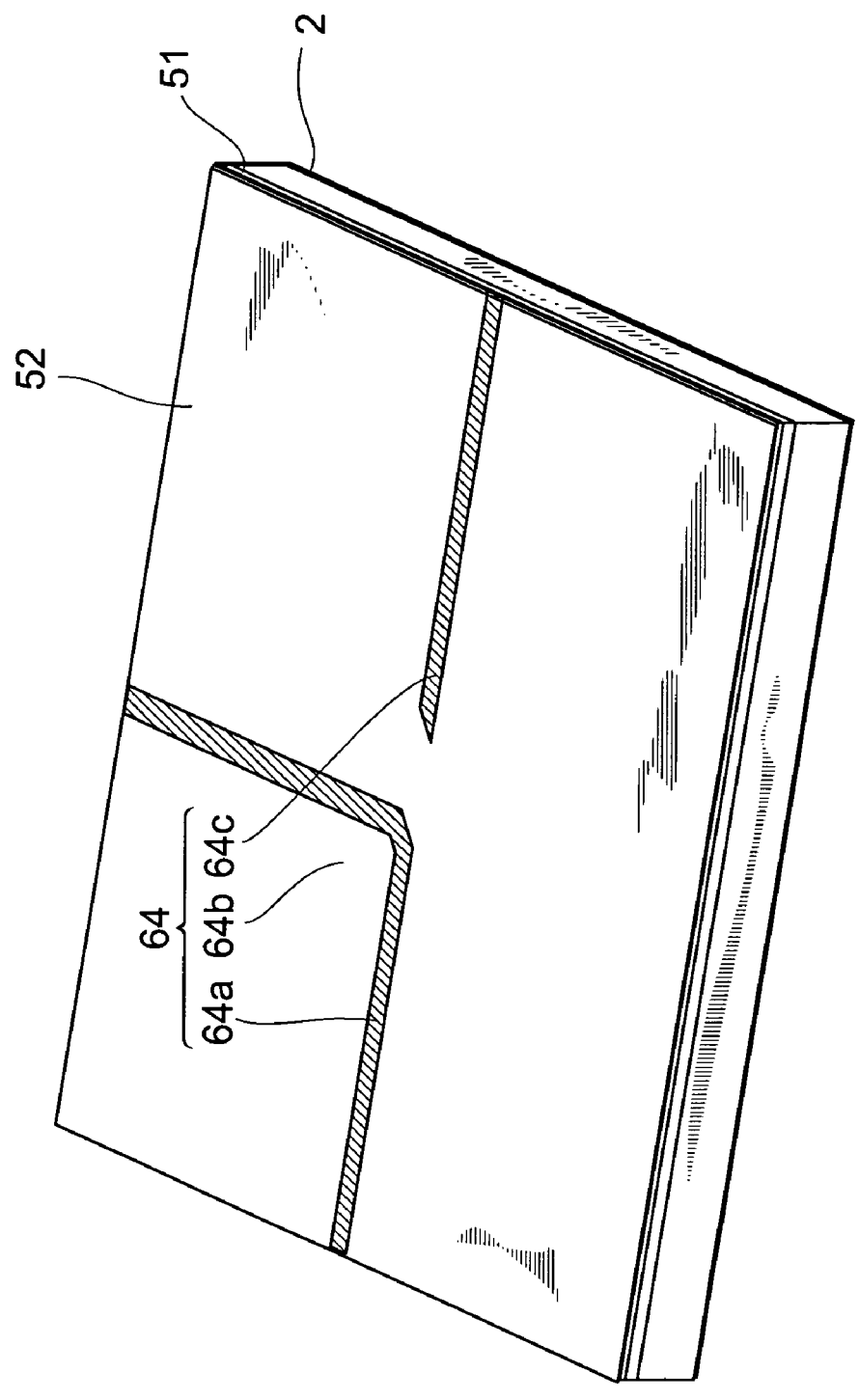
FIG. 24 is a perspective view for explaining fabrication processes of the optical waveguide substrate according to the third embodiment (Part 1)

Next, as shown in FIG. 24, a mask 64 is formed on the core layer 52 (first mask formation process). This mask 64 is formed so as to comprise mask portions 64a to 64c having shapes according to the respective planar shapes (core patterns) of the core portions 32a to 32c shown in FIG. 21 and FIG. 22. In this process, the mask 64 may for example be formed using ordinary photolithography techniques. As the mask material of the mask 64, for example, a resist or a metal thin film (Al, Ti, Cr, WSi, or similar) can be used.

Figure 25:
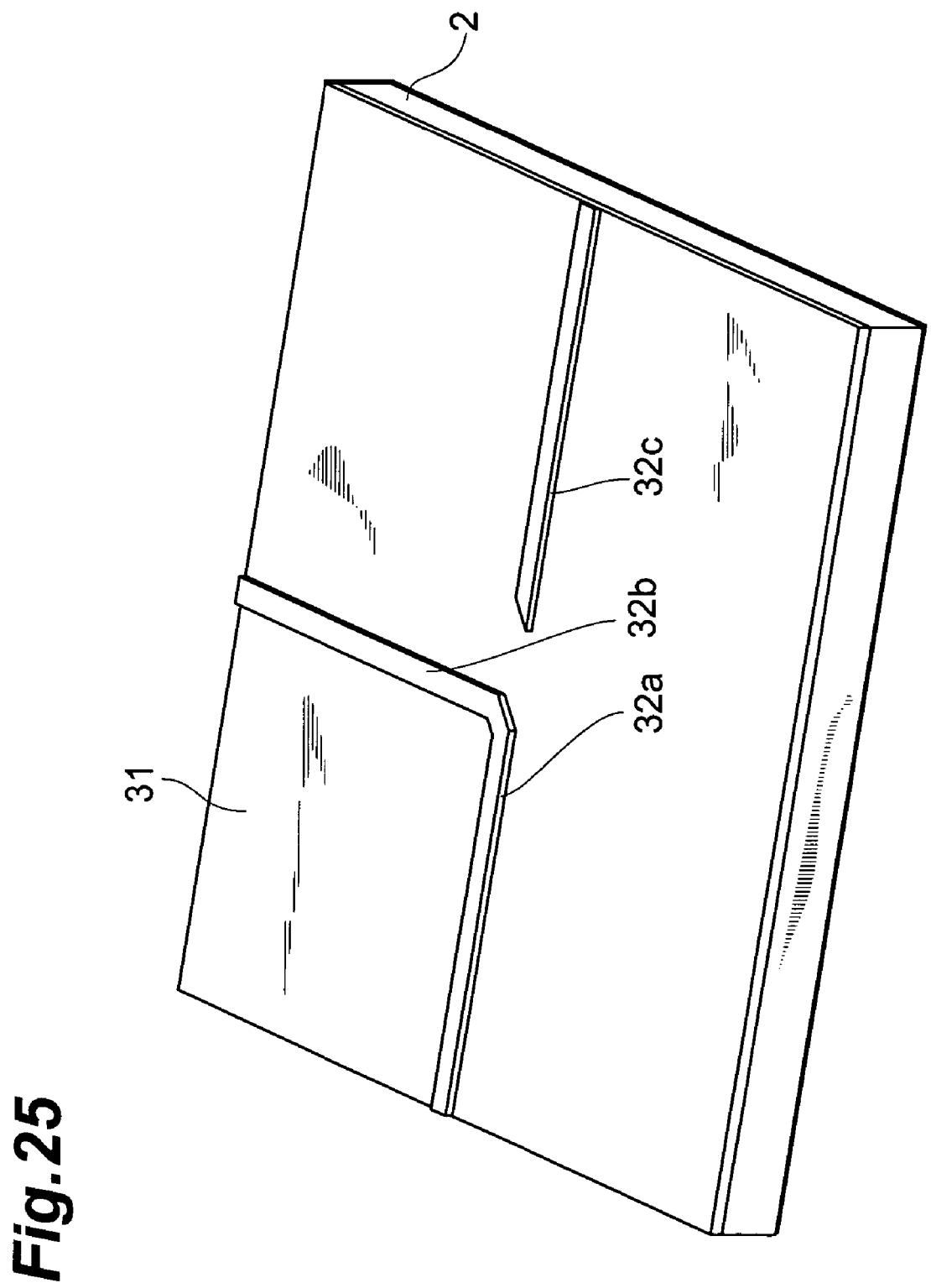
FIG. 25 is a perspective view for explaining fabrication processes of the optical waveguide substrate according to the third embodiment (Part 2)

Next, the mask 64 is used to perform etching of the core layer 52, to form the core portions 32a to 32c as shown in FIG. 25 (first etching process). In the third embodiment, etching of the core layer 52 differs from that of the first embodiment in that etching is halted when the surface of the first cladding layer 51 is exposed. In this case, the first cladding layer 51 functions as a layer-shape lower-layer cladding portion 31. In this process, it is preferable that the core layer 52 be etched using dry etching.

Figure 26:
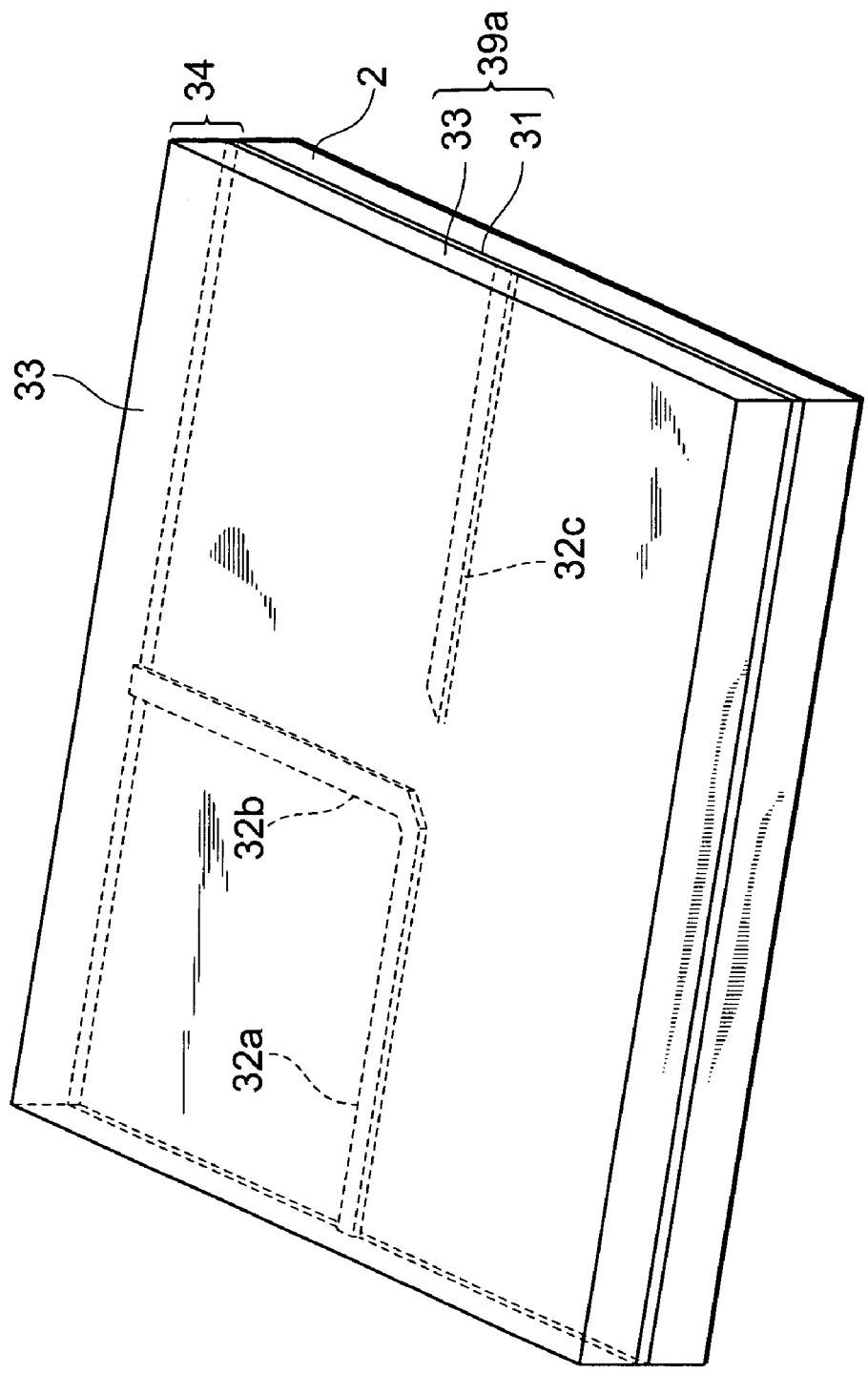
FIG. 26 is a perspective view for explaining fabrication processes of the optical waveguide substrate according to the third embodiment (Part 3)

Next, as shown in FIG. 26, an upper-layer cladding portion 33, comprising a resin with refractive index lower than that of the core portions 32a to 32c, is formed. At this time, the upper-layer cladding portion 33 is formed as a layer so as to cover the lower-layer cladding portion 31 and core portions 32a to 32c. As a result, a first cladding portion 39a, comprising the lower-layer cladding portion 31 and upper-layer cladding portion 33, is formed, and in addition a laminated portion 34, comprising the first cladding portion 39a and core portions 32a to 32c is formed. When the upper-layer cladding portion 33 comprises a polyimide or other polymer, the upper-layer cladding portion 33 may be formed by application (preferably by spin coating).

Figure 27:
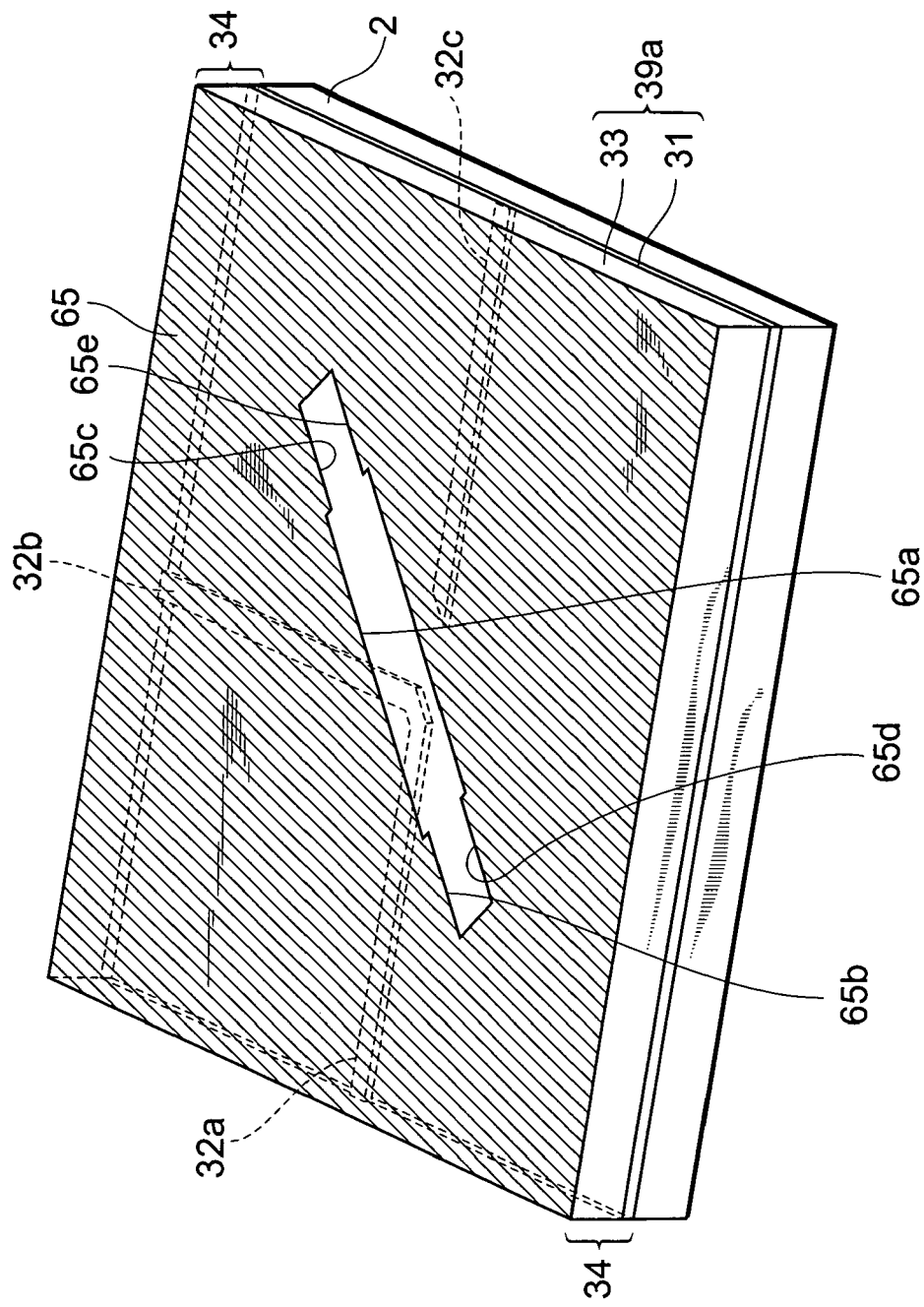
FIG. 27 is a perspective view for explaining fabrication processes of the optical waveguide substrate according to the third embodiment (Part 4)

Next, as shown in FIG. 27, a mask 65 is formed on the laminated portion 34 (second mask formation process). This mask 65 is formed so as to comprise an opening 65a according to the planar shape of the optical component accommodating groove 34a, as shown in FIG. 21 and FIG. 22. The edges of this opening 65a comprise the edges 65b, 65c corresponding to the side faces 34f, 34g of the respective first supporting portions 34b, 34c and the edges 65d and 65e corresponding to the side faces 34h, 34i of the respective second supporting portions 34d, 34e. The interval between the edges 65b and 65d and the interval between the edges 65c and 65e are set to be shorter than the thickness t (see FIG. 23) of the wavelength filter 4 in the direction perpendicularly intersecting the reflecting surface 4a. In this process, the mask 65 may for example be formed using ordinary photolithography techniques. As the mask material of the mask 65, for example, a resist or a metal thin film (Al, Ti, Cr, WSi, or similar) can be used.

Figure 28:
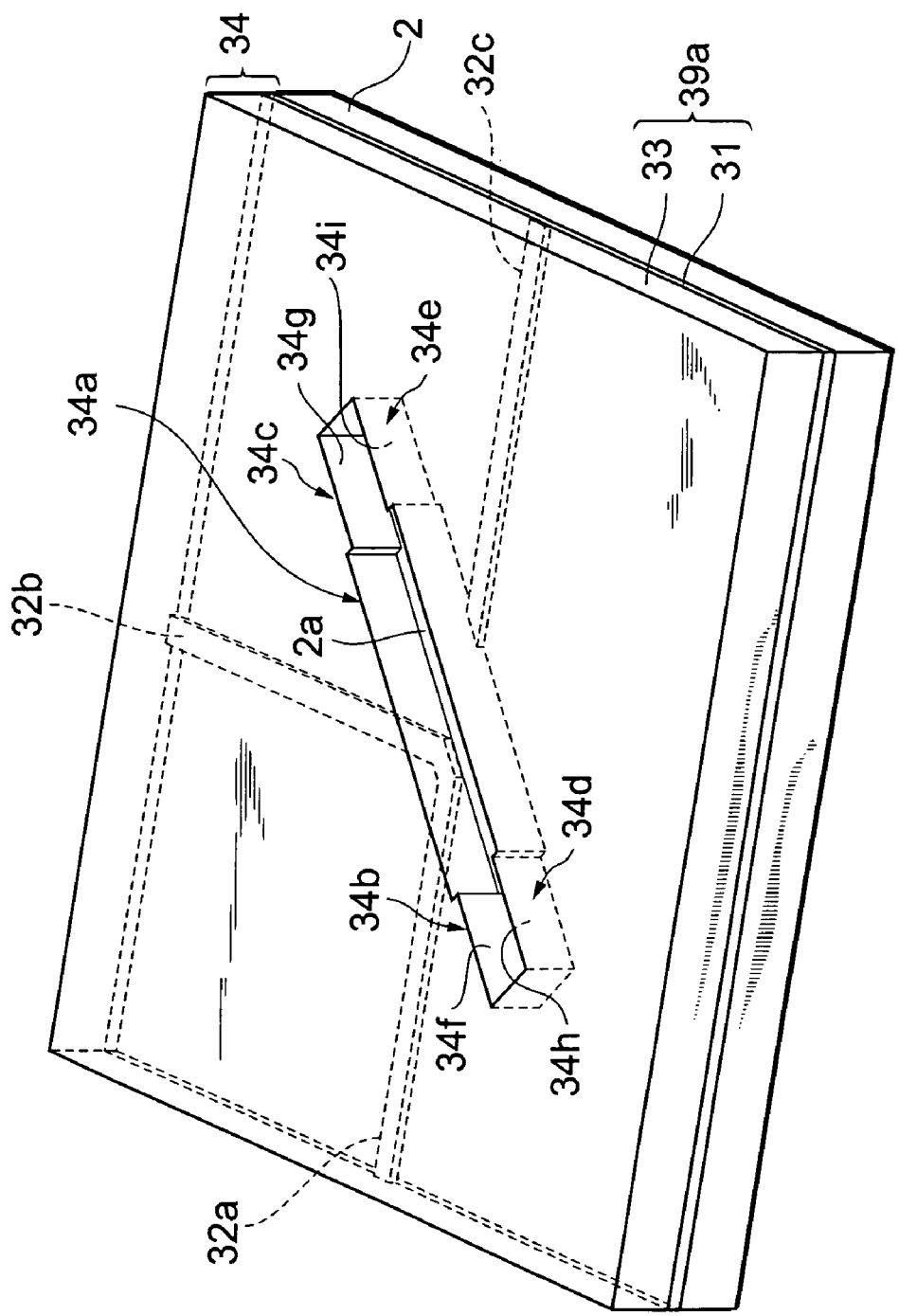
FIG. 28 is a perspective view for explaining fabrication processes of the optical waveguide substrate according to the third embodiment (Part 5)

Next, the mask 65 is used to perform etching of the first cladding portion 39a of the laminated portion 34, and by this means the optical component accommodating groove 34a is formed, as shown in FIG. 28. Simultaneously with this, the first supporting portions 34b, 34c having respective side faces 34f, 34g to make contact with the reflecting surface 4a of the wavelength filter 4, and second supporting portions 34d, 34e having side faces 34h, 34i to make contact with the rear surface 4b of the wavelength filter 4, are formed (second etching process). In this process, it is preferable that etching of the first cladding portion 39a of the laminated portion 34 be performed using dry etching. The etching depth when etching the first cladding portion 39a is set to be deeper than the bottom face of the core layer 52. In order to secure the heights (depths) of the first supporting portions 34b, 34c and second supporting portions 34d, 34e, it is preferable that this etching depth be set deeper still (for example, that etching be performed so that the main surface 2a of the substrate 2 is exposed). By this means, the wavelength filter 4 is held firmly between the first supporting portions 34b, 34c and second supporting portions 34d, 34e in the following process.

Figure 29:
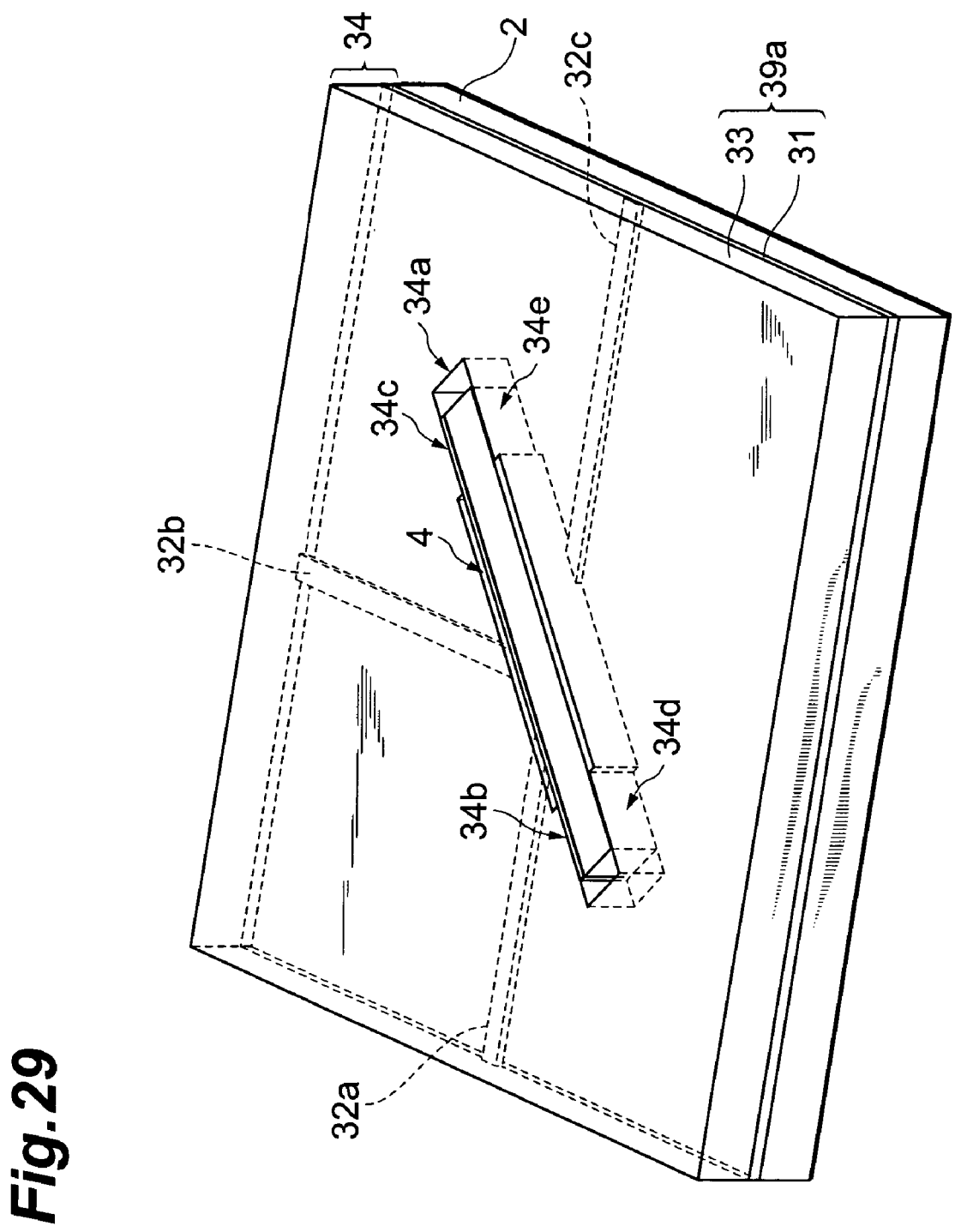
FIG. 29 is a perspective view for explaining fabrication processes of the optical waveguide substrate according to the third embodiment (Part 6)

Next, as shown in FIG. 29, the wavelength filter 4 is accommodated within the optical component accommodating groove 34a, and in addition the wavelength filter 4 is inserted between the first supporting portions 34b, 34c and second supporting portions 34d, 34e (optical component installation process). At this time, when the interval between the side faces 34f and 34h and the interval between the side faces 34g and 34i (both shown in FIG. 28) are narrower than the thickness of the wavelength filter 4, the wavelength filter 4 is press-fitted between the first supporting portions 34b, 34c and the second supporting portions 34d, 34e. When the second cladding portion 39b formed in the following process comprises a polyimide or other polymer, a wavelength filter 4 similarly comprising a polyimide or other polymer may be inserted. It is still more preferable that a wavelength filter 4 comprising a material of the same type as the second cladding portion 39b be inserted.

Figure 30:
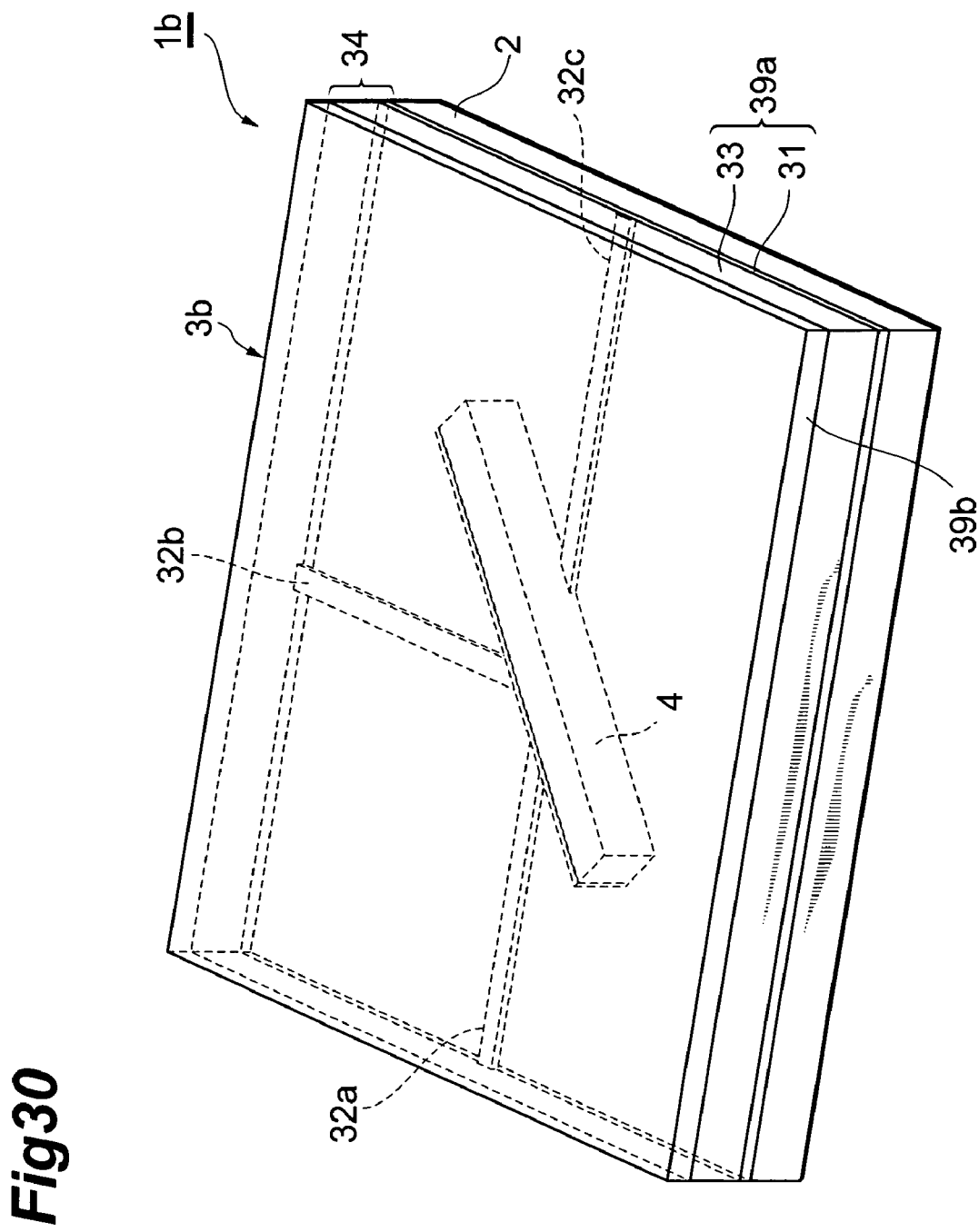
FIG. 30 is a perspective view for explaining fabrication processes of the optical waveguide substrate according to the third embodiment (Part 7)

Next, as shown in FIG. 30, a second cladding portion 39b, comprising resin of refractive index lower than that of the core portions 32a to 32c, is formed (second cladding portion formation process). At this time, the second cladding portion 39b is formed as a layer so as to cover all of the laminated portion 34 (first cladding portion 39a) and wavelength filter 4. Here, an optical waveguide layer 3b comprising the first cladding portion 39a, second cladding portion 39b, and core portions 32a to 32c is formed, embedding the wavelength filter 4. When the second cladding portion 39b comprises a polyimide or other polymer, the second cladding portion 39b may be formed by application (preferably by spin coating). At this time, it is preferable that the surface of the second cladding portion 39b be flat, to enable formation of electrical wiring or placement of optical elements thereupon. By using spin coating to form the second cladding portion 39b, the surface of the second cladding portion 39b is made flat. The wavelength filter 4, first supporting portions 34b and 34c, and second supporting portions 34d and 34e comprise a polyimide or other polymer combining appropriate hardness and elasticity, so that the first supporting portions 34b, 34c and second supporting portions 34d, 34e can hold the wavelength filter 4 without splitting or cracking.

By means of the above processes, an optical waveguide substrate 1b comprising a substrate 2, optical waveguide layer 3b, and wavelength filter 4 is obtained.

In the above, an optical waveguide substrate 1b and method of fabricating the same according to the third embodiment have been explained. In the optical waveguide substrate 1b according to the third embodiment, the first cladding portion 39a has first supporting portions 34b, 34c and second supporting portions 34d, 34e in the optical component accommodating groove 34a which enclose therebetween and hold the wavelength filter 4. Further, in the method of fabricating the optical waveguide substrate 1b according to the third embodiment, an optical component accommodating groove 34a is formed in the substrate 2 on the main surface 2a of which are formed core portions 32a to 32c and a first cladding portion 39a covering the core portions 32a to 32c, and in addition first supporting portions 34b, 34c and second supporting portions 34d, 34e are formed. Hence as indicated in the above-described fabrication method, with the wavelength filter 4 held within the optical component accommodating groove 34a while enclosed between the first supporting portions 34b, 34c and second supporting portions 34d, 34e, the second cladding portion 39b comprising a resin is formed so as to cover the first cladding portion 39a and wavelength filter 4.

In this way, by means of the optical waveguide substrate 1b and method of fabricating the same according to the third embodiment, by using in common a mask 65 used to form the optical component accommodating groove 34a, the first supporting portions 34b, 34c and second supporting portions 34d, 34e can also easily be formed. Further, the second cladding portion 39b is formed while the wavelength filter 4 is held by the first supporting portions 34b, 34c and second supporting portions 34d, 34e, so that the wavelength filter 4 is not pushed out of place by resin even when the second cladding portion 39b is for example formed by spin coating, and the wavelength filter 4 can be suitably embedded within the second cladding portion 39b by means of an easy process. Hence an optical waveguide substrate is obtained which can be fabricated easily, which affords resistance to humidity and heat, and which has high reliability. In contrast with the conventional fabrication methods in which the wavelength filter 4 is fixed in a groove using adhesive, the wavelength filter 4 is covered by (embedded within) the second cladding portion 39b, so that the surface of the optical waveguide substrate 1b can easily be made flat.

First Modified Example of the Third Embodiment

Figure 31:
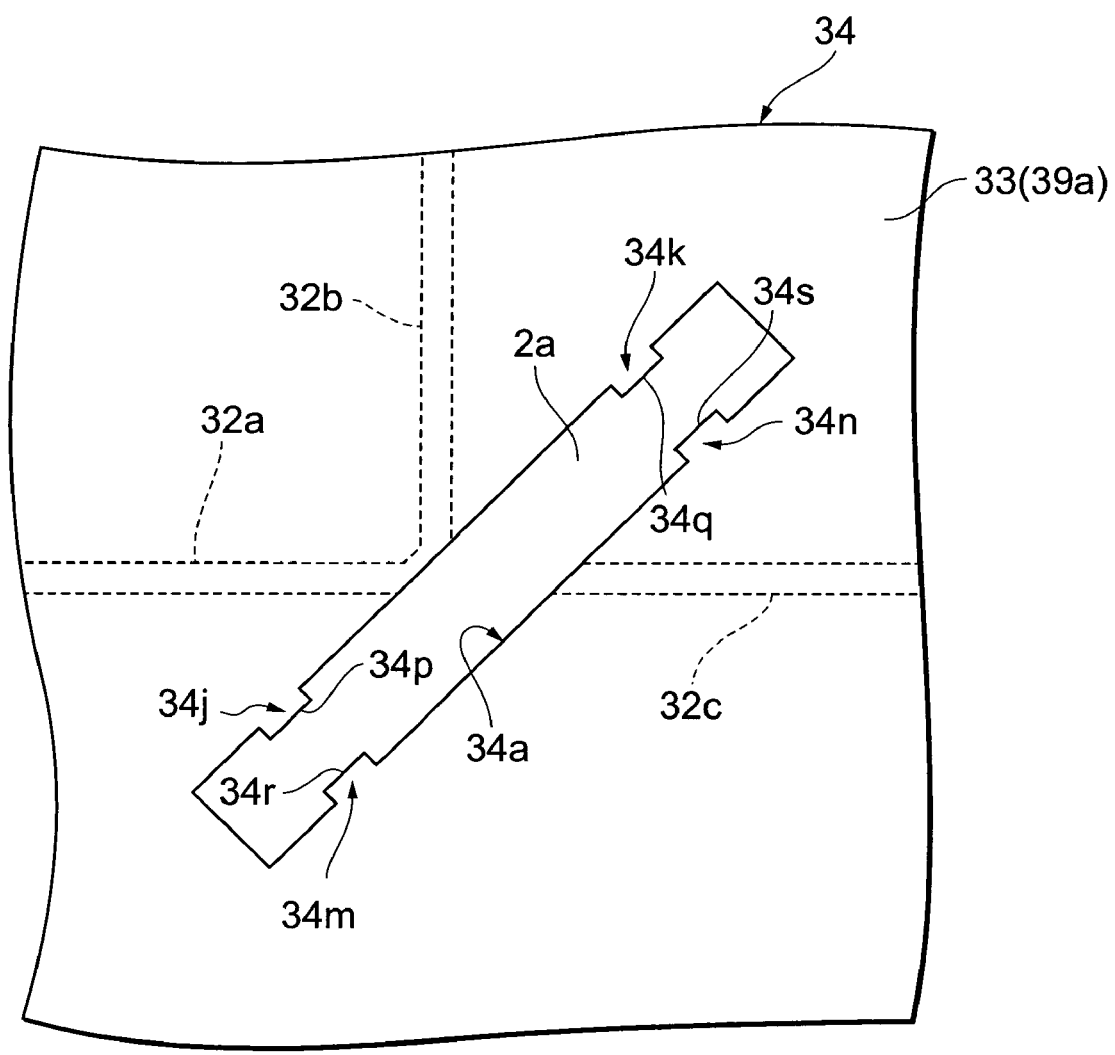
FIG. 31 is a plane view showing the configuration of a first modified example of the optical waveguide substrate according to the third embodiment.

FIG. 31 is a plane view showing the configuration of a first modified example of the optical waveguide substrate 1b according to the third embodiment. In FIG. 31, to facilitate understanding, the second cladding portion 39b and wavelength filter 4 are omitted. A difference between this first modified example and the third embodiment is the shape of the first and second supporting portions. The first and second supporting portions in the present invention are not limited to those in the above-described third embodiment, and shapes such as those in this first modified example may be used to suitably enclose and hold the wavelength filter 4.

That is, in the first modified example of the third embodiment, the first cladding portion 39a has first supporting portions 34j, 34k and second supporting portions 34m, 34n. The first supporting portion 34j is formed in the vicinity of one end in the length direction of the optical component accommodating groove 34a, so as to protrude from the side face on the side of the core portions 32a, 32b. The first supporting portion 34k is formed in the vicinity of the other end in the length direction of the optical component accommodating groove 34a, so as to protrude from the side face on the side of the core portions 32a, 32b. The second supporting portion 34m is formed in the vicinity of one end in the length direction of the optical component accommodating groove 34a, so as to protrude from the side face on the side of the core portion 32c. And the second supporting portion 34n is formed in the vicinity of the other end in the length direction of the optical component accommodating groove 34a, so as to protrude from the side face on the side of the core portion 32c. A portion of the optical component accommodating groove 34a is narrowed by the first supporting portion 34j and second supporting portion 34m, and another portion of the optical component accommodating groove 34a is narrowed by the first supporting portion 34k and second supporting portion 34n. The first supporting portions 34j, 34k have respective side faces 34p, 34q in contact with the reflecting surface 4a of the wavelength filter 4. The side faces 34p, 34q are first contact surfaces in this first modified example. The second supporting portions 34m, 34n have respective side faces 34r, 34s in contact with the rear surface 4b of the wavelength filter 4. The side faces 34r, 34s are second contact surfaces in this first modified example.

The side faces 34p and 34r are positioned in opposition enclosing the wavelength filter 4. The side faces 34q and 34s are positioned in opposition enclosing the wavelength filter 4. By means of this configuration, a portion of the vicinity on one end of the wavelength filter 4 is enclosed and held by the side faces 34p and 34r, and a portion of the vicinity on the other end of the wavelength filter 4 is enclosed and held by the side faces 34q and 34s. The contact positions between the wavelength filter 4 and first supporting portions 34j, 34k (that is, the contact positions between the reflecting surface 4a and side faces 34p, 34q), and the contact positions between the wavelength filter 4 and the second supporting portions 34m, 34n (that is, the contact positions between the rear surface 4b and the side faces 34r, 34s), are positioned so as to be in opposition in a state of enclosing the wavelength filter 4. By this means, the wavelength filter 4 is stably held. The position and angle of the reflecting surface 4a of the wavelength filter 4 are governed by the side faces 34p, 34q and side faces 34r, 34s.

In the first modified example of the third embodiment, it is preferable that the distance between the side face 34p and side face 34r (the distance between side faces 34q and 34s) be set to be shorter than the thickness (indicated by t in FIG. 23B) of the wavelength filter 4 in the direction perpendicularly intersecting the reflecting surface 4a. And, it is preferable that the wavelength filter 4 be press-fitted between the side faces 34p and 34r (between the side faces 34q and 34s). In this case, the wavelength filter 4 is firmly held by the first supporting portions 34j, 34k and the second supporting portions 34m, 34n.

In the first modified example of the third embodiment, in order to form the first supporting portions 34j, 34k and second supporting portions 34m, 34n, in place of the mask 65 in the second etching process (see FIG. 27), a mask having mask portions according to the planar shapes of the first supporting portions 34j, 34k and second supporting portions 34m, 34n may be used.

Figure 32:
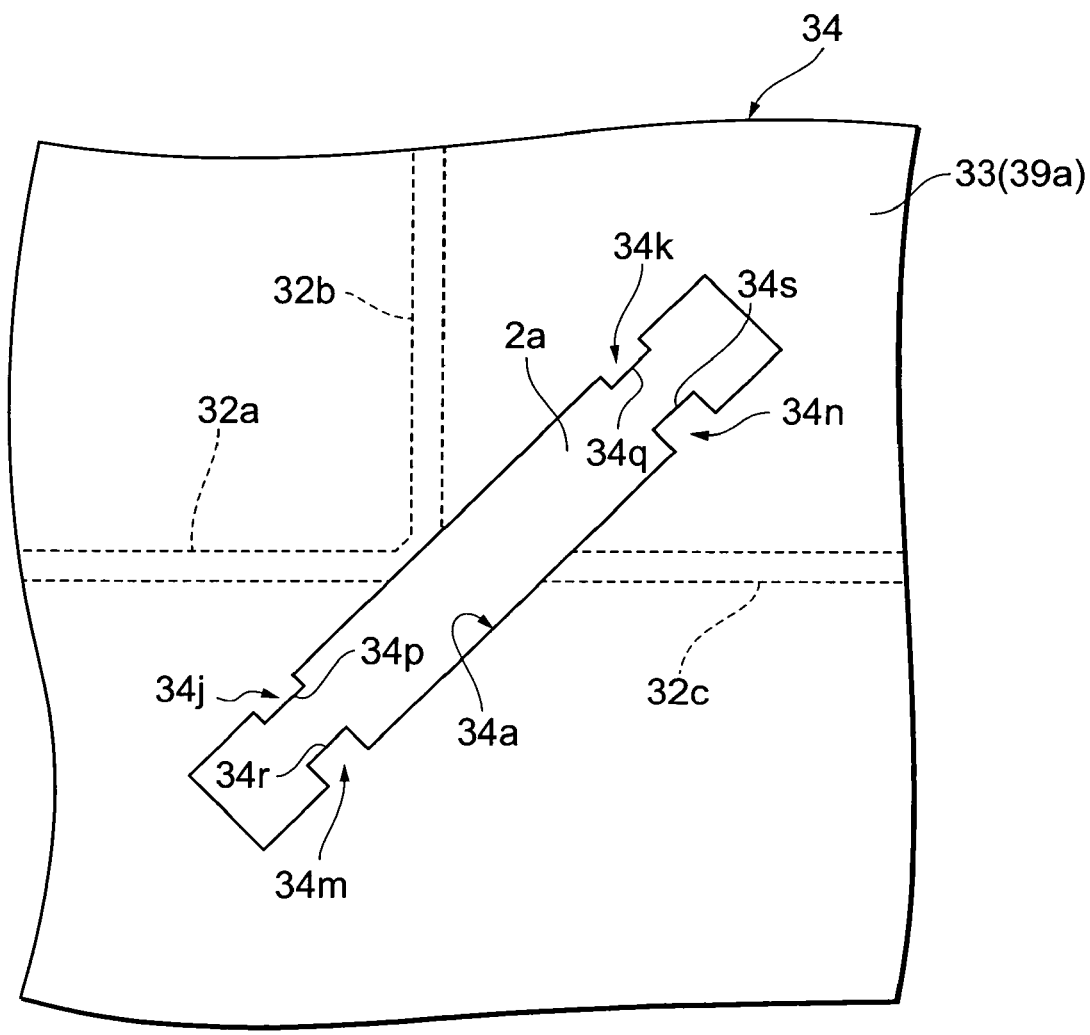
FIG. 32 is a plane view showing the configuration of another example of the optical waveguide substrate according to the first modified example of the third embodiment.

FIG. 32 is a plane view showing the configuration of another example of the optical waveguide substrate in the first modified example of the third embodiment. In FIG. 32 also, to facilitate understanding, the second cladding portion 39b and wavelength filter 4 are omitted. In this modified example, as shown in FIG. 32, the protrusion heights of the first supporting portions 34j, 34k from the side face of the optical component accommodating groove 34a and the protrusion heights of the second supporting portions 34m, 34n from the side face of the optical component accommodating groove 34a may be different. In the case of this configuration also, the wavelength filter 4 is suitably enclosed and held. In particular, by setting the protrusion heights of the first supporting portions 34j, 34k to be lower than the protrusion heights of the second supporting portions 34m, 34n, the interval between the side face 32h (see FIG. 22) of the core portions 32a, 32b and the reflecting surface 4a of the wavelength filter 4 can be narrowed. As a result, optical propagation losses can be effectively reduced.

Second Modified Example of the Third Embodiment

Figure 33:
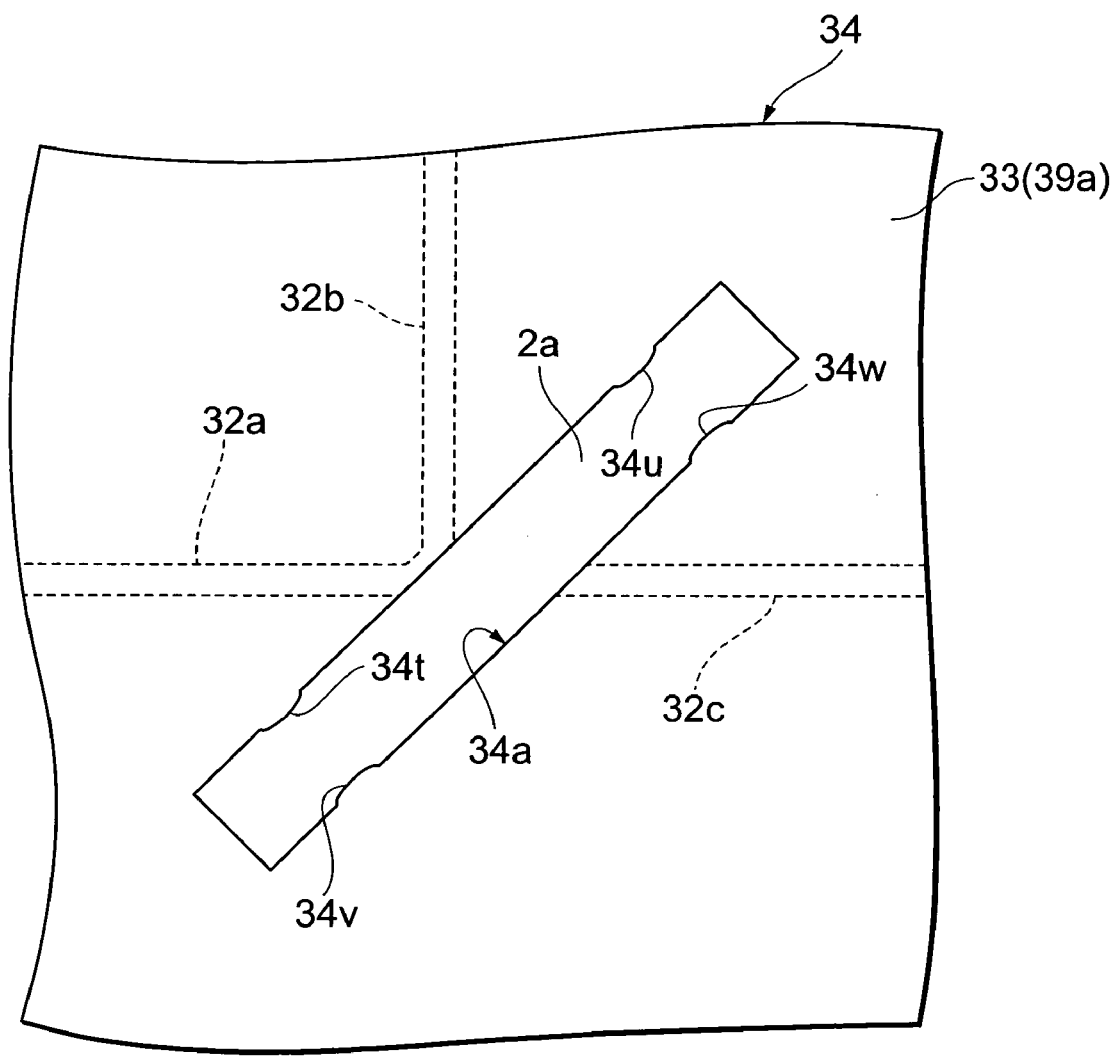
FIG. 33 is a plane view showing the configuration of a second modified example of the optical waveguide substrate according to the third embodiment.

FIG. 33 is a plane view showing the configuration of a second modified example of the optical waveguide substrate 1b according to the third embodiment. In FIG. 33, to facilitate understanding, the second cladding portion 39b and wavelength filter 4 are omitted. Differences with the second modified example and with the third embodiment are the shapes of the first and second supporting portions. The wavelength filter 4 is enclosed suitably and held even when the first and second supporting portions in the present invention have the shapes of this second modified example.

That is, in this second modified example, the first cladding portion 39a has first supporting portions 34t, 34u, and second supporting portions 34v, 34w. The first supporting portion 34t is formed in the vicinity of one end in the length direction of the optical component accommodating groove 34a so as to protrude in a semicircular columnar shape from the side face of the core portions 32a, 32b. The first supporting portion 34u is formed in the vicinity of the other end in the length direction of the optical component accommodating groove 34a so as to protrude in a semicircular columnar shape from the side face of the core portions 32a, 32b. The second supporting portion 34v is formed in the vicinity of one end in the length direction of the optical component accommodating groove 34a so as to protrude in a semicircular columnar shape from the side face of the core portion 32c. The second supporting portion 34w is formed in the vicinity of the other end in the length direction of the optical component accommodating groove 34a so as to protrude in a semicircular columnar shape from the side face of the core portion 32c. And, a portion of the optical component accommodating groove 34a is narrowed by the first supporting portion 34t and second supporting portion 34v, while another portion of the optical component accommodating groove 34a is narrowed by the first supporting portion 34u and second supporting portion 34w.

In this second modified example of the third embodiment, the side faces of the first supporting portions 34t, 34u and second supporting portions 34v, 34w are formed in a semicircular columnar (rounded) shape. By this means, when the wavelength filter 4 is inserted between the first supporting portions 34t, 34u and second supporting portions 34v, 34w, damage to and separation of the dielectric multilayer film 42 and similar can be effectively reduced.

Further, the first supporting portion 34t and second supporting portion 34v are positioned in opposition enclosing the wavelength filter 4. And, the first supporting portion 34u and second supporting portion 34w are positioned in opposition enclosing the wavelength filter 4. By means of this configuration, one portion in the vicinity of one end of the wavelength filter 4 is enclosed and held by the semicircular columnar-shaped side face of the first supporting portion 34t and by the semicircular columnar-shaped side face of the second supporting portion 34v, and one portion in the vicinity of the other end of the wavelength filter 4 is enclosed and held by the semicircular columnar-shaped side face of the first supporting portion 34u and by the semicircular columnar-shaped side face of the second supporting portion 34w. Further, the contact positions between the reflecting surface 4a of the wavelength filter 4 and the first supporting portions 34t, 34u, and the contact positions between the rear surface 4b of the wavelength filter 4 and the second supporting portions 34v, 34w, are arranged in opposition enclosing the wavelength filter 4. By this means, the wavelength filter 4 is stably held. The position and angle of the reflecting surface 4a of the wavelength filter 4 is governed by the first supporting portions 34t, 34u and the second supporting portions 34v, 34w.

In this second modified example of the third embodiment, it is preferable that the distance between the first supporting portion 34t and the second supporting portion 34v (the distance between the first supporting portion 34u and the second supporting portion 34w) be set shorter than the thickness (indicated by t in FIG. 23B) of the wavelength filter 4 in the direction perpendicularly intersecting the reflecting surface 4a. And, it is preferable that the wavelength filter 4 be press-fitted between the first supporting portion 34t and the second supporting portion 34v (between the first supporting portion 34u and the second supporting portion 34w). Here the wavelength filter 4 is firmly held by the first supporting portions 34t, 34u and the second supporting portions 34v, 34w.

In the second modified example of the third embodiment, in order to form the first supporting portions 34t, 34u and second supporting portions 34v, 34w, in place of the mask 65 in the second etching process (see FIG. 27), a mask having mask portions according to the planar shapes of the first supporting portions 34t, 34u and second supporting portions 34v, 34w may be used.

Figure 34:
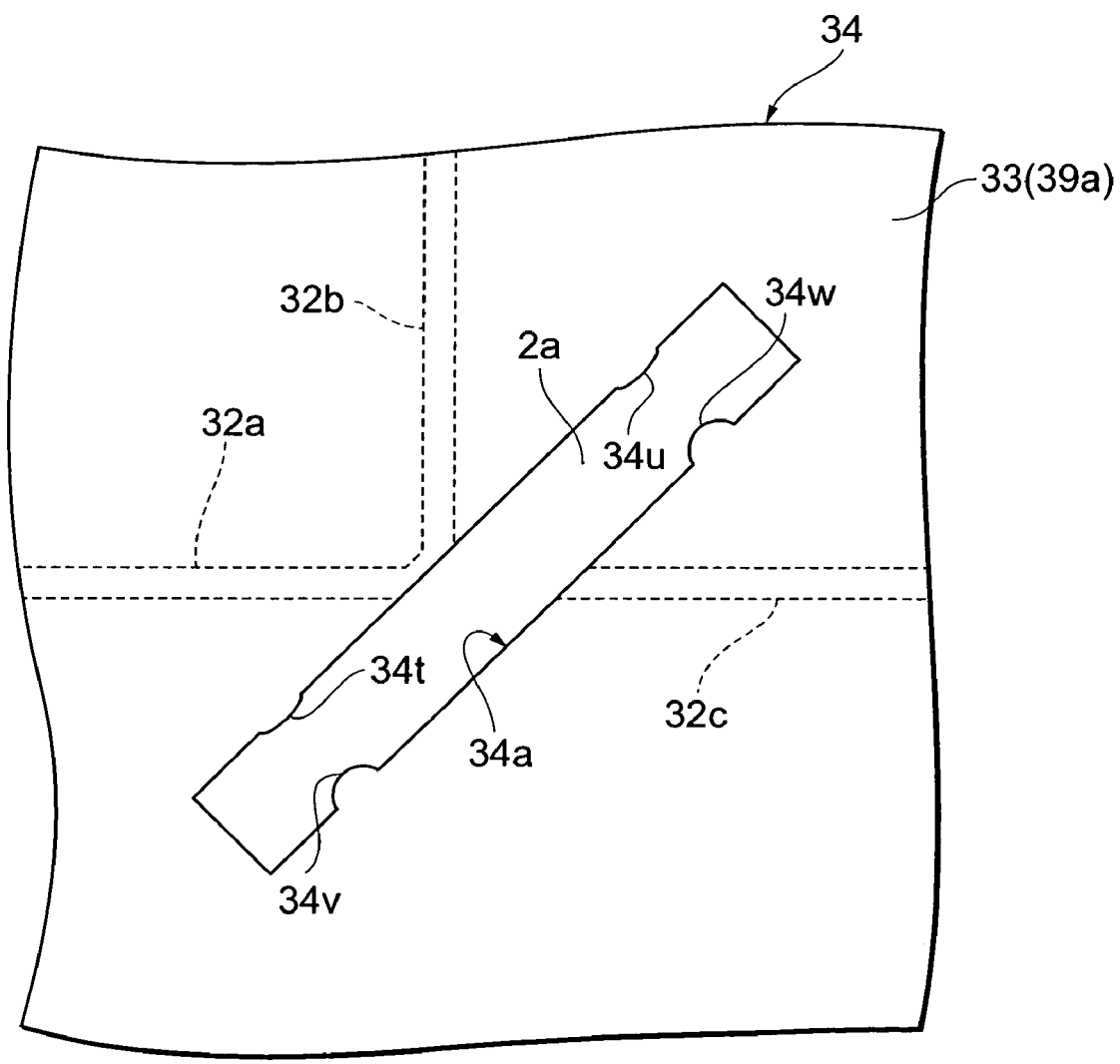
FIG. 34 is a plane view showing the configuration of another example of the optical waveguide substrate according to the second modified example of the third embodiment.

FIG. 34 is a plane view showing another example of the configuration of the optical waveguide substrate of the second modified example of the third embodiment. In FIG. 34 also, in order to facilitate understanding, the second cladding portion 39b and wavelength filter 4 are omitted. In this modified example, as shown in FIG. 34, the protrusion heights of the first supporting portions 34t, 34u from the side face of the optical component accommodating groove 34a and the protrusion heights of the second supporting portions 34v, 34w from the side face of the optical component accommodating groove 34a may be different. By means of this configuration also, the wavelength filter 4 is suitably enclosed and held. In particular, by setting the protrusion heights of the first supporting portions 34t, 34u to be lower than the protrusion heights of the second supporting portions 34v, 34w, the interval between the end face 32h (see FIG. 22) of the core portions 32a, 32b and the reflecting surface 4a of the wavelength filter 4 can be narrowed. As a result, optical propagation losses can be effectively reduced.

Third Modified Example of the Third Embodiment

Figure 35:
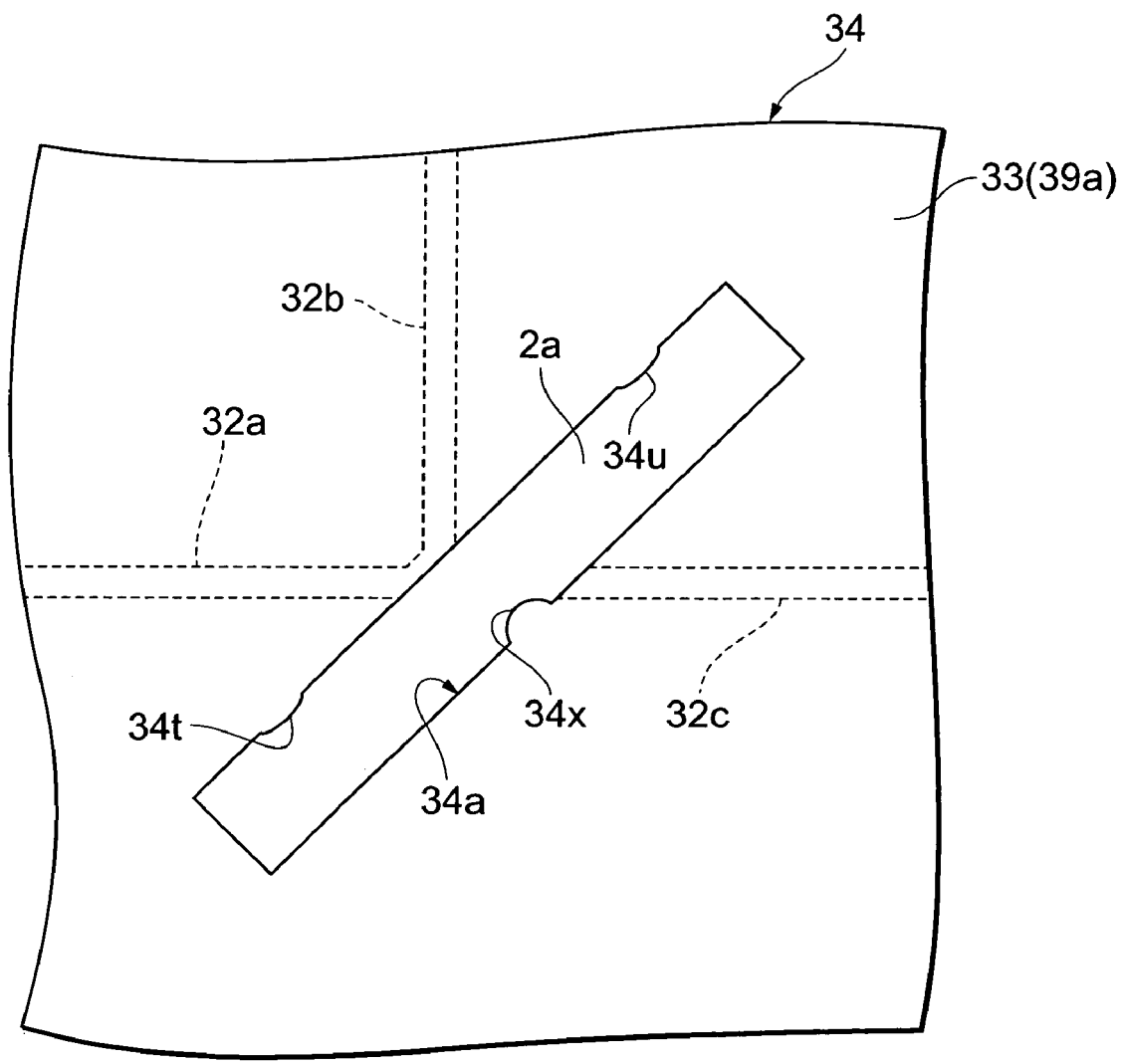
FIG. 35 is a plane view showing the configuration of a third modified example of the optical waveguide substrate according to the third embodiment.

FIG. 35 is a plane view showing the configuration of a third modified example of the optical waveguide substrate 1b according to the third embodiment. In FIG. 35 also, to facilitate understanding the second cladding portion 39b and wavelength filter 4 are omitted. A difference between the third modified example and the third embodiment is the shapes of the first and second supporting portions. The wavelength filter 4 is enclosed suitably and held even when the first and second supporting portions in the present invention have the shapes of this third modified example in the third embodiment.

That is, in the third modified example of the third embodiment, the first cladding portion 39a has first supporting portions 34t, 34u and a second supporting portions 34x. The shapes of the first supporting portions 34t, 34u are similar to those of the above-described second modified example of the third embodiment. The second supporting portion 34x is formed in the vicinity of the center in the length direction of the optical component accommodating groove 34a, so as to protrude in a semicircular columnar shape from the side face of the core portion 32c. The contact positions between the wavelength filter 4 and the first supporting portions 34t, 34u (that is, the tip portions of the first supporting portions 34t, 34u), and the contact positions of the wavelength filter 4 with the second supporting portion 34x (that is, the tip portion of the second supporting portion 34x), are positioned in alternation along the length direction of the wavelength filter 4. By this means, on accommodating the wavelength filter 4 in the optical component accommodating groove 34a, the wavelength filter 4 can easily be inserted between the first supporting portions 34t, 34u and the second supporting portion 34x while changing the angle of the wavelength filter 4.

Fourth Modified Example of the Third Embodiment

Figure 36:
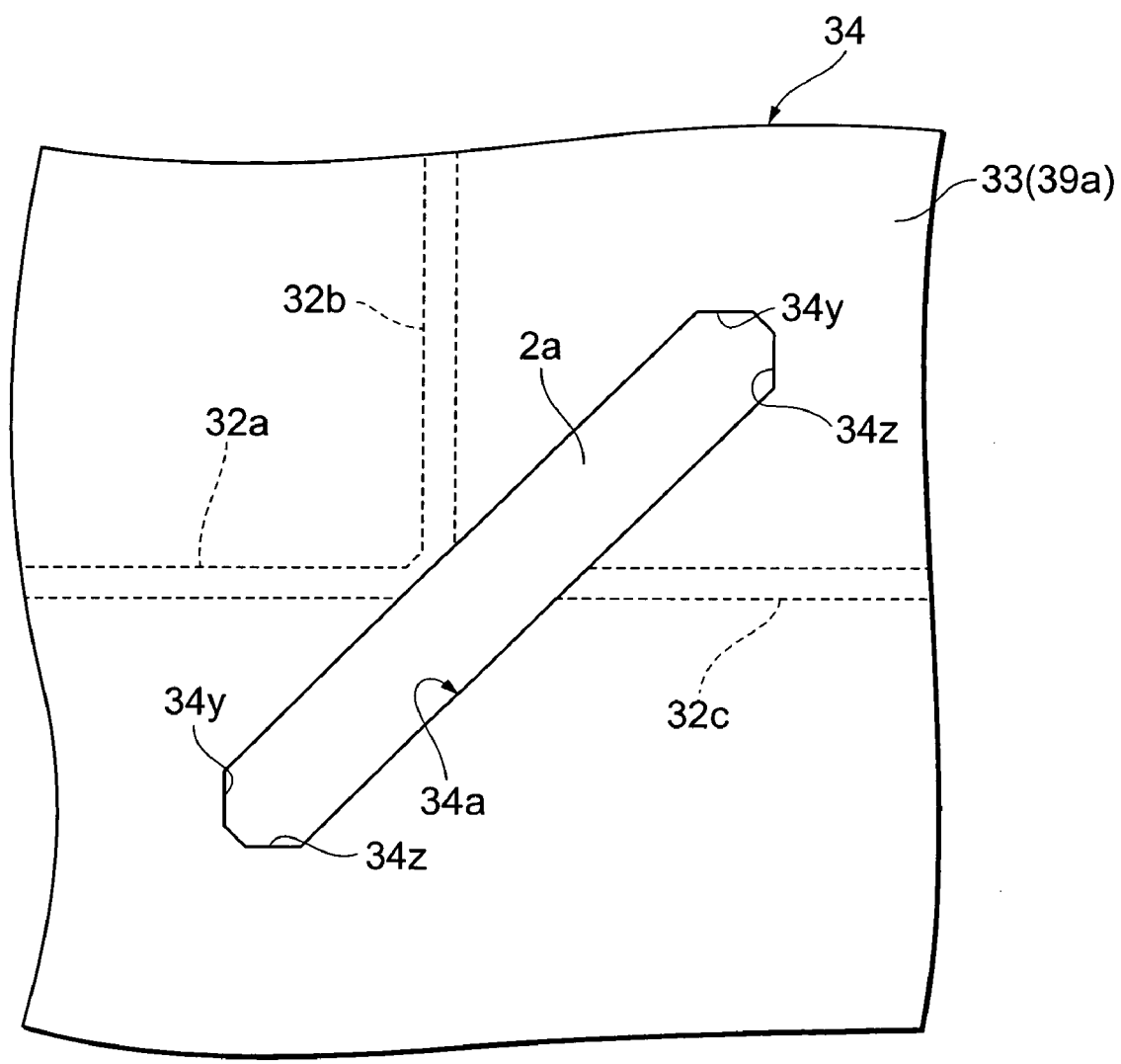
FIG. 36 is a plane view showing the configuration of a fourth modified example of the optical waveguide substrate according to the third embodiment.

FIG. 36 is a plane view showing the configuration of a fourth modified example of the optical waveguide substrate 1b according to the third embodiment. In FIG. 36 also, to facilitate understanding the second cladding portion 39b and wavelength filter 4 are omitted. A difference between the fourth modified example and the third embodiment is the shapes of the first and second supporting portions. The wavelength filter 4 is enclosed suitably and held even when the first and second supporting portions in the present invention have the shapes of this fourth modified example of the third embodiment.

That is, in this fourth modified example of the third embodiment, the first cladding portion 39a has first supporting portions 34y and second supporting portions 34z. The first supporting portions 34y are formed in the two corners of the optical component accommodating groove 34a on the side of the core portions 32a and 32b among the four corners of the side faces. The first supporting portions 34y have side faces formed obliquely with respect to the reflecting surface 4a of the wavelength filter 4. The second supporting portions 34z are formed in the two corners of the optical component accommodating groove 34a on the side of the core portion 32c among the four corners of the side faces. The second supporting portions 34z have side faces formed obliquely with respect to the rear surface 4b of the wavelength filter 4.

By means of this configuration, one end of the wavelength filter 4 is enclosed and held by one of the first supporting portion 34y and one of the second supporting portion 34z, while the other end of the wavelength filter 4 is enclosed and held by the other first supporting portion 34y and the other second supporting portion 34z. The position and angle of the reflecting surface 4a of the wavelength filter 4 are governed by the first supporting portions 34y and second supporting portions 34z.

In the fourth modified example of the third embodiment, in order to form the first supporting portions 34y and second supporting portions 34z, in place of the mask 65 in the second etching process (see FIG. 27), a mask having mask portions according to the planar shapes of the first supporting portions 34y and second supporting portions 34z may be used.

Fourth Embodiment

Figure 37:
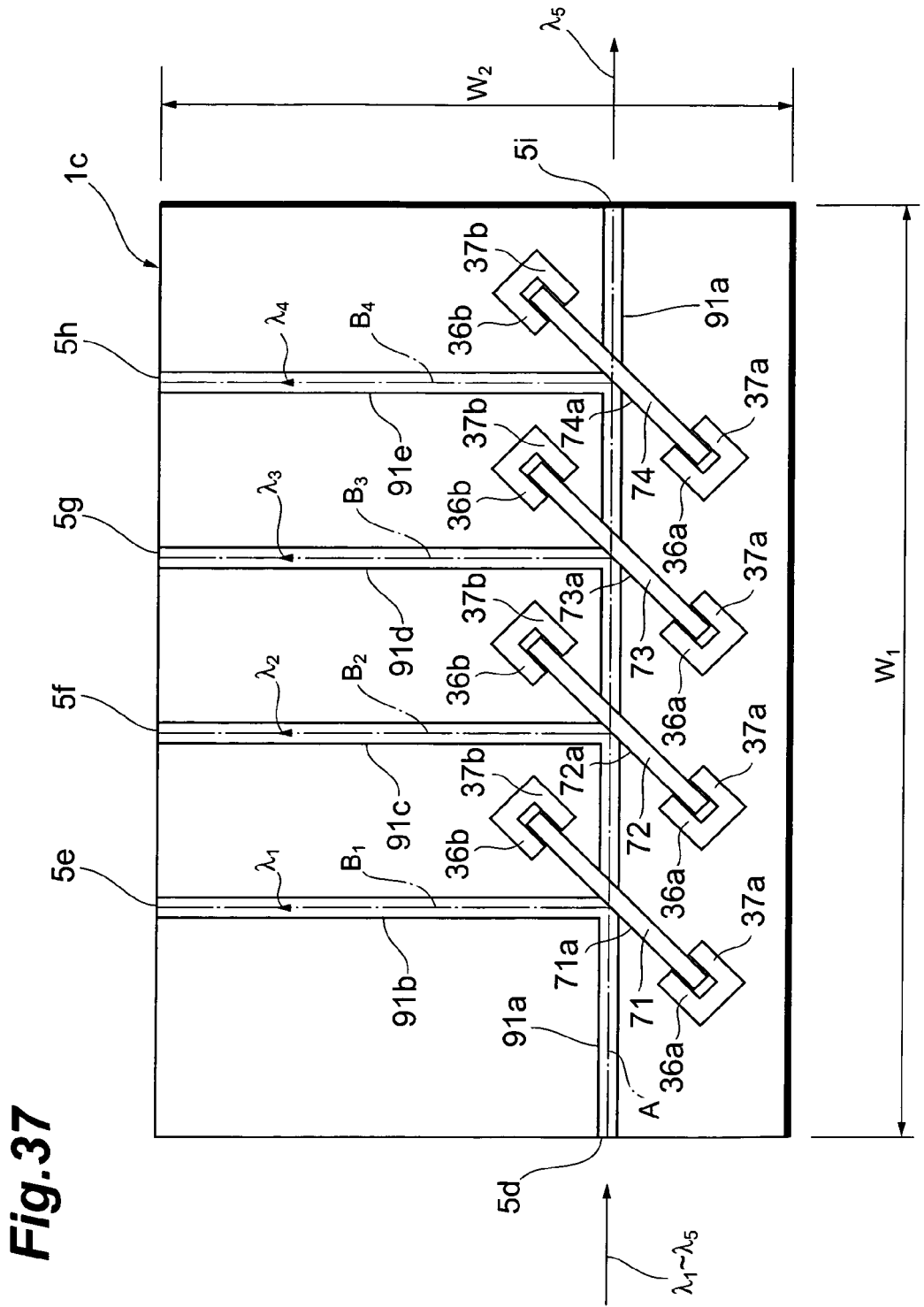
FIG. 37 is a plane view showing the schematic configuration of the optical waveguide substrate according to a fourth embodiment.

Next, a fourth embodiment of an optical waveguide substrate according to the present invention will be explained. FIG. 37 is a plane view showing the schematic configuration of the optical waveguide substrate 1c according to the fourth embodiment. Referring to FIG. 37, in the optical waveguide substrate 1c, a predetermined optical axis A, and a plurality of optical axes $B_1$ to $B_4$ branching from the optical axis A and extending in parallel directions, are provided. The optical waveguide substrate 1c comprises a core portion 91a (first core portion) along optical axis A; a plurality of core portions 91b to 91e (second core portions) along optical axes $B_1$ to $B_4$; and a plurality of wavelength filters 71 to 74, positioned at coupling positions of the core portion 91a with the core portions 91b to 91e. The core portions 91a to 91e and the wavelength filters 71 to 74 are covered by a cladding portion.

The wavelength filters 71 to 74 have reflecting surfaces 71a to 74a which selective reflect the respective wavelength components $\lambda_1$ to $\lambda_4$ among the wavelength components $\lambda_1$ to $\lambda_5$ of light propagating in the core portion 91a. The reflecting surface 71a of wavelength filter 71 is provided so as to reflect the wavelength component $\lambda_1$ of propagating light from core portion 91a to core portion 91b. The reflecting surface 72a of wavelength filter 72 is provided so as to reflect the wavelength component $\lambda_2$ of propagating light from core portion 91a to core portion 91c. The reflecting surface 73a of wavelength filter 73 is provided so as to reflect the wavelength component $\lambda_3$ of propagating light from core portion 91a to core portion 91d. The reflecting surface 74a of wavelength filter 74 is provided so as to reflect the wavelength component $\lambda_4$ of propagating light from core portion 91a to core portion 91e.

The wavelength filters 71 to 74 are held by the first supporting portions 36a, 36b and second supporting portions 37a, 37b. It is preferable that the first supporting portions 36a, 36b and second supporting portions 37a, 37b in the fourth embodiment have configurations similar to the respective portions in the first embodiment.

In the optical waveguide substrate 1c according to the fourth embodiment, when light comprising the wavelength components $\lambda_1$ to $\lambda_5$ is made incident from the light incident/emitting end 5d of the core portion 91a, the light propagates along the optical axis A of the core portion 91a. The wavelength components $\lambda_1$ through $\lambda_4$ are then reflected by the respective reflecting surfaces 71a to 74a. Then, the wavelength components $\lambda_1$ through $\lambda_4$ propagate along the optical axes $B_1$ to $B_4$ of the respective core portions 91b to 91e, and are emitted from the light incident/emitting ends 5e to 5h of the core portions 91b to 91e. The wavelength component $\lambda_5$ passes through the wavelength filters 71 to 74, and is emitted from the light incident/emitting end 5i of the core portion 91a. Optical detection elements such as for example photodiodes may be installed at the light incident/emitting ends 5e to 5h.

By means of the optical waveguide substrate 1c according to the fourth embodiment, similarly to the optical waveguide substrate 1a of the above-described first embodiment, wavelength filters 71 to 74 can be suitably embedded within a cladding portion by means of a simple process. Further, the surface of the optical waveguide substrate 1c can easily be made flat. Also, the wavelength filters 71 to 74 can be precisely positioned with respect to the core portions 91a to 91e, and moreover optical losses between the wavelength filters 71 to 74 and the core portions 91a to 91e can be effectively reduced. Hence an optical coupling/branching module with lower losses, for example for application in wavelength division multiplexing (WDM) communication, can be realized. By positioning the wavelength filters 71 to 74 at comparatively short intervals, a more compact coupling/branching module compared with for example a Mach-Zender type device can be realized. For example, a suitable length $W_1$ of the optical waveguide substrate 1c in the direction of optical axis A is for example 4 mm to 10 mm. A suitable length $W_2$ of the optical waveguide substrate 1c in the direction along the optical axes $B_1$ to $B_4$ is for example 4 mm.

Figure 38:
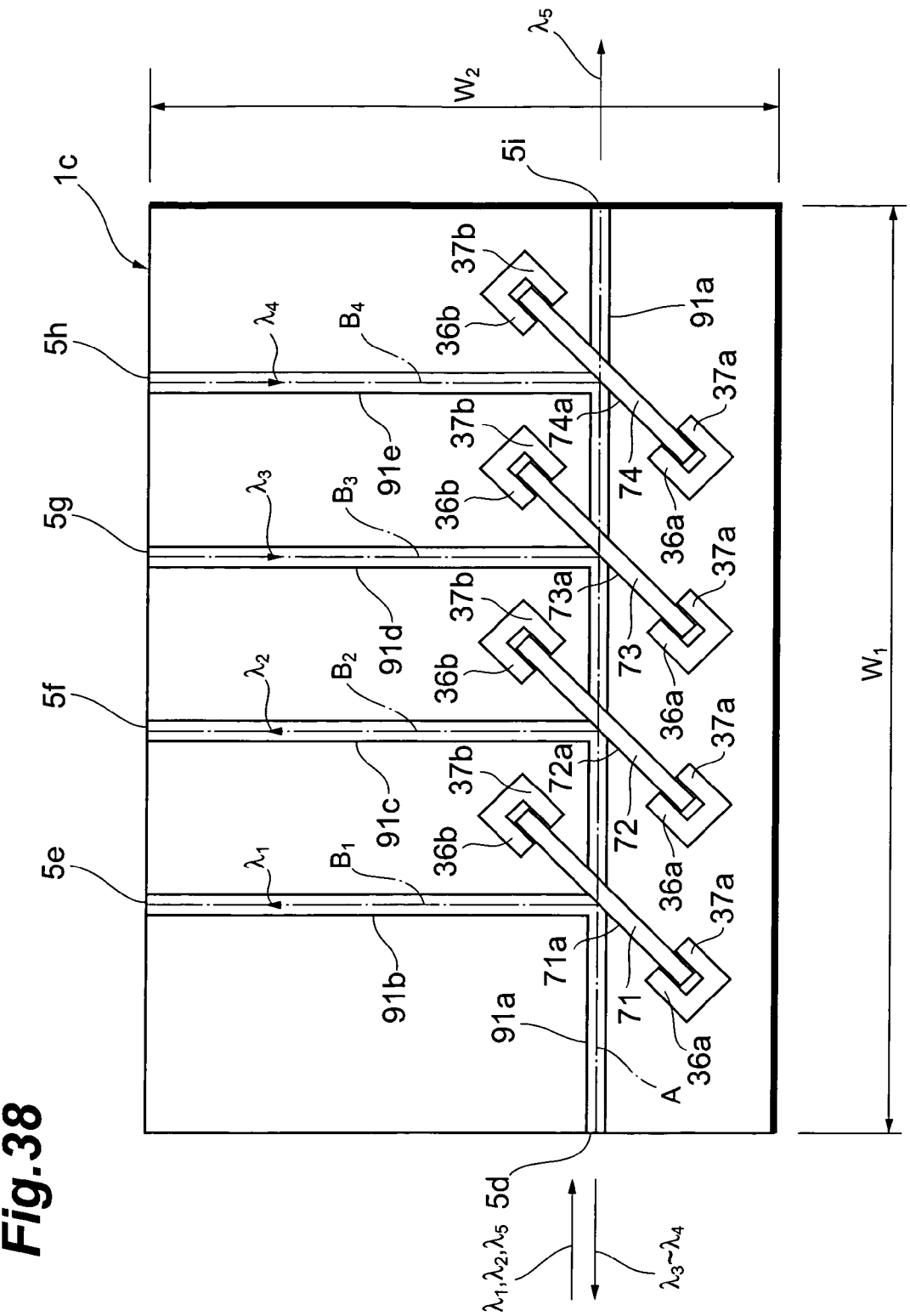
FIG. 38 is a plane view for explaining the operation in bidirectional communication of the optical waveguide substrate according to the fourth embodiment.

The optical waveguide substrate 1c according to the fourth embodiment can also be applied to bidirectional communications. FIG. 38 is a plane view used to explain operation of the optical waveguide substrate 1c according to the fourth embodiment in bidirectional communications. That is, in the optical waveguide substrate 1c, when light comprising the wavelength components $\lambda_1$, $\lambda_2$, $\lambda_5$ is incident from for example an optical fiber for communication onto the light incident/emitting end 5d of the core portion 91a, the light propagates through the core portion 91a along the optical axis A. The wavelength components $\lambda_1$ and $\lambda_2$ are reflected by the reflecting surfaces 71a and 72a respectively. Then, the wavelength components $\lambda_1$ and $\lambda_2$ propagate in the core portions 91b, 91c respectively along the optical axes $B_1$ and $B_2$, and are emitted from the light incident/emitting ends 5e, 5f. The wavelength component $\lambda_5$ passes through the wavelength filters 71 to 74, and is then emitted from the light incident/emitting end 5i. Optical detection elements such as for example photodiodes may be installed at the light incident/emitting ends 5e and 5f.

When light of wavelength $\lambda_3$ is incident on the light incident/emitting end 5g, this light propagates through the core portion 91d along the optical axis $B_3$ and is reflected by the reflecting surface 73a. Similarly, when light of wavelength $\lambda_4$ is incident on the light incident/emitting end 5h, the light propagates through the core portion 91e along the optical axis $B_4$, and is reflected by the reflecting surface 74a. In this way, light of wavelengths $\lambda_3$ and $\lambda_4$ reflected by the reflecting surfaces 73a and 74a respectively propagates through the core portion 91a along the optical axis A, and is emitted from the light incident/emitting end 5d to, for example, an optical fiber for communication. Optical emitting elements such as for example laser diodes may be installed at the light incident/emitting ends 5g and 5h.

By means of this optical waveguide substrate 1c according to the fourth embodiment, in such a bidirectional communication module, wavelength filters 71 to 74 can be suitably embedded within a cladding portion using a simple process. Further, the surface of the optical waveguide substrate 1c can easily be made flat. Moreover, low losses and a compact configuration can be achieved.

In the optical waveguide substrate 1c according to the fourth embodiment, the wavelength filters 71 to 74 are held by first supporting portions 36a, 36b and second supporting portions 37a, 37b similarly to the first embodiment; but the wavelength filters may instead be held by the first and second supporting portions of the other embodiments or modified examples.

Modified Example of the Fourth Embodiment

Figure 39:
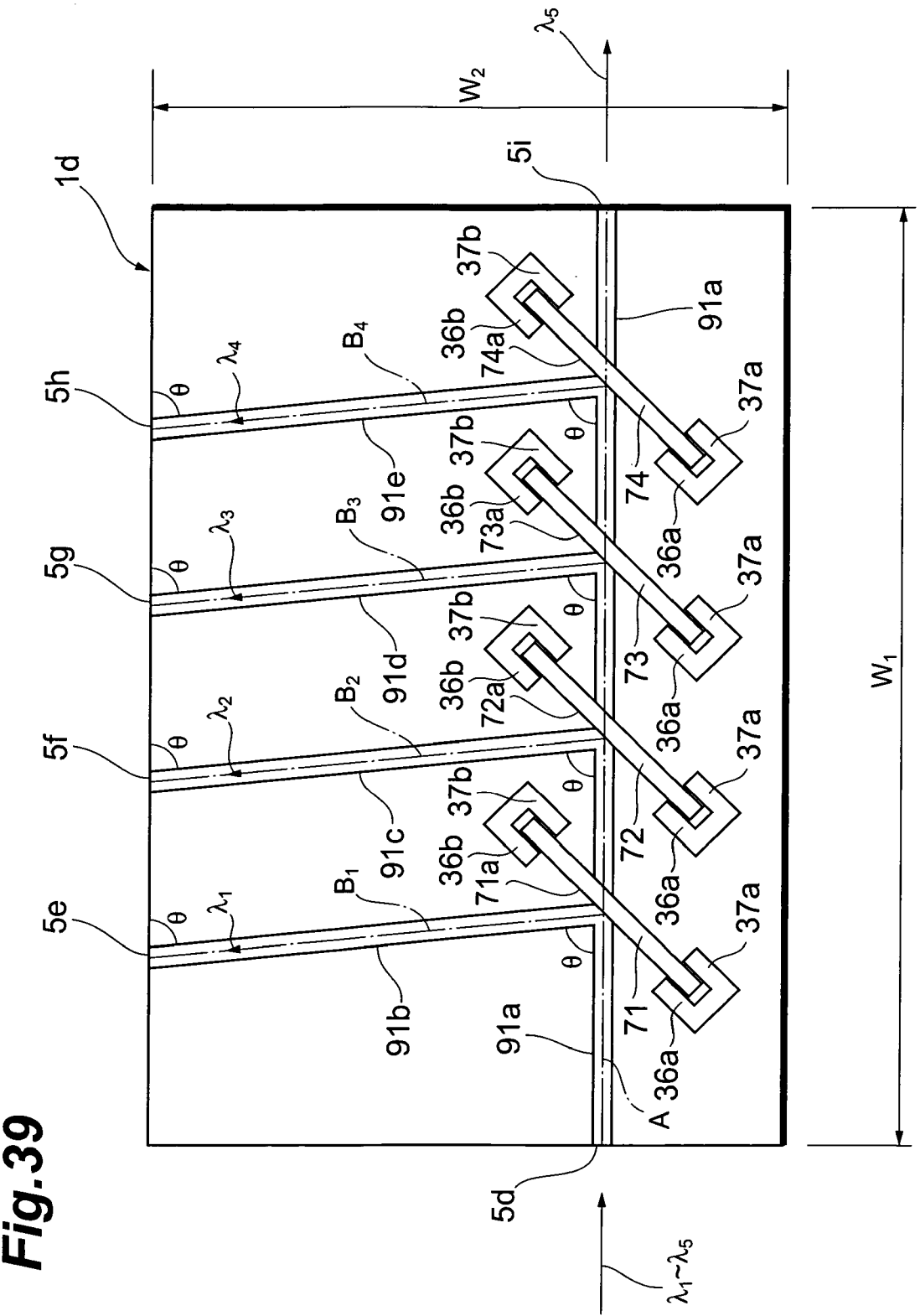
FIG. 39 is a plane view showing the schematic configuration of a modified example of the optical waveguide substrate according to the fourth embodiment.

FIG. 39 is a plane view showing the schematic configuration of a modified example of the optical waveguide substrate according to the fourth embodiment. A difference between the optical waveguide substrate 1d of this modified example and the optical waveguide substrate 1c according to the fourth embodiment is the angle made by the optical axis A with the optical axes $B_1$ to $B_4$ (the angle made by the length direction of the core portion 91a with the length directions of the core portions 91b to 91e). That is, in the optical waveguide substrate 1d of this modified example of the fourth embodiment, the predetermined angle θ made by the optical axis A with the optical axes $B_1$ to $B_4$ is set to a smaller angle than a right angle. And, wavelength filters 71 to 74 are installed so as to couple the core portion 91a and the core portions 91b to 91e at this predetermined angle θ, such that the normals to the reflecting surfaces 71a to 74a bisect the predetermined angle θ. Thus the angle made by the optical axis A with the optical axes $B_1$ to $B_4$ can be set to various angles other than a right angle, as in this modified example of the fourth embodiment.

Another difference between the optical waveguide substrate 1d of this modified example and the optical waveguide substrate 1c according to the fourth embodiment is the angle made by the optical axes $B_1$ to $B_4$ and the light incident/emitting ends 5e to 5h (the angle made by the length direction of the core portions 91b to 91e and the light incident/emitting ends 5e to 5h). That is, in the optical waveguide substrate 1d of the modified example of the fourth embodiment, the optical axes $B_1$ to $B_4$ (the length directions of core portions 91b to 91e) and the light incident/emitting ends 5e to 5h intersect at a predetermined angle θ which is not a right angle. By this means, Fresnel reflection at the light incident/emitting ends 5e to 5h is effectively prevented. The angle θ is arbitrary, but may for example be set to approximately 82° (that is, the angle between the normals to the light incident/emitting ends 5e to 5h and the optical axes $B_1$ to $B_4$ may be 8°).

Fifth Embodiment

Next, a fifth embodiment of an optical waveguide substrate according to the present invention will be explained. FIG. 40 is a plane view showing the schematic configuration of the fifth embodiment of the optical waveguide substrate 1e according to the present invention. Referring to FIG. 40, in the optical waveguide substrate 1e, predetermined optical axes $A_1$, $A_2$, a plurality of optical axes $B_1$, to $B_4$ extending in parallel and branching from the optical axis $A_1$, and a plurality of optical axes $B_5$ to $B_8$ extending in parallel and branching from the optical axis $A_2$, are provided. The optical waveguide substrate 1e comprises core portions 91i, 91j (first core portions) along the optical axes $A_1$ and $A_2$ respectively; core portions 91k to 91s (second core portions) along the optical axes $B_1$ to $B_8$ respectively; wavelength filters 81 to 84 positioned at the positions of coupling of the core portions 91k to 91n with the core portion 91i respectively; and wavelength filters 85 to 88 positioned at the positions of coupling of the core portions 91p to 91s with the core portion 91j respectively. One end of the core portion 91j is coupled with the core portion 91i. The core portions 91i to 91s and wavelength filters 81 to 88 are covered by a cladding portion.

The wavelength filters 81 to 84 have reflecting surfaces 81a to 84a which selectively reflect wavelength components $\lambda_1$ to $\lambda_4$ respectively. The wavelength filters 85 to 88 have reflecting surfaces 85a to 88a which selective reflect wavelength components $\lambda_6$ to $\lambda_9$ respectively. The reflecting surfaces 81a to 84a are provided so as to reflect the wavelength components $\lambda_1$ to $\lambda_4$ of propagating light from core portion 91i to core portions 91k to 91n respectively. The reflecting surfaces 85a to 88a are provided so as to reflect light of wavelength components $\lambda_6$ to $\lambda_9$ from core portions 91p to 91s respectively to core portion 91j.

Further, each of the wavelength filters 81 to 88 is held by first supporting portions 36a, 36b and second supporting portions 37a, 37b. It is preferable that the first supporting portions 36a, 36b and second supporting portions 37a, 37b in the fifth embodiment be configured similarly to the respective portions of the first embodiment.

In the optical waveguide substrate 1e according to the fifth embodiment, when light comprising the wavelength components $\lambda_1$ to $\lambda_5$ is incident from the light incident/emitting end 5j of the core portion 91i, the light propagates through the core portion 91i along the optical axis A. The wavelength components $\lambda_1$ to $\lambda_4$ are then reflected by the reflecting surfaces 81a to 84a respectively. Then, the wavelength components $\lambda_1$ to $\lambda_4$ propagate through the respective core portions 91k to 91n along the optical axes $B_1$ to $B_4$, and are emitted from the light incident/emitting ends 5k to 5n of the core portions 91k to 91n. The wavelength component $\lambda_5$, after passing through the wavelength filters 81 to 84, is emitted from the light incident/emitting end 5t of the core portion 91i. Optical detecting elements such as for example photodiodes may be installed at each of the light incident/emitting ends 5k to 5n.

When light at wavelengths $\lambda_6$ to $\lambda_9$ is incident on the light incident/emitting ends 5p to 5s respectively of the core portions 91p to 91s, the light propagates through the respective core portions 91p to 91s along the optical axes $B_5$ to $B_8$, and is reflected by the respective reflecting surfaces 85a to 88a. Light at wavelengths $\lambda_6$ to $\lambda_9$ which has been reflected by the reflecting surfaces 85a to 88a respectively in this way propagates through the cp 91j along optical axis $A_2$, and is then coupled with light of wavelength $\lambda_5$ propagating along the core portion 91i along optical axis $A_1$. This coupled light is then emitted from the light incident/emitting end 5t. Optical emitting elements such as for example laser diodes may be installed at the light incident/emitting ends 5p to 5s.

By means of the optical waveguide substrate 1e according to the fifth embodiment, similarly to the optical waveguide substrate 1a according to the above-described first embodiment, wavelength filters 81 to 88 can be suitably embedded within a cladding portion using a simple process. Further, the surface of the optical waveguide substrate 1e can be made flat. And, the wavelength filters 81 to 88 can be precisely positioned with respect to the core portions 91i to 91s, and optical losses between the wavelength filters 81 to 88 and core portions 91i to 91s can be effectively reduced. Hence, for example, a WDM module with lower losses can be realized for use in extracting or adding optical signals of different wavelengths in WDM communication. A suitable length $W_3$ of the optical waveguide substrate 1e in the direction along the optical axes $A_1$ and $A_2$ is for example 10 mm to 30 mm. A suitable width $W_4$ for the optical waveguide substrate 1e in the direction along the optical axes $B_1$ to $B_8$ is for example 4 mm.

In the optical waveguide substrate 1e according to the fifth embodiment, the wavelength filters 81 to 88 are held by first supporting portions 36a, 36b and second supporting portions 37a, 37b similarly to the first embodiment, but may be held by the first and second supporting portions of other embodiments or modified examples.

Optical waveguide substrates and methods of fabricating the same according to the present invention are not limited to the above-described embodiments, and various modifications are possible. For example, wavelength filters were described as the optical components in the above-described embodiments; but various other components having a reflecting surface (for example half-mirrors) may be employed as optical components in the present invention.

Further, in the above-described embodiments and modified examples, the first and second supporting portions are provided so as to make contact with the reflecting surface and with the rear surface respectively of the optical component (wavelength filter); but the first and second supporting portions may be provided so as to make contact with both ends in the length direction of the optical component (for example, with the side faces 4c shown in FIG. 1). Moreover, these first and second supporting portions may be provided so as to abut the four corners of the optical component.

Further, in each of the above-described embodiments and modified examples, cases were explained in which the planar shape of the optical component (wavelength filter) was rectangular; but the shape of the optical component is not thus limited, and application to optical components with shapes which are triangular or other shapes is possible.

As described above, in accordance with the optical waveguide substrate and method of fabricating the same according to the present invention, an optical component can be embedded within an optical waveguide layer comprising resin by means of a simple configuration and process, and the surface of the optical waveguide layer can be made flat.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical waveguide substrate, comprising:
   a substrate having a main surface;
   an optical waveguide layer, provided on the main surface of said substrate, being composed of resin, said optical waveguide having a first core portion extending in a first direction, a second core portion extending in a second direction intersecting the first direction, and a cladding portion covering said first and second core portions; and
   an optical component having a reflecting surface which reflects light with a predetermined wavelength, said optical component being arranged on the main surface of said substrate such that light propagating through one of said first and second core portions is reflected toward the other by means of its reflecting surface,
   wherein said optical waveguide layer has first and second supporting portions which hold said optical component while sandwiching said optical component, said first and second supporting portions being respectively composed of the same materials as said first and second core portions, and being formed on the main surface of said substrate together with said first and second core portions, and
   wherein said optical component is, together with said first and second core portions, covered by said cladding portion.

2. An optical waveguide substrate according to claim 1, wherein said first. supporting portion has a first supporting surface facing the reflecting surface of said optical component, and a convex portion protruding from the first supporting surface along the main surface of said substrate,
   wherein said second supporting portion has a second supporting surface facing the rear surface of said optical component opposing the reflecting surface, and a convex portion protruding from the second supporting surface along the main surface of said substrate, and
   wherein said optical component is in contact with the convex portions provided respectively on said first and second supporting surfaces.

3. An optical waveguide substrate according to claim 2, wherein the distance between the convex portions provided on said first and second supporting portions is shorter than the thickness of said optical component in the direction perpendicularly intersecting the reflecting surface, and
   wherein said optical component is press-fitted between the convex portion of said first supporting portion and the convex portion of said second supporting portion.

4. An optical waveguide substrate according to claim 1, wherein said first supporting portion has a first contact surface which makes contact with the reflecting surface of said optical component,
   wherein said second supporting portion has a second contact surface which makes contact with the rear surface of said optical component opposing the reflecting surface, and
   wherein said optical component is held by the first and second contact surfaces.

5. An optical waveguide substrate according to claim 4, wherein the interval between the first and second contact surfaces is smaller than the thickness of said optical component in the direction perpendicularly intersecting the reflecting surface, and
   wherein said optical component is press-fitted between the first contact surface and the second contact surface.

6. An optical waveguide substrate according to claim 1, wherein said optical component has a tapered shape, such that the thickness of said optical component in the direction perpendicularly intersecting the reflecting surface decreases gradually toward said substrate.

7. An optical waveguide substrate according to claim 6, wherein at least a portion of the rear surface of said optical component is inclined with respect to the reflecting surface.

8. A method of fabricating an optical waveguide substrate, comprising:
   a first cladding layer forming step of forming a first cladding layer, composed of resin, on a main surface of a substrate prepared in advance;
   a core layer forming step of forming a core layer, composed of resin with a refractive index higher than that of said first cladding layer, on said first cladding layer;
   an etching step of forming a first core portion, second core portion, first supporting portion, and second supporting portion, by performing etching of said core layer and said first cladding layer, using a mask on which are formed a planar shape of said first core portion extending in a first direction on the main surface of said substrate, a planar shape of said second core portion extending in a second direction on the main surface intersecting the first direction, and planar shapes of said first and second supporting portions which enclose therebetween and hold an optical component arranged such that a reflecting surface of said optical component reflects light propagating through one of said first and second core portions toward the other;
   an optical component installation step of inserting said optical component between said first supporting portion and said second supporting portion; and
   a second cladding layer forming step of forming a second cladding layer, composed of resin with a refractive index lower than that of said core layer, so as to cover said first core portion, said second core portion, said first supporting portion, said second supporting portion, and said optical component.

9. A method of fabricating an optical waveguide substrate, comprising:
   an etching step of forming an optical component accommodating groove, first supporting portion, and second supporting portion respectively on a laminated portion, by performing etching of said laminated portion, composed of resin and provided in a main surface of a substrate prepared in advance, having a first core portion extending in a first direction, a second core portion extending in a second direction intersecting the first direction, and a first cladding portion covering said first and second core portions, in use of a mask on which are formed a planar shape of said optical component accommodating groove accommodating an optical component arranged so as to reflect light propagating through one of said first and second core portions toward the other by means of a reflecting surface of said optical component, and planar shapes of said first and second supporting portions, formed on side faces of said optical component accommodating groove, which hold said optical component while sandwiching said optical component;
   an optical component installation step of inserting said optical component between said first supporting portion and said second supporting portion; and
   a second cladding portion forming step of forming a second cladding portion, composed of resin with a refractive index lower than that of said first and second core portions, so as to cover said laminated portion and said optical component.

10. An optical waveguide substrate, comprising:

a substrate having a main surface;

an optical waveguide layer, provided on the main surface of said substrate, being composed of resin, having a first core portion extending in a first direction, a second core portion extending in a second direction intersecting the first direction, and a first cladding portion covering said first and second core portions; and an optical component having a reflecting surface which reflects light with a predetermined wavelength, said optical component being arranged on the main surface of said substrate such that light propagating through one of said first and second core portions is reflected toward the other by means of its reflecting surface, wherein said first cladding portion in said optical waveguide layer has an optical component accommodating groove which accommodates said optical component, and first and second supporting portions, provided on side faces of said optical component accommodating groove, holding said optical component while sandwiching said optical component, and wherein said optical waveguide layer further comprises a second cladding portion which covers said first cladding portion and said optical component, wherein said first supporting portion has a first contact surface which makes contact with the reflecting surface of said optical component, wherein said second supporting portion has a second contact surface which makes contact with the rear surface of said optical component opposing the reflecting surface, and wherein said optical component is held by the first and second contact surfaces, and wherein the interval between the first and second contact surfaces is smaller than the thickness of said optical component in the direction perpendicularly intersecting the reflecting surface, and wherein said optical component is press-fitted between the first contact surface and the second contact surface.

11. An optical waveguide substrate according to claim 10, wherein said optical component has a tapered shape, such that the thickness of said optical component in the direction perpendicularly intersecting the reflecting surface decreases gradually toward said substrate.

12. An optical waveguide substrate according to claim 11, wherein at least a portion of the rear surface of said optical component is inclined with respect to the reflecting surface.

* * * * *